(12) United States Patent
Kimura et al.

(10) Patent No.: US 7,271,730 B2
(45) Date of Patent: Sep. 18, 2007

(54) OCCUPANT DETERMINATION APPARATUS AND OCCUPANT DETERMINATION METHOD

(75) Inventors: Hiroaki Kimura, Kawasaki (JP);
Masahiro Miyamori, Yokohama (JP);
Seiji Yamashita, Yamato (JP); Shinya Deguchi, Yokohama (JP); Junji Kanamoto, Hadano (JP)

(73) Assignee: Honda Elesys Co., Ltd., Yokohama-shi (JP)

( * ) Notice: Subject to any disclaimer, the term of this patent is extended or adjusted under 35 U.S.C. 154(b) by 451 days.

(21) Appl. No.: 10/501,219

(22) PCT Filed: Aug. 1, 2003

(86) PCT No.: PCT/JP03/09823
§ 371 (c)(1),
(2), (4) Date: Jul. 12, 2004

(87) PCT Pub. No.: WO2004/013657
PCT Pub. Date: Feb. 12, 2004

(65) Prior Publication Data
US 2005/0253712 A1   Nov. 17, 2005

(30) Foreign Application Priority Data
Aug. 2, 2002 (JP) ............................. 2002-225891
Jul. 30, 2003 (JP) ............................. 2003-203981

(51) Int. Cl.
*G08B 21/00* (2006.01)

(52) U.S. Cl. .................. 340/667; 340/666; 340/665; 340/561; 340/562; 340/870.37; 280/735; 180/271; 701/45

(58) Field of Classification Search ................ 340/561, 340/562, 665, 667, 870.37, 666; 180/271, 180/273, 274; 280/735; 324/663; 701/45, 701/46, 47
See application file for complete search history.

(56) References Cited

U.S. PATENT DOCUMENTS 6,556,137 B1 *  4/2003  Oka et al. .................. 340/561
6,559,555 B1 *  5/2003  Saitou et al. ............... 307/10.1

(Continued)

FOREIGN PATENT DOCUMENTS

EP    0 976 625 A2    2/2000

(Continued)

OTHER PUBLICATIONS

Canadian Office Action dated Feb. 7, 2007.

*Primary Examiner*—Hung Nguyen
(74) *Attorney, Agent, or Firm*—Squire, Sanders & Dempsey L.L.P.

(57) ABSTRACT

An occupant determination apparatus and an occupant determination method accurately determine a size of an occupant, with a simple configuration where a plurality of electrodes are arranged on one layer, and eliminate errors due to the capacitance between an occupant and surrounding car-body metal parts or the like, and thus suppress erroneous determination. The apparatus includes a sensor having a plurality of seat section electrodes arranged on a sitting section, and a determination section. The determination section includes an oscillator, a capacitance detecting section which detects the current flowing through a seat section electrode in order to detect the capacitance, a switching circuit which switches the connection of the capacitance detecting section to the seat section electrode, and a controlling section which outputs a switch control signal.

58 Claims, 21 Drawing Sheets

U.S. PATENT DOCUMENTS 6,825,765 B2 * 11/2004 Stanley et al. ............... 340/561

FOREIGN PATENT DOCUMENTS

| JP | 03-233391 | 10/1991 |
| JP | 07-270541 | 10/1995 |
| JP | 10-236269 | 9/1998 |
| JP | 11-258354 | 9/1999 |
| JP | 11-271463 | 10/1999 |
| JP | 11-334451 | 12/1999 |
| JP | 11-337427 | 12/1999 |
| JP | 2000-75042 | 3/2000 |
| JP | 2000-249773 | 9/2000 |
| JP | 2002-036929 | 2/2002 |
| JP | 3287314 | 3/2002 |
| WO | WO 02/42124 | 5/2002 |

* cited by examiner

FIG. 1A
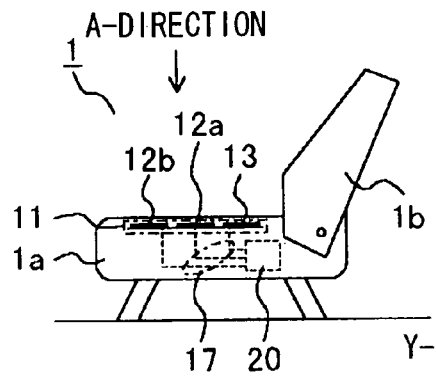
FIG. 1B
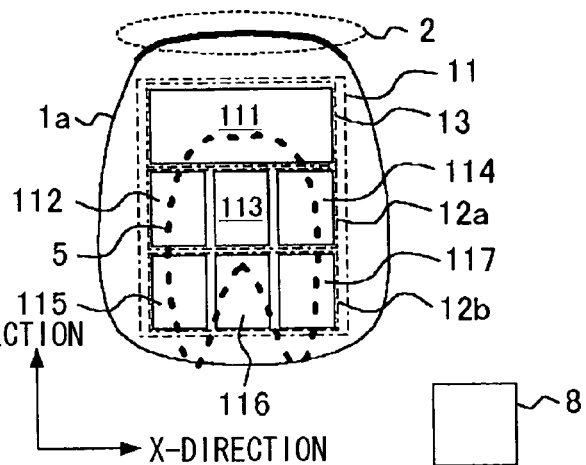
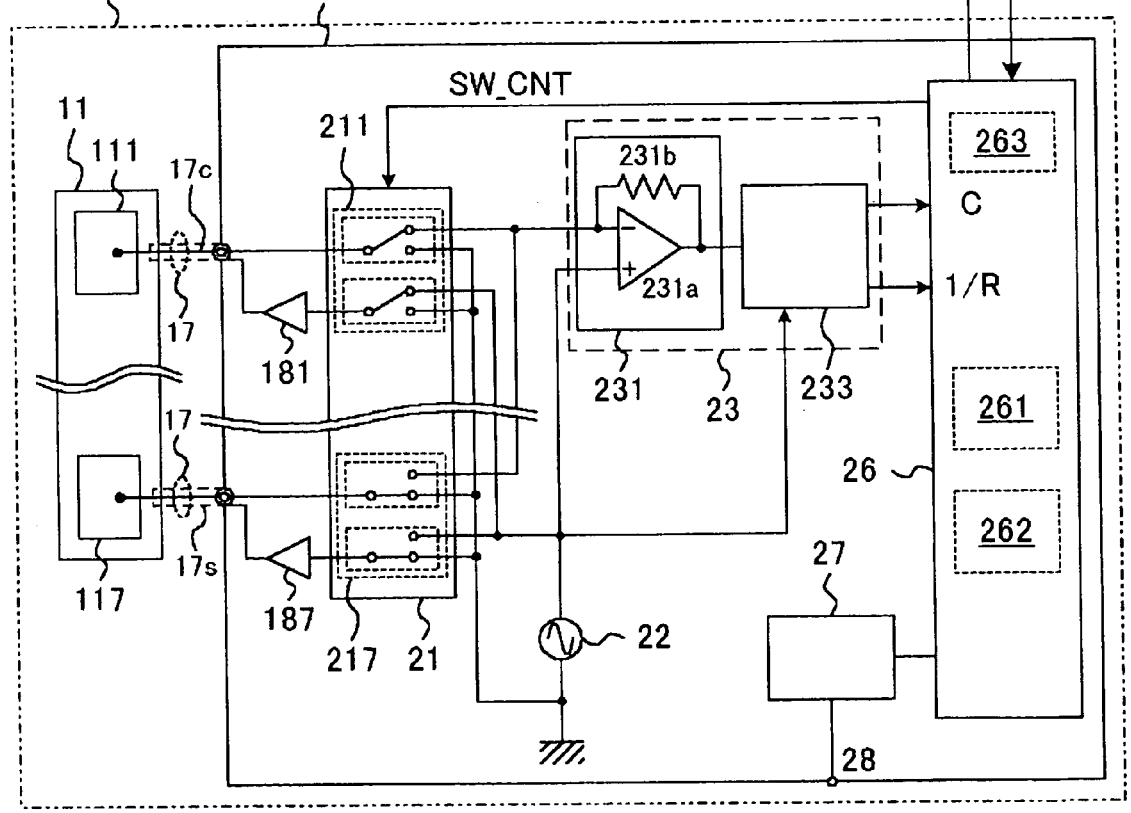
FIG. 1C

FIG. 15A  PRIOR ART
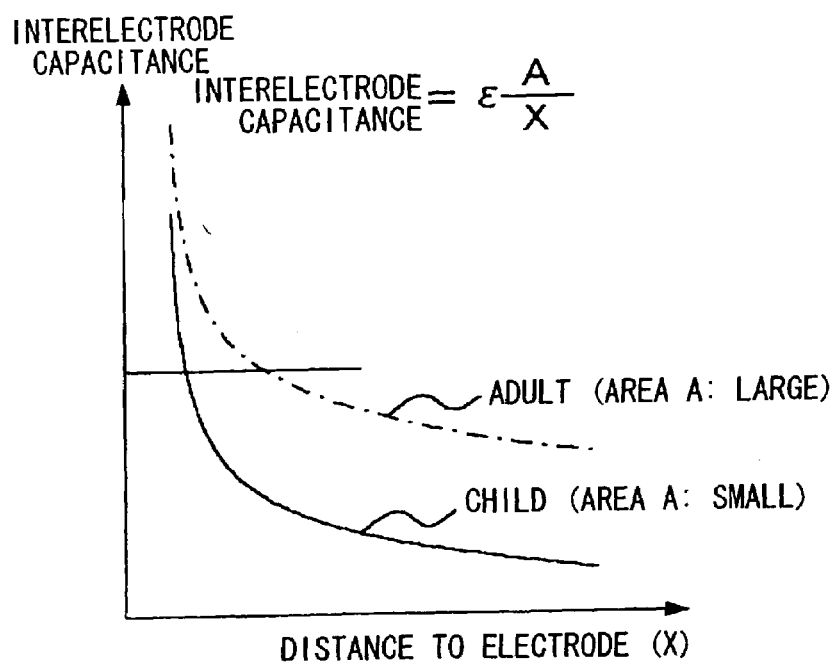
$$\text{INTERELECTRODE CAPACITANCE} = \varepsilon \frac{A}{X}$$
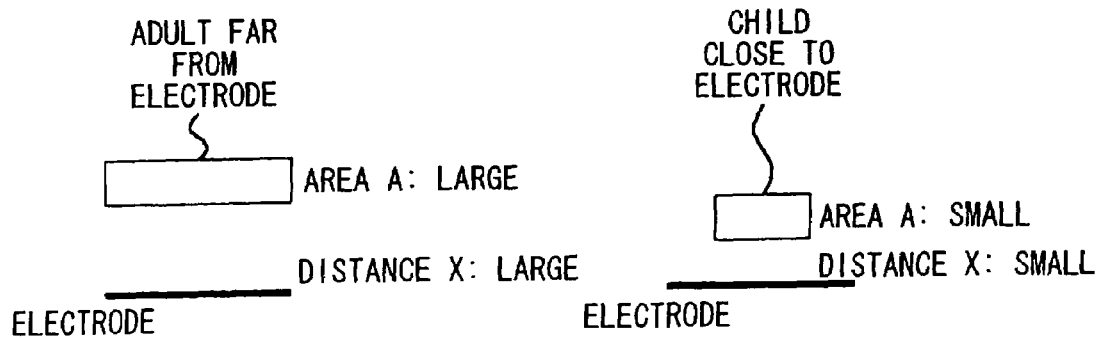
FIG. 15B  PRIOR ART
FIG. 15C  PRIOR ART

OCCUPANT DETERMINATION APPARATUS AND OCCUPANT DETERMINATION METHOD

TECHNICAL FIELD

The present invention relates to an occupant determination technique, specifically, an improvement of an occupant determination apparatus in an automotive vehicle installed with an airbag apparatus, which can set an airbag in the airbag apparatus to a deployable state or deploy-suppressed state corresponding to a sitting-state or the like of an occupant in a passenger's seat, when an impact occurs, and an improvement of an occupant determination method thereof.

BACKGROUND ART

Conventionally, a determination technique which electrically determines the presence of a person in a seat in a vehicle using a phenomenon that the capacitance between two electrodes changes depending on the presence of the person, is known (Japanese Unexamined Patent Application, First Publication Nos. Hei 3-233391, Hei 7-270541, and 2000-249773). Moreover, a determination technique which determines an occupant's body, posture, and the like by a change in the capacitance between a plurality of conductive electrodes arranged in a central part of the steering wheel and which is usable for controlling an airbag when an impact occurs, is also known (for example, refer to Japanese Unexamined Patent Application, First Publication No. Hei 11-337427).

Incidentally, such systems have been conventionally used for airbag apparatus of vehicles where an airbag is deployed if it receives an impact regardless of whether the occupant on the passenger's seat is an adult or child. Recently, however, it has been understood that it is instead safer not to deploy an airbag in the case of a child with a small body. Therefore, an apparatus has been considered where an occupant determination apparatus is equipped in the seat on the passenger's seat side for controlling an airbag to deploy in the case of an adult but not to deploy in the case of a child when an impact occurs. However, it has been difficult to precisely control an airbag and the like according to the size of occupants in the conventional determination technique which simply determines a person's presence, posture, and the like by a change in the capacitance between a plurality of electrodes.

However, various occupant determination apparatus which enable determination of whether an adult or child, have been recently proposed and disclosed in Japanese Unexamined Patent Application, First Publication Nos. Hei 10-236269, Hei 11-258354, Hei 11-271463, Hei 11-334451, and 2002-36929, and the like.

FIG. 14 shows a schematic configuration of an example of a conventional occupant determination apparatus which enables determination of whether an adult or child. This occupant determination apparatus comprises; a plurality of antenna electrodes 1001 and 1002; a switch 1003 which switches the connections of the plurality of antenna electrodes to a transmission side and a receive side, a transmitter 1005; a current/voltage converting circuit 1004 which converts a current flowing to the electrodes into voltage, an interelectrode capacitance detecting circuit 1006 which detects an interelectrode capacitance from the view of the transmission side, which exists between the transmitter 1005 and the antenna electrodes on the transmission side, by the output of the current/voltage converting circuit 1004, and an occupant determination circuit 1007. This occupant determination apparatus determines whether an adult or a child by the change in capacitance between the antenna electrodes obtained by the interelectrode capacitance detecting circuit 1006. In this manner, in the conventional occupant determination apparatus shown in FIG. 14, utilizing the phenomenon that the capacitance between the antenna electrodes changes by the difference in the area of an occupant covering the antenna electrodes, this change of capacitance is measured for enabling determination of whether an adult or child.

However, the interelectrode capacitance detected by the occupant determination apparatus as shown in FIG. 14 includes data of the area of the occupant covering the respective electrodes (A1, A2, to AN) and the distance between the respective electrodes and the occupant (X1, X2, to XN). Therefore, for example, an adult who is sitting down on a cushion in a seat in a position far from the electrodes, and a child who is sitting down directly on a seat in a position close to the electrodes cannot be discriminated only by the magnitude of the detected value of the interelectrode capacitance as shown in FIG. 15A to FIG. 15C. That is, there is a disadvantage in that it is difficult to realize accurate determination of the size of an occupant by the determination method for determination of whether the occupant is an adult or a child, simply by the magnitude of the capacitance between the antenna electrodes.

FIG. 16 shows an example of a conventional occupant determination apparatus provided with means for solving the problem where it becomes difficult to discriminate between an adult in a position far from the electrodes and a child in a position close to the electrodes as shown in FIG. 15A to FIG. 15C. In this occupant determination apparatus, an occupant area (A) covering the electrodes is calculated by a relation between an upper layer electrode and a lower layer electrode of double layered electrodes, which are separated by a predetermined thickness d. Specifically, the arrangement is such that electrodes are provided on both side surfaces of an insulating material with a thickness of d, and the electrode on the surface close to the occupant is an upper layer electrode and the electrode on the surface far from the occupant is a lower layer electrode. In the occupant determination apparatus having such an electrode configuration, for example, an occupant area covering an electrode 1202 (A2) is calculated as follows.

Firstly, assuming that the position of a lower layer electrode 2 is in the upper layer electrode position, a virtual capacitance Cvt (2) is estimated from the capacitances of upper layer electrodes Ctp (1) and Ctp (3) on both adjacent sides as follows.

$$Cvt(2) = \frac{Ctp(1) + Ctp(3)}{2}$$

Moreover, the capacitance Cbt (2) of the lower layer electrode 2, and the virtual capacitance Cbt (2) assuming that the position of the lower layer electrode 2 is in the upper layer electrode position, can be represented by the following equations, with the same occupant area (A2) and a different distance between the electrodes and the occupant (X).

$$Cvt(2) = \varepsilon \frac{A_2}{X_2}$$

$$Cbt(2) = \varepsilon \frac{A_2}{X_2 + d}$$

If the distance X2 between the electrodes and the occupant is eliminated from the above equations, the occupant area A2 can be obtained from following equation.

$$A_2 = \frac{Cvt(2) \times Cbt(2)}{\varepsilon(Cvt(2) - Cbt(2))} d$$

As seen from the above equation, calculation of the occupant area with the influence of the distance between the occupant and the electrodes eliminated, becomes possible.

However, in the occupant determination apparatus as shown in FIG. 14, capacitance is present between an occupant and surrounding car-body metal parts (GND) other than the antenna electrodes. Moreover, a normal occupant of the seat cannot be always in the same posture and takes various postures. Therefore, the capacitance Cg between the occupant and the car-body metal parts (GND) also changes corresponding to the occupant's posture. As a result, the measured value of the capacitance between the antenna electrodes which is a composite value of the capacitances including the capacitance Cg between the occupant and the antenna electrodes, includes errors due to the capacitance component which changes with the posture of the occupant. Specifically, since the capacitance Cg changes to a large value when the occupant approaches or contacts the metal parts such as the chassis of the automobile, then in such a case, the measured value of the capacitance between the antenna electrodes changes greatly. Therefore, there is a disadvantage in that it is difficult to realize an accurate determination of the size of the occupant, by the determination method for determination of whether the occupant is an adult or a child simply from the magnitude of the capacitance between the antenna electrodes.

Moreover, in the occupant determination apparatus of the configuration shown in FIG. 16, the structure becomes complex since the electrodes which become sensors need to be a double layered structure. Furthermore, the thickness d changes due to the occupant weight, depending on the insulating material where an upper layer electrode and a lower layer electrode are formed on both side surfaces. Therefore, calculation accuracy of the occupant area is decreased. In order to suppress this accuracy decrease, it is necessary to add some means for measuring the thickness d of the insulating material when the occupant is sitting down, which results in the problem that the structure becomes more complex and cost is also increased.

DISCLOSURE OF INVENTION

An object of the present invention is to provide an occupant determination apparatus and an occupant determination method, which can accurately determine whether an adult or child, with a simple configuration where a plurality of electrodes are arranged on one layer, in the seating section and the backrest section.

Moreover, another object of the present invention is to provide an occupant determination apparatus and an occupant determination method, which can eliminate errors due to the capacitance between an occupant and surrounding car-body metal parts or the like, which affect the determination of whether an adult or child, so that erroneous determination can be prevented.

A first occupant determination apparatus of the present invention comprises: a first sensor section having a plurality of seat section electrodes arranged on a seating section of a seat having the seating section on which an occupant sits and a backrest section; and a first determination section which detects each capacitance formed between the seat section electrodes by using a predetermined first signal for capacitance measurement, in order to determine the size of the occupant; and the first sensor section has a reference electrode array where a plurality of reference candidate electrodes, included in the plurality of the seat section electrodes, are arranged by a predetermined rule; the first determination section comprises: an electric field generating device which outputs the first signal; a capacitance measuring device which detects each capacitance between the seat section electrodes based on a current flowing through each of the seat section electrodes corresponding to the first signal; a switching device which sequentially switches a connection of the capacitance measuring device to the plurality of the seat section electrodes based on a switch control signal; and a controlling device which outputs the switch control signal; and the controlling device comprises: a selecting device which sets one of the reference candidate electrodes included in the reference electrode array as a reference electrode, based on measurement capacitances determined by detection capacitances of each of the seat section electrodes which are detected by the capacitance measuring device; a first calculating device which determines the size of an occupant based on a distance between the reference electrode and the occupant which is calculated from the measurement capacitance and an area of the reference electrode, and the measurement capacitances of the seat section electrodes included in the first sensor section; and a switch signal generating device which outputs the switch control signal.

At this time, the electric field generating device may include a first signal source which outputs the first signal and a second signal source which outputs a second signal different from the first signal, and the switching device may connect an arbitrary first seat section electrode to the capacitance measuring device based on the switch control signal, and may connect so as to supply the second signal to all of the seat section electrodes except for the first seat section electrode, and the detection capacitance of each of the seat section electrodes may be made the measurement capacitance of each of the seat section electrodes.

Alternatively, the electric field generating device may include a first signal source which outputs the first signal and a second signal source which outputs a second signal different from the first signal; the switching device may further have a function for switching the first signal and the second signal in order to supply either the first signal or the second signal to the capacitance measuring device based on the switch control signal, and may control so that an arbitrary first seat section electrode is connected to the capacitance measuring device and the second signal is supplied to all of the seat section electrodes except for the first seat section electrode in the case where the first signal is to be supplied to the capacitance measuring device, and may control so that the first signal is supplied to an arbitrary first seat section electrode, an arbitrary second seat section electrode which is different from the first seat section electrode is connected to the capacitance measuring device, and the second signal is supplied to all of the seat section electrodes except for the first seat section electrode and the second seat section electrode in the case where the second signal is to be supplied to the capacitance measuring device; the controlling device may further include a capacitance calculating device which calculates capacitance between each of the seat section electrodes and the occupant based on the detection capacitance, and the calculated capacitance of each of the seat section electrodes may be made the measurement capacitance of the seat section electrode.

Moreover, preferably the selecting device calculates normalized capacitance per each unit area based on the measurement capacitance of each of the reference candidate electrodes included in the reference electrode array, and the reference candidate electrode for which the normalized capacitance is the maximum is made the reference electrode.

A second occupant determination apparatus of the present invention comprises: a second sensor section having a plurality of back section electrodes arranged on a backrest section of a seat having a seating section on which an occupant sits and the backrest section; and a second determination section which detects each capacitance formed between the back section electrodes by using a predetermined first signal for capacitance measurement, in order to determine the size of the occupant, and the second determination section includes: an electric field generating device which outputs the first signal; a capacitance measuring device which detects each capacitance between the back section electrodes based on a current flowing through each of the back section electrodes; a switching device which sequentially switches a connection of the capacitance measuring device to the plurality of the back section electrodes based on a switch control signal; and a controlling device which outputs the switch control signal; and the controlling device has: a reference value storage device which stores a reference curve which is preset so that capacitance for each position of the backrest section has an extreme value at a predetermined position; a second calculating device which determines the size of an occupant based on the reference curve and a capacitance distribution graph which is generated based on measurement capacitances determined by respective detection capacitances detected by the capacitance measuring device and the position in the backrest section of the back section electrode; and a switch signal generating device which outputs the switch control signal.

At this time, the electric field generating device may include a first signal source which outputs the first signal and a second signal source which outputs a second signal different from the first signal; and the switching device may connect an arbitrary first back section electrode to the capacitance measuring device based on the switch control signal, and may connect so as to supply the second signal to all of the back section electrodes except for the first back section electrode, and the detection capacitance of each of the back section electrodes may be made the measurement capacitance of each of the back section electrodes.

Alternatively, the electric field generating device may include a first signal source which outputs the first signal and a second signal source which outputs a second signal different from the first signal; the switching device may further have a function for switching the first signal and the second signal in order to supply either the first signal or the second signal to the capacitance measuring device based on the switch control signal, and may control so that an arbitrary first back section electrode is connected to the capacitance measuring device and the second signal is supplied to all of the back section electrodes except for the first back section electrode in the case where the first signal is to be supplied to the capacitance measuring device, and may control so that the first signal is supplied to an arbitrary first back section electrode, an arbitrary second back section electrode which is different from the first back section electrode is connected to the capacitance measuring device, and the second signal is supplied to all of the back section electrodes except for the first back section electrode and the second back section electrode in the case where the second signal is to be supplied to the capacitance measuring device; the controlling device may further include a capacitance calculating device which calculates each capacitance between the back section electrodes and the occupant based on the detection capacitance detected by the capacitance measuring device, and the calculated capacitance of each of the back section electrodes may be made the measurement capacitance of each of the back section electrodes.

Moreover, preferably a planar external appearance of the backrest section is approximately quadrilateral, the backrest section is connected to the seating section on a second connection side which is one side of the quadrilateral, and assuming that two directions mutually orthogonal in the plane of the backrest section are an x-direction and a z-direction and a direction of the second connection side is the x-direction, then at least one of the back section electrodes is arranged on a straight line parallel to the x-direction in the second sensor section, and a plurality of arrays of the back section electrodes are provided mutually separate in the z-direction.

Moreover, it is desirable that the reference curve is set so that the capacitance for each position in the z-direction has an extreme value at a predetermined position $h0$.

Furthermore, if the reference curve is denoted by Cs (z) and the capacitance distribution graph is denoted by Cm (z), the second calculating device changes $\Delta z$, and calculates a cross-correlation function between Cs (z+$\Delta z$) and Cm (z), and the $\Delta z$ when the cross-correlation function becomes a maximum is assumed to be $\delta h$, then ($h0+\delta h$) may be made the size of the occupant.

Moreover, a first occupant determination method of the present invention for an occupant determination apparatus comprising: a first sensor section having a plurality of seat section electrodes arranged on a seating section of a seat having the seating section on which an occupant sits and a backrest section; and a first determination section which detects each capacitance formed between the seat section electrodes by using a predetermined first signal for capacitance measurement, in order to determine the size of the occupant, and wherein the first sensor section has a reference electrode array where a plurality of reference candidate electrodes, included in the plurality of the seat section electrodes, are arranged by a predetermined rule, the method comprises at least: a first detecting step for detecting each capacitance between the seat section electrodes based on a current flowing through each of the seat section electrodes corresponding to the first signal; a reference electrode setting step for setting an electrode for which normalized capacitance per unit area which is calculated from detection capacitance detected in the first detecting step is a maximum, among the reference candidate electrodes included in the reference electrode array, as a reference electrode; a first size calculating step for calculating a measurement area from an area and detection capacitance of the reference electrode, and the detection capacitance of each of the seat section electrodes, and a first determination step for determining the size of the occupant by comparing the measurement area and a predetermined first standard value.

At this time, when the first sensor section includes n of the seat section electrodes, then in the first detecting step, in a state where a first signal is applied to an arbitrary j th (where j is an integer of $1 \leq j \leq n$) seat section electrode and all other of the seat section electrodes are connected to a predetermined fixed potential, capacitance which is detected based on a current flowing through the j th seat section electrode may be made the measurement capacitance of the j th seat section electrode.

Moreover, there may further be included; a capacitance calculating step for calculating each capacitance between the seat section electrodes and the occupant based a on detection capacitance detected in the first detecting step, and the capacitance calculated for each of the seat section electrodes may be made the measurement capacitance of the seat section electrode. At this time, assuming that the first sensor section includes n of the seat section electrodes, then, in the first detecting step, in a state where a first signal is applied to an arbitrary j th (where j is an integer of $1 \leq j \leq n$) seat section electrode and all other of the seat section electrodes are connected to a predetermined fixed potential, capacitance which is detected based on a current flowing through an arbitrary k th (where k is an integer of $1 \leq k \leq n$) seat section electrode is made detection capacitance Cjk of the j th seat section electrode, and the detection capacitances for all combinations of j and k are detected, and in the capacitance calculating step the capacitance Cs (i) between the occupant and an i th (where i is an integer of $1 \leq i \leq n$) seat section electrode may be calculated based on the detection capacitances by $Cs(i)=Cii+Ciq \times Cip/Cqp$ (where p and q are respectively integers of $1 \leq p \leq n$ and $1 \leq q \leq n$, and $(i-p) \times (p-q) \times (q-i) \neq 0$).

Moreover, a second occupant determination method of the present invention for an occupant determination apparatus comprising: a second sensor section having a plurality of back section electrodes arranged on a backrest section of a seat having a seating section on which an occupant sits and the backrest section; and a second determination section which detects each capacitance formed between the back section electrodes by using a predetermined first signal for capacitance measurement, in order to determine the size of the occupant, and wherein a planar external appearance of the backrest section is approximately quadrilateral, the backrest section is connected to the seating section on a second connection side which is one side of the quadrilateral, and assuming that two directions mutually orthogonal in the plane of the backrest section are an x-direction and a z-direction and a direction of the second connection side is the x-direction, then at least one of the back section electrodes is arranged on a straight line parallel to the x-direction in the second sensor section, and a plurality of arrays of the back section electrodes are provided mutually separate in the z-direction, the method comprises at least, a reference curve setting step for previously preparing a reference curve which is set so that capacitance for each position in the z-direction of the backrest section has an extreme value at a predetermined position h0, a second detecting step for detecting each capacitance between the back section electrodes based on a current flowing through each of the back section electrodes corresponding to the first signal, a second size calculating step for calculating a Z size, which is the size in the z-direction, from the reference curve and a capacitance distribution graph which is generated based on measurement capacitances for each of the back section electrodes determined by respective detection capacitances detected in the second detecting steps and the position in the z-direction of each of the back section electrodes, and a second determination step for determining the size of the occupant by comparing the Z size and a predetermined second standard value.

At this time, assuming that the second sensor section includes n of the seat section electrodes, then in the second detecting step, in a state where a first signal is applied to an arbitrary j th (where j is an integer of $1 \leq j \leq n$) back section electrode and all other back section electrodes are connected to a predetermined fixed potential, detection capacitance which is detected based on a current flowing through the j th back section electrode may be made the measurement capacitance of the j th back section electrode.

Moreover, in the second detecting step, in a state where a first signal is applied to an arbitrary j th (where j is an integer of $1 \leq j \leq n$) back section electrode and all other of the back section electrodes are connected to a predetermined fixed potential, capacitance which is detected based on a current flowing through an arbitrary k th (where k is an integer of $1 \leq k \leq n$) back section electrode is made detection capacitance cjk of the j th back section electrode, and the detection capacitances of all combinations of j and k are detected, and the method may further comprise a capacitance calculating step for calculating each capacitance between the back section electrodes and the occupant based on the detection capacitance, and the calculated capacitance of each of the back section electrodes may be made the measurement capacitance of the back section electrode. At this time, assuming that the second sensor section includes n of the back section electrodes, then, in the second detecting step, in a state where a first signal is applied to an arbitrary j th (where j is an integer of $1 \leq j \leq n$) back section electrode and all other of the back section electrodes are connected to a predetermined fixed potential, capacitance which is detected based on a current flowing through an arbitrary k th (where k is an integer of $1 \leq k \leq n$) back section electrode is made detection capacitance Cjk of the j th back section electrode, and the detection capacitances for all combinations of j and k are detected, and in the capacitance calculating step capacitance Cb (i) between the occupant and an i th (where i is an integer of $1 \leq i \leq n$) back section electrode may be calculated based on the detection capacitances by $Cb(i)=Cii+Ciq \times Cip/Cqp$ (where p and q are respectively integers of $1 \leq p \leq n$ and $1 \leq q \leq n$, and $(i-p) \times (p-q) \times (q-i) \neq 0$).

As described above, according to the occupant determination apparatus and the occupant determination method of the present invention, an effect can be obtained where it is possible to accurately determine the size of an occupant, specifically whether an adult or child, with a simple configuration where a plurality of electrodes are arranged on one layer, in any one of the seating section and the backrest section.

Moreover, an effect can be also obtained for eliminating errors due to the capacitance between an occupant and surrounding car-body metal parts or the like, which affect the determination of the size of the occupant, so that erroneous determination can be prevented.

BRIEF DESCRIPTION OF DRAWINGS

FIG. 1A to FIG. 1C are diagrams for explaining a first embodiment of an occupant determination apparatus of the present invention, respectively being a duplex type side view of the occupant determination apparatus, a duplex type plan view of a first sensor section arranged in a seating section and viewed from the A direction in FIG. 1A, and a block diagram of the occupant determination apparatus.

FIG. 3A to FIG. 3C are diagrams for explaining a second embodiment of the occupant determination apparatus of the present invention, respectively being a duplex type side view of the occupant determination apparatus, a duplex type plan view of a second sensor section arranged in a backrest section and viewed from the B direction shown in FIG. 3A, and a block diagram of the occupant determination apparatus.

FIG. 15A to FIG. 15C are diagrams for explaining problems in determining the size of an occupant only by the size of the detected value of the interelectrode capacitance.

BEST MODE FOR CARRYING OUT THE INVENTION

Next is a description of the present invention with reference to the drawings.

Figure 2A:
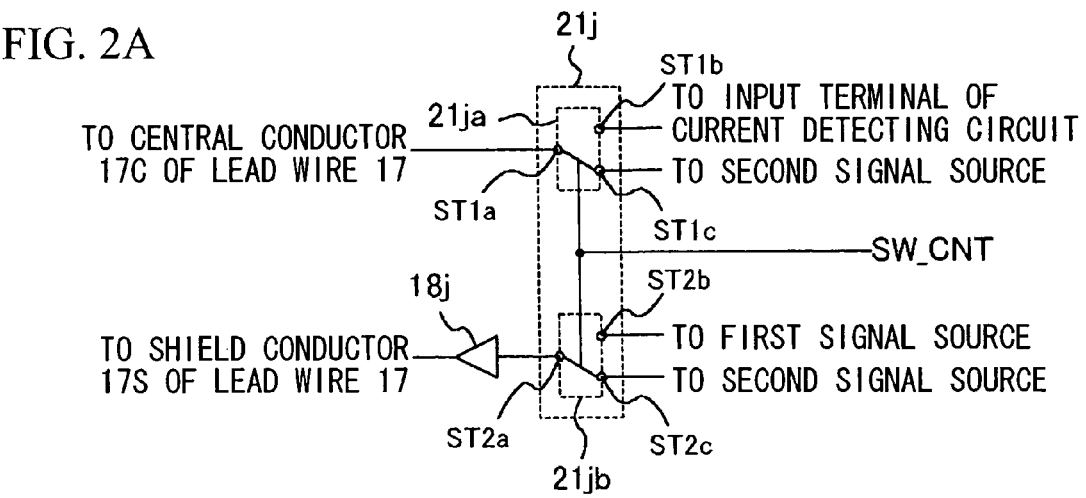
FIG. 2A to FIG. 2C are diagrams for explaining examples of the details of portions of FIG. 1A to FIG. 1C, respectively being a block diagram of an example of a first SWM constituting a switching circuit in FIG. 1C, a connection diagram for when the first SWM comprises NMOSs, and a block diagram of an example of an impedance detecting circuit.
Figure 2B:
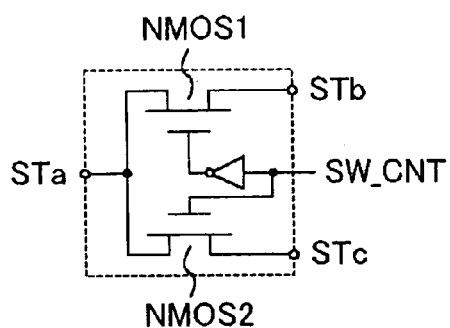
Figure 2C:
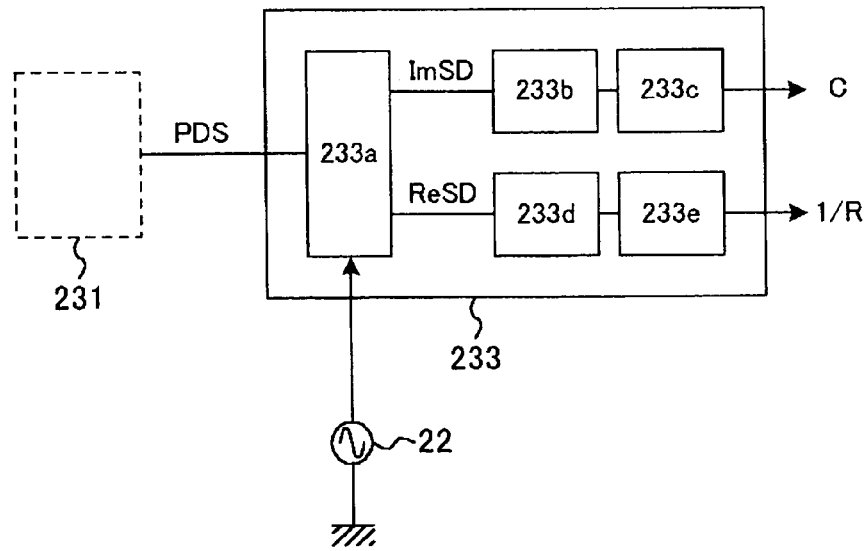

FIG. 1A to FIG. 1C are diagrams for explaining a first embodiment of an occupant determination apparatus of the present invention. FIG. 1A, FIG. 1B and FIG. 1C are respectively a duplex type side view of the occupant determination apparatus, a duplex type plan view of a first sensor section arranged in a seating section and viewed from the A direction shown in FIG. 1A, and a block diagram of the occupant determination apparatus. Moreover, FIG. 2A to FIG. 2C are diagrams for explaining examples of the details of portions of FIG. 1A to FIG. 1C. FIG. 2A, FIG. 2B and FIG. 2C are respectively a block diagram of an example of a first switch module (hereunder, SWM) constituting a switching circuit 21 in FIG. 1C, a connection diagram for when the first SWM comprises NMOSs, and a block diagram of an example of an impedance detecting circuit 233.

Firstly, the theory of an occupant determination method using the occupant determination apparatus 10 of the present embodiment is described. An already well-known phenomenon that a plurality of interelectrode capacitances vary depending on the area of the electrodes covered by a conducting object such as a human body is utilized for the basic measurement theory. However, in the present embodiment, it is possible to determine, with the influence of the distance between a conducting object and the electrodes eliminated. For example, if an occupant's buttocks on a seating section 1a when the occupant is sitting down in a seat 1 shown in FIG. 1A and FIG. 1B, becomes like an occupant sitting area 5, a seat section electrode 113 is wholly covered by the occupant. However, the other seat section electrode 111, seat section electrode 112, and seat section electrode 114 to seat section electrode 117 are only partially covered by the occupant. Therefore, if the capacitance between the seat section electrode 113 and the occupant is detected in this state, since the respective areas of the seat section electrodes 111 to 117 can be previously known, a distance X between the seat section electrode 113 and the occupant can be calculated. Then, by assuming that this distance X is the distance between the seat section electrodes from 111 to 117 and the occupant, the areas where the occupant is covering the seat section electrodes 111 to 117 can be calculated from the respective capacitances between the seat section electrodes 111 to 117 and the occupant. Therefore, by previously arranging the electrodes with high preciseness in size and position to cover the whole surface regardless of the sitting posture of the occupant (in this example, this corresponds to the seat section electrodes 112 to 117) as a first sensor section 11, it becomes possible to determine the occupant with high accuracy. Hereunder is a detailed description of a configuration for realizing this theory.

Referring to FIG. 1A to FIG. 1C, the occupant determination apparatus 10 of the present embodiment comprises, a first sensor section 11 including seven seat section electrodes 111 to 117 arranged on the sitting section 1a which the occupant's buttocks contact, of the seat 1 on which the occupant sits, and a first determination section 20 which determines the size of an occupant sitting down on the seat 1 by detecting the capacitances formed respectively between the seat section electrodes 111 to 117 using a first signal, that is an electric field generating signal for measuring the capacitances. The seat 1 comprises, the sitting section 1a which is normally contacted by the occupant's buttocks when the occupant is sitting down and for which the planar external appearance is approximately quadrilateral, and a backrest section 1b which is connected at a first connection side 2 of the sitting section 1a and is normally contacted by the occupant's head or back and for which the planar external appearance is approximately quadrilateral. Hereunder, it is assumed that two directions mutually orthogonal in the sitting section 1a plane are the x-direction and the Y-direction, and the x-direction is the direction of the first connection side 2 as shown in FIG. 1B.

The first sensor section 11 comprises; the seat section electrode 111; a reference electrode array 12a where the seat section electrodes 112 to 114 that are respectively reference candidate electrodes, are arranged mutually separate on a straight line in the x-direction; and a reference electrode array 12b where the seat section electrodes 115 to 117 that are respectively reference candidate electrodes, are arranged mutually separate on a straight line in the x-direction. The seat section electrode 111 is a single electrode with a length in the x-direction approximately equal to the length in the x-direction of the sitting section 1a, and becomes a second electrode array 13. The reference electrode array 12a, the reference electrode array 12b, and the second electrode array 13 are arranged mutually separate in the Y-direction.

The first determination section 20 comprises: an oscillator 22 which is an electric field generating device which outputs a predetermined first signal; a capacitance detecting section 23 which is a capacitance measuring device which detects the current flowing through a selected arbitrary seat section electrode 11j (where j is an integer of $1 \leq j \leq 7$) in order to detect the capacitance viewed from the seat section electrode 11j; a switching circuit 21 which is a switching device which switches the connection of the capacitance detecting section 23 to the seat section electrode 11j based on a switch control signal SW_CNT; a controlling section 26 which is a controlling device which outputs the switch control signal SW_CNT; and a power circuit 27 which is connected to a battery or the like in a vehicle which is not shown, via a connector 28, and supplies the power for driving the whole first determination section 20.

The switching circuit 21 comprises seven first SWMs 211 to 217 of the same configuration, connected one-to-one to the seat section electrodes 111 to 117. Specifically, the seat section electrode 11j is connected to the first SWM 21j. A configuration example of the arbitrary first SWM 21j is shown in FIG. 2A. Referring to FIG. 2A, the first SWM 21j comprises a first switch (hereunder, first SW) 21ja and a second SW 21jb. The first SW 21ja respectively connects; a terminal ST1a to a central conductor 17c of a lead wire 17 which connects to the corresponding seat section electrode 11j (in the case where a shielded wire is used for the lead wire), a terminal ST1b to the capacitance detecting section 23, and a terminal ST1c to a fixed potential (in this case, ground (GND) potential) supplying terminal which is a second signal source, so that the terminal ST1a can be switched for conducting to either the terminal ST1b or the terminal ST1c by the switch control signal SW_CNT. The second SW 21jb respectively connects; a terminal ST2a to the input terminal of a buffer circuit 18j, a terminal ST2b to the output terminal of the oscillator 22, and a terminal ST2c to the GND potential supplying terminal, so that the terminal ST2a can be switched for conducting to either the terminal ST2b or the terminal ST2c by the switch control signal SW_CNT. Moreover, the output terminal of the buffer circuit 18j is connected to a shield section 17s of the lead wire 17 which connects the seat section electrode 11j and the first SW21ja. However, it is also possible to directly connect the terminal ST2a and the shield section 17s by omitting the buffer circuit 18j. The first SW21ja and the second SW21jb are controlled such that the terminal ST2a is conducted to the terminal ST2b when the terminal ST1a is conducted to the terminal ST1b, and the terminal ST2a is conducted to the terminal ST2c when the terminal ST1a is conducted to the terminal ST1c. However, if the shielded wire is not used for the lead wire 17 which connects the seat section electrode 11j and the first SW21ja, the second SW21jb and the buffer circuit 18j are unnecessary.

The capacitance detecting section 23 comprises a current detecting circuit 231 which detects a predetermined current and converts this into a voltage signal, and an impedance detecting circuit 233 which inputs the voltage signal output from the current detecting circuit 231 and extracts the impedance component.

The current detecting circuit 231 can be configured for example by a differential amplification circuit 231a and a resistive element 231b connected between an output terminal and an inverting input terminal of this differential amplification circuit 231a, so that the resistive element 231b serves as a current detecting element and the detected current is converted into a voltage signal and output. The inverting input terminal of the differential amplification circuit 231a is connected to each of the terminals ST1b of the first SWs 21ja constituting the respective first SWMs 21j in the switching circuit 21, and the non-inverting input terminal is connected to the output terminal of the oscillator 22.

Figure 18:
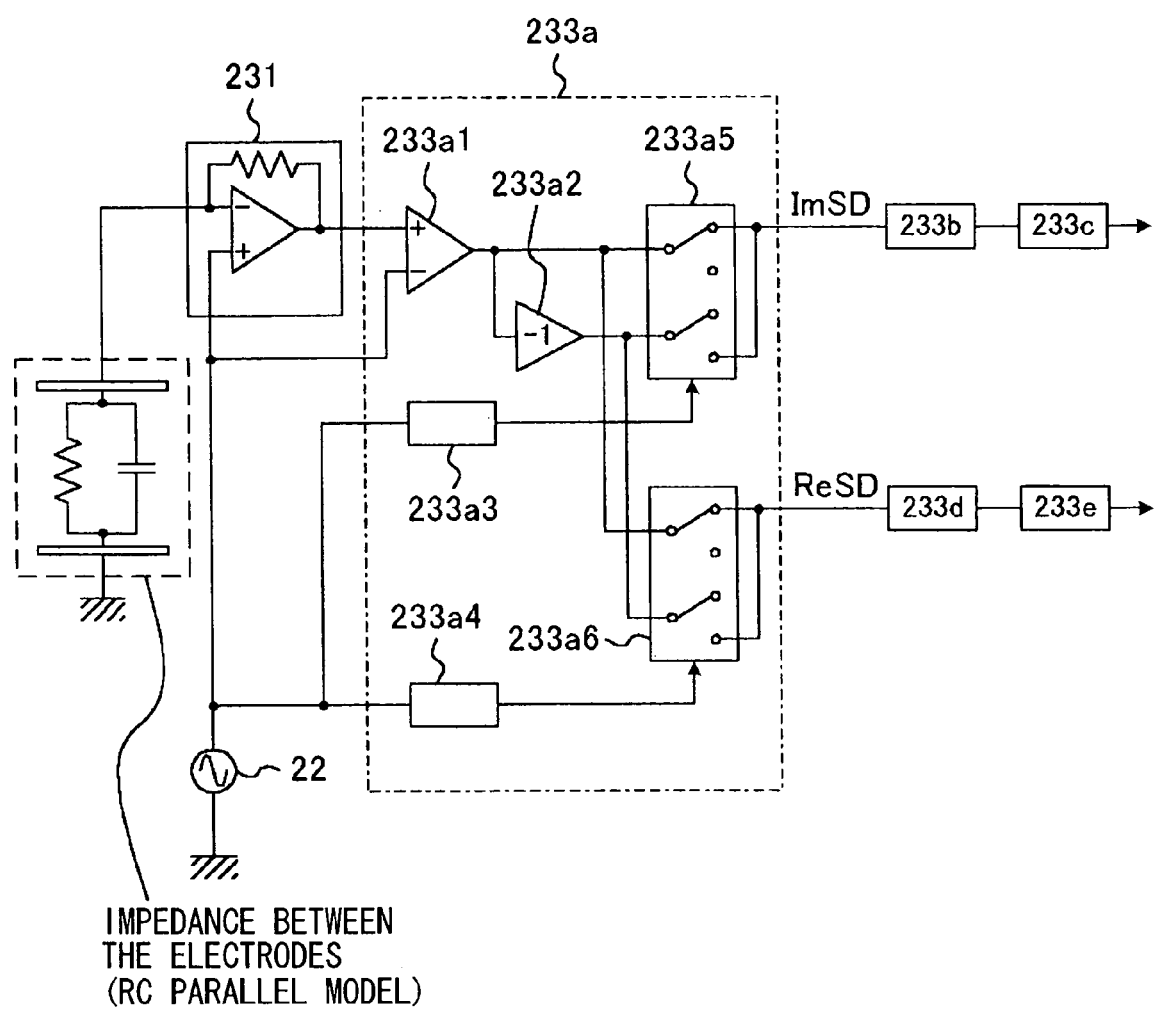
FIG. 18 is a block diagram of an example of a synchronous detection circuit.

Moreover, referring to FIG. 2C, the impedance detecting circuit 233 can comprise a synchronous detection circuit 233a, rectifier circuits 233b and 233d, and amplification circuits 233c and 233e. FIG. 18 is a more specific block diagram of an example of the synchronous detection circuit 233a. Referring to FIG. 18, the synchronous detection circuit 233a comprises a difference circuit 233a1, an inverting circuit 233a2, a first rectangular wave generating circuit 233a3, a second rectangular wave generating circuit 233a4, a first switching circuit 233a5, and a second switching circuit 233a6. The inverting circuit 233a2 takes the input of the output signal from the difference circuit 233a1 and outputs the inverted signal. The first rectangular wave generating circuit 233a3 and the second rectangular wave generating circuit 233a4 respectively generate a rectangular wave with a phase shift of 90° from the phase of the first signal, and a rectangular wave with a phase shift of 0° from the phase of the first signal, that is, of the in-phase, and output this. The first switching circuit 233a5 takes the input of the output signal from the difference circuit 233a1 and the output signal from the inverting circuit 233a2, and alternately selects either one corresponding to the output signal from the first rectangular wave generating circuit 233a3 and outputs this. Similarly, the second switching circuit 233a6 takes the input of the output signal from the difference circuit 233a1 and the output signal from the inverting circuit 233a2, and alternately selects either one corresponding to the output signal from the second rectangular wave generating circuit 233a4 and outputs this. Moreover, the respective output signals from the first switching circuit 233a5 and second switching circuit 233a6 are respectively input to the rectifier circuit 233b and the rectifier circuit 233d. The respective output signals from the rectifier circuit 233b and the rectifier circuit 233d are respectively input to the amplification circuit 233c and the amplification circuit 233e. The respective output signals from the amplification circuit 233c and the amplification circuit 233e are respectively input to the controlling section 26.

In this configuration, assuming the impedance connected to the inverting input terminal of the current detecting circuit 231 is an interelectrode impedance of an RC parallel model as shown in FIG. 18, then when an output signal PDS from the current detecting circuit 231 and the first signal output from the oscillator 22 are respectively input to the non-inverting input terminal and the inverting input terminal of the difference inverting circuit 233a1, and the first signal is respectively input to the first rectangular wave generating circuit 233a3 and the second rectangular wave generating circuit 233a4, the signals output from the output terminal of the first switching circuit 233a5 and the output terminal of the second switching circuit 233a6 respectively become an imaginary component signal ImSD and a real component signal ReSD for when the interelectrode impedance in FIG. 18 is expressed in the complex mode, and the rectified results of these become signals proportional to the imaginary component and the real component. Therefore, the imaginary component signal ImSD output from the first switching circuit 233a5 is rectified by the rectifier circuit 233b, and the rectified result becomes a signal proportional to the capacitance of the seat section electrode viewed from the input terminal of the current detecting circuit 231. Hence, this is amplified by the amplification circuit 233c to output as a measurement result of the detection capacitance of the seat section electrode. In the present embodiment, this detection capacitance becomes the measurement capacitance of the respective seat section electrodes. Therefore, the detection capacitance and the measurement capacitance are treated as the equivalent in the description of the present embodiment hereunder.

The controlling section 26 comprises; a selecting device 261 which sets one of the seat section electrodes 112 to 117 included in the reference electrode arrays 12a and 12b as a reference electrode, based on the respective measurement results of the seat section electrodes 111 to 117, that is the detection capacitances, which are measured by the capacitance detecting section 23; a first calculating device 262 which determines the size of the occupant from the distance between the occupant and the reference electrode which is calculated from the detection capacitance and the area of the reference electrode, and the detection capacitance of the seat section electrodes 111 to 117 in the sensor section 11, and outputs a first controlling signal for controlling the propriety of airbag deployment based on the determination result; and a switch signal generating device 263 which outputs a switch control signal SW_CNT. This controlling section 26 may also comprise, for example a microprocessor (hereunder, MPU) and its processing program, or the like.

The oscillator 22 is configured so as to generate a high-frequency and low-voltage of for example, a frequency of about 100 kHz and an amplitude of about 1 to 3 V.

Next is a description of an occupant determination method together with the operation, for the occupant determination apparatus 10 of the present embodiment. At first, when a vehicle key switch (not shown) is turned on, the whole occupant determination apparatus 10 is reset once, and then the operation is started.

Firstly, in a first detecting step, a current that flows when the first signal output from the oscillator 22 is applied to the seat section electrode $11j$, is detected and converted into a voltage signal by the current detecting circuit 231. Then, the detection capacitance, which is the capacitance viewed from the seat section electrode $11j$, is extracted from this voltage signal by the impedance detecting circuit 233. This is performed for all of the cases from j=1 to j=7.

Next, in a reference electrode setting step, an electrode for which a normalized capacitance per unit area which is calculated from the detection capacitance is a maximum, among the seat section electrodes 112 to 117 included in the reference electrode arrays 12a and 12b, is selected and set as a reference electrode.

Next, in a first size calculating step, a reference distance X is calculated from the area of the set reference electrode and the detection capacitance. Then the effective areas of the respective seat section electrodes 111 to 117 are respectively calculated based on this reference distance X and the detection capacitances of the seat section electrodes 111 to 117. Furthermore, a predetermined measurement area is calculated based on these effective areas. Then, in a first determination step, the size of the occupant is determined by comparing this measurement area and a predetermined first standard value, and based on the determination result, a first controlling signal for controlling the propriety of airbag deployment is output to an occupant restraint device 8.

Next is a description of a specific operation. Here, it is assumed that the area $S11j$ of the respective seat section electrodes $11j$ is previously measured, and the buttocks of the occupant sitting down are for example in the occupant sitting area 5, although it is not specifically limited. The capacitance viewed from an arbitrary seat section electrode $11j$ is detected as follows. Firstly, the first SWMs 211 to 217 of the switching circuit 21 are set by the switch control signal SW_CNT as follows. The first $SW21ja$ of the first SWM $21j$ conducts the terminal ST1a and the terminal ST1b, and the second $SW21jb$ conducts the terminal ST2a and the terminal ST2b. Each of the other first SWMs $21k$ (k is an integer of $1 \leq k \leq 7$ and $j \neq k$) conduct the terminal ST1a of the first $SW21k$ and the terminal ST1c, and the second SWs $21k$ conduct the terminal ST2a and the terminal ST2c. In this state, the current flowing is detected by the current detecting circuit 231 and converted into a voltage signal. Then the capacitance extracted from this voltage signal by the impedance detecting circuit 233 becomes the detection capacitance which is the capacitance viewed from the seat section electrode 11*j*. By sequentially repeating this for j=1 to 7, all the detection capacitances of the seat section electrodes 111 to 117 can be obtained.

On completion of obtaining all of the detection capacitances of the seat section electrodes 111 to 117, then by the selecting device 261, the normalized capacitances, which are the respective detection capacitances per unit area, are calculated based on the respective electrode areas and the detection capacitances of the seat section electrodes 112 to 117 included in the reference electrode arrays 12*a* and 12*b*, and the seat section electrode having the maximum normalized capacitance is selected as the reference electrode. In the examples in FIG. 1A to FIG. 1C, the seat section electrode 113 becomes the reference electrode.

Next, the distance X between the seat section electrode 113 and the occupant is calculated by the first calculating device 262, based on the area S113 and the detection capacitance C113 of the seat section electrode 113, based on the following equation.

$$C_{113} = \varepsilon \frac{S_{113}}{X}$$

therefore, $$X = \varepsilon \frac{S_{113}}{C_{113}}$$

Furthermore, when the respective areas are calculated from this distance X and the respective detection capacitances of all of the seat section electrodes 111 to 117, these become the effective areas of the respective seat section electrodes 111 to 117 covered by the occupant, and the total becomes the measurement area corresponding to the size (of the buttocks) of the occupant.

Next, again by the first calculating device 262, the size of the occupant is determined by comparing the measurement area and a predetermined first standard value, and based on the determination result, a first controlling signal for controlling the propriety of airbag deployment is output to the occupant restraint device 8.

As described above, in the occupant determination apparatus 10 of the present embodiment there is provided the configuration where the first sensor section 11 has; the reference electrode array 12*a* including the seat section electrodes 112 to 114, arranged mutually separate in the x-direction on a straight line, any of which being a reference candidate electrode; the reference electrode array 12*b* including the seat section electrodes 115 to 117, again any of which being a reference candidate electrode; and the second electrode array 13 comprising the seat section electrode 111; and the second electrode array 13 is positioned closest to the backrest section 1*b* with these electrode arrays arranged mutually separate in the Y-direction. Therefore, if the occupant is sitting down on the seat 1 (placing the buttocks on the seating section 1*a*), a seat section electrode where the whole surface is covered by the occupant, exists in the reference electrode array regardless of the sitting posture. Then, assuming that the seat section electrode where the whole surface is covered by the occupant, is the reference electrode, and the distances between seat section electrodes and the occupant are constant, the distances X between the seat section electrodes and the occupant can be calculated from the detection capacitance and the area of the reference electrode. Accordingly, even if the distances X between seat section electrodes and the occupant changes due to a change in thickness of the occupant's cloth, a cushion put on the seating section 1*a*, or the like, the distance X can be accurately calculated each time using the reference electrode, so that the effective area covered by the occupant can be accurately calculated from the detection capacitance of the seat section electrode even for the partially covered seat section electrode. If the sum of the effective areas of the respective seat section electrodes calculated in this manner is obtained, since this accurately corresponds to the size (of the buttocks) of the occupant, the determination can be performed with exceedingly high accuracy in the occupant determination apparatus 10 of the present embodiment, compared to the case where the size of the occupant is determined simply by the size of the detection capacitance.

Moreover, a shielded wire is used as the lead wire 17 which connects the seat section electrodes 111 to 117 and the first SWs 211 to 217 in the switching circuit 21, and a signal which is the same as the signal applied to the central conductor, is also applied to the shielded section, so that the influence of the capacitance between the central conductor and the shielded section on the detection capacitance of the seat section electrode can also be suppressed while suppressing noise from the outside.

Setting of the reference electrode is on the basis that, if the capacitances viewed from the respective seat section electrodes in a state where the occupant is sitting down, are detected and the respective normalized capacitances are calculated, then assuming that the distances between the seat section electrodes and the occupant are constant, the normalized capacitance of the seat section electrode with the whole surface covered by the occupant becomes a maximum.

Next is a description of a second embodiment of the present invention.

Figure 3C:
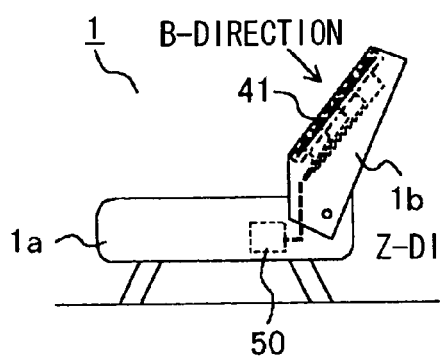
Figure 3C:
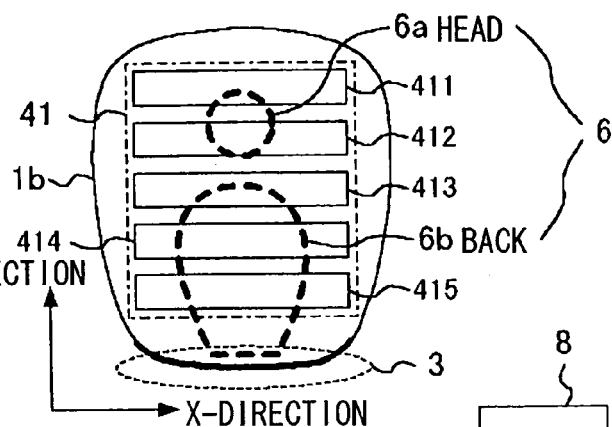
Figure 3C:
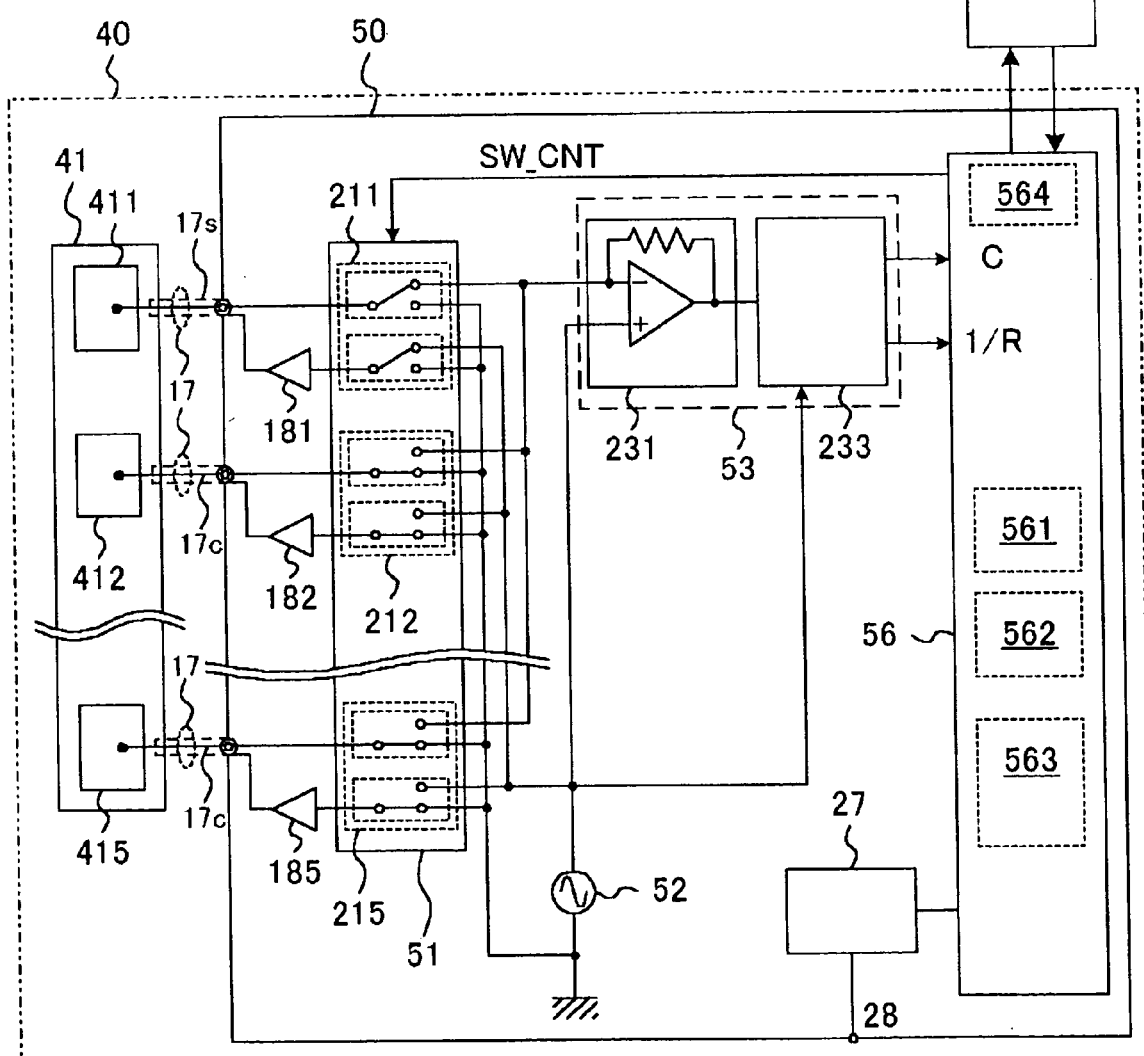

FIG. 3A to FIG. 3C are diagrams for explaining a second embodiment of the occupant determination apparatus of the present invention. FIG. 3A, FIG. 3B and FIG. 3C are respectively a duplex type side view of the occupant determination apparatus, a duplex type plan view of a second sensor section arranged in a backrest section and viewed from the B direction shown in FIG. 3A, and a block diagram of the occupant determination apparatus. The same components as for the first embodiment are denoted by the same reference symbols and the description is omitted.

Figure 4:
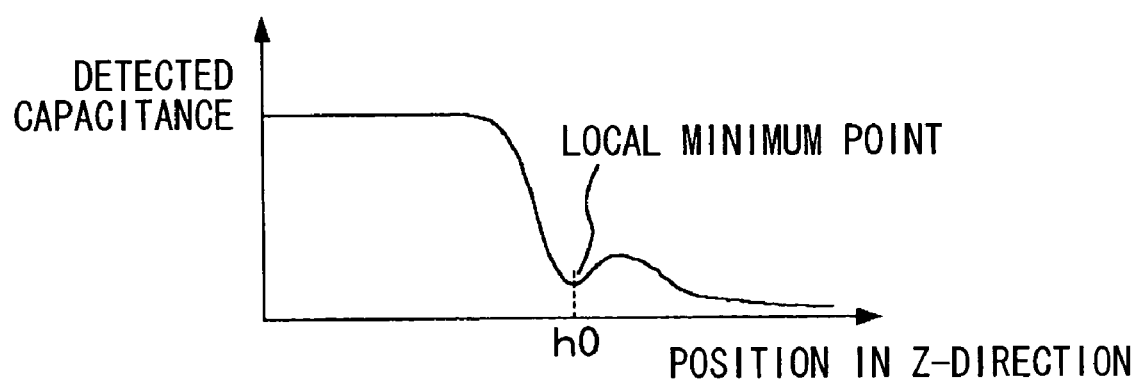
FIG. 4 is an example of a duplex type graph showing the position of the respective electrodes when many electrodes are provided separated in the z-direction in FIG. 3B in a backrest section, as the horizontal axis, and the capacitance observed at the respective electrodes when the occupant is sitting down and leaning to the backrest section, as the vertical axis.

Firstly, the theory of an occupant determination method using the occupant determination apparatus 40 of the present embodiment is described. The occupant determination method of the present embodiment is an effective method particularly in the case where the occupant sitting down on the seat 1 is adjacent to a backrest section 1*b*. The present inventors have earnestly studied methods for accurately determining the size of an occupant (whether adult or child) regardless of the sitting posture, for the case where an occupant is adjacent to the backrest section 1*b*. From the various observation results, it was found that in the case where the occupant is sitting down on the seat 1, the height of the occupant's shoulder (or neck) (the position in the z-direction in FIG. 3B) is approximately constant for each occupant regardless of the sitting posture, except for the case where the occupant is away from the backrest section 1*b* and leaning well forward or to the side. Moreover actual measurement has confirmed that, when the occupant is sitting down adjacent to the backrest section 1*b* in a state where a plurality of electrodes are arranged separated in the z-direction of the backrest section 1*b*, the interelectrode capacitance becomes larger for the electrode at the position of the occupant's back since the occupant broadly covers the electrode at a short distance, the interelectrode capacitance becomes smaller for the electrode in the position of the occupant's head since although the distance to the electrode is short the area of the electrode covered by the occupant becomes smaller, the interelectrode capacitance becomes further smaller for the electrode in the position of the occupant's neck since the distance to the electrode becomes greater and the area of the electrode covered by the occupant becomes smaller. FIG. 4 is an example of duplex type graph showing the position of the respective electrodes when many electrodes are provided separated in the z-direction in FIG. 3B in a backrest section 1$b$, as the horizontal axis, and the capacitance observed at the respective electrodes when the occupant is sitting down on the seat 1 and leaning to the backrest section 1$b$, as the vertical axis. The position h0 in the horizontal direction of the local minimum point in the graph of FIG. 4, denotes the position of the shoulder of the occupant sitting down (hereunder, sitting shoulder height). In the graph of FIG. 4, due to the variation of the sitting posture of the occupant, the capacitance, that is the position in the vertical direction, varies considerably. However, the position h0 in the horizontal direction of the local minimum point hardly varies unless the occupant is changed. The present embodiment utilizes this situation in order to accurately determine the size of the occupant regardless of the sitting posture of the occupant. Hereunder is a specific description of the implemented configuration.

Referring to FIG. 3A to FIG. 3C, the occupant determination apparatus 40 of the present embodiment comprises, a second sensor section 41 including five back section electrodes 411 to 415 arranged on the backrest section 1$b$ which the occupant's shoulder and head contact in a seat 1 on which the occupant is sitting down, and a second determination section 50 which determines the size of the occupant sitting down on the seat 1 by measuring the capacitance formed at each of the back section electrodes 411 to 415 using a first signal, that is an electric field generating signal for measuring the capacitance. The seat 1 comprises, a seating section 1$a$ which is normally contacted by the occupant's buttocks when the occupant is sitting down and for which the planar external appearance is approximately quadrilateral, and the backrest section 1$b$ which is connected at the first connection side 2 of the seating section 1$a$ and a second connection side 3 and is normally contacted by the occupant's head or back and for which the planar external appearance is approximately quadrilateral. Hereunder, it is assumed that two directions mutually orthogonal in the backrest section 1$b$ plane are the x-direction and the z-direction, and the x-direction is the direction of the second connection side 3 as shown in FIG. 3B.

The second sensor section 41 comprises five back section electrodes 411 to 415 arranged mutually separate in the z-direction and approximately parallel to the x-direction. Each of the five back section electrodes 411 to 415 comprise a single electrode where the length in the x-direction is the approximately equal to the length in the X-direction of the backrest section 1$b$.

The second determination section 50 comprises; an oscillator 52 which is an electric field generating device which outputs a predetermined first signal, a capacitance detecting section 53 which is a capacitance measuring device which detects the current flowing through a selected arbitrary back section electrode 41$p$ (where p is an integer of $1 \leq p \leq 5$) in order to detect a capacitance of the back section electrode 41$p$, a switching circuit 51 which is a switching device which switches the connection of the capacitance detecting section 53 to the back section electrode 41$p$ based on a switch control signal SW_CNT, a controlling section 56 which is a controlling device which outputs the switch control signal SW_CNT, and a power circuit 27 which is connected to a battery or the like in a vehicle which is not shown, via a connector 28, and supplies the power for driving the whole second determination section 50.

The switching circuit 51 comprises five first SWMs 211 to 215 of the same configuration, connected one-to-one to the back section electrodes 411 to 415. Specifically, the back section electrode 41$p$ is connected to the first SWM 21$p$. The first SW 21$pa$ respectively connects; a terminal ST1$a$ to a central conductor 17$c$ of a lead wire 17 which connects to the corresponding back section electrode 41$p$ (in the case where a shielded wire is used for the lead wire 17), a terminal ST1$b$ to the capacitance detecting section 53, and a terminal ST1$c$ to a fixed potential (in this case, ground (GND) potential) which is a second signal source, so that the terminal ST1$a$ can be switched for conducting to either the terminal ST1$b$ or the terminal ST1$c$ by the switch control signal SW_CNT. The second SW 21$pb$ respectively connects a terminal ST2$a$ to the input terminal of a buffer circuit 18$p$, a terminal ST2$b$ to the output terminal of the oscillator 52, and a terminal ST2$c$ to the GND potential supplying terminal, so that the terminal ST2$a$ can be switched for conducting to either the terminal ST2$b$ or the terminal ST2$c$ by the switch control signal SW_CNT. Moreover, the output terminal of the buffer circuit 18$p$ is connected to a shield section 17$s$ of the lead wire 17 which connects the back section electrode 41$p$ and the first SW21$pa$. However, it is also possible to directly connect the terminal ST2$a$ and the shield section 17$s$ by omitting the buffer circuit 18$p$. The first SW21$pa$ and the second SW21$pb$ are controlled such that the terminal ST2$a$ is conducted to the terminal ST2$b$ when the terminal ST1$a$ is conducted to the terminal ST1$b$, and the terminal ST2$a$ is conducted to the terminal ST2$c$ when the terminal ST1$a$ is conducted to the terminal ST1$c$. However, if the shielded wire is not used for the lead wire 17 which connects the back section electrode 41$p$ and the first SW21$pa$, the second SW21$pb$ and the buffer circuit 18$p$ are unnecessary.

The capacitance detecting section 53 comprises a current detecting circuit 231 and an impedance detecting circuit 233 similarly to the configuration of the capacitance detecting section 23. The inverting input terminal of the differential amplification circuit 231$a$, which constitutes the current detecting circuit 231, is connected to each of the terminals ST1$b$ of the first SWs 21$pa$ constituting the respective SWMs 21$p$ in the switching circuit 51, and the non-inverting input terminal is connected to the output terminal of the oscillator 52.

The controlling section 56 comprises; a reference value storage device 561, for example a ROM or the like, which stores a reference curve Cs (z) in which the capacitance for each position on the backrest section 1$b$ is preset so that the curve has an extreme value at a predetermined position, for example having a local minimum of the capacitance at the position h0 as shown in FIG. 4; a capacitance distribution generating device 562 which generates a capacitance distribution graph Cm (z) based on the respective positions on the backrest section 1$b$ of the back section electrodes 411 to 415, and the respective measurement results measured by the capacitance detecting section 53; a second calculating device 563 which determines the size of the occupant, who is sitting down on the seat 1, based on the capacitance distribution graph Cm(z) and the reference curve Cs(z), and outputs a first controlling signal for controlling the propriety of airbag deployment when an impact occurs based on the determination result; and a switch signal generating device 564 which outputs a switch control signal SW_CNT. The capacitance distribution generating device 562, the second calculating device 563, and the switch signal generating device 564 except for the reference value storage device 561 of this controlling section 56 can be configured, for example by an MPU and its processing program, or the like.

The oscillator 52 is configured so as to generate high-frequency and low-voltage of for example, a frequency of about 100 kHz and an amplitude of about 1 to 3 V, similarly to the oscillator 22.

The second calculating device 563 comprises; a first calculating block which changes $\Delta z$ in a predetermined range based on the capacitance distribution graph Cm (z) and the reference curve Cs (z) and calculates a cross-correlation value CORR ($\Delta z$) between Cs (z+$\Delta z$) and Cm (z) defined by the following equation, and extracts $\delta h$ which is the value of $\Delta z$ when this cross-correlation value CORR ($\Delta z$) becomes a maximum, and calculates (h0+$\delta h$) as the sitting shoulder height Ht of the occupant who is sitting down on the seat 1; and a determination block which determines the calculated sitting shoulder height Ht by comparing with a predetermined second standard value, and outputs a first controlling signal for controlling the propriety of airbag deployment when an impact occurs based on the determination results. Here Cmk=Cm (Zk), and Csk ($\Delta z$)=Csk (Zk+$\Delta z$).

$$CORR(\Delta z) = \frac{\sum_{k=1}^{n} ((Cm_k - \overline{Cm})(Cs_k(\Delta z) - \overline{Cs}(\Delta z)))}{\sqrt{\sum_{k=1}^{n} (Cm_k - \overline{Cm})^2} \sqrt{\sum_{k=1}^{n} (Cs_k(\Delta z) - \overline{Cs}(\Delta z))^2}} \quad (A)$$

where $$\overline{Cm} = \frac{\sum_{k=1}^{n} Cm_k}{n}$$

$$\overline{Cs}(\Delta z) = \frac{\sum_{k=1}^{n} Cs_k(\Delta z)}{n}$$

Next is a description of an occupant determination method together with the operation, for the occupant determination apparatus 40 of the present embodiment. In the occupant determination apparatus 40, the reference curve setting step is previously performed in order to prepare the reference curve Cs (z) as shown in FIG. 4, which is set so that the capacitance for each position on the backrest section 1*b* in the z-direction has a local minimum value at the predetermined position h0, and this is stored in a ROM or the like which serves as the reference value storage device 561.

Then, when a vehicle key switch (not shown) is turned on, the whole occupant determination apparatus 40 is reset once, and then the operation is started.

Firstly, in a second detecting step, a current that flows when the first signal output from the oscillator 52 is applied to the back section electrode 41*p*, is detected and converted into a voltage signal by the current detecting circuit 231. Then, the detection capacitance, which is the capacitance of the back section electrode 41*p*, is extracted from this voltage signal by the impedance detecting circuit 233. This is performed for all of the cases of from p=1 to p=5. In the present embodiment, the detection capacitance of the respective back section electrodes is directly made the measurement capacitance of the back section electrode. Therefore, the detection capacitance and the measurement capacitance are considered as equivalent in the description of the present embodiment hereunder.

Next, in a second size calculating step, a Z size being the size in the z-direction, that is the sitting shoulder height Ht of the occupant sitting down on the seat 1, is calculated from the reference curve Cs (z) and the capacitance distribution graph Cm (z) generated based on the positions in the z-direction and the respective detection capacitances of the back section electrodes 411 to 415.

Then, in a second determination step, the size of the occupant is determined by comparing the calculated sitting shoulder height Ht and a predetermined second standard value, and based on the determination result, a first controlling signal for controlling the propriety of airbag deployment is output to an occupant restraint device 8.

Next is a description of a specific operation. Here, it is assumed that the position Zp in the z-direction of the respective back section electrodes 41*p* is previously measured, and the occupant sitting down is positioned in the occupant contacting area 6 (the head 6*a* and the back 6*b*). The capacitance of an arbitrary back section electrode 41*p* is measured as follows. Firstly, the first SWMs 211 to 215 of the switching circuit 51 are set by the switch control signal SW_CNT as follows. The first SW21*pa* of the first SWM21*p* conducts the terminal ST1*a* and the terminal ST1*b*, and the second SW21*pb* conducts the terminal ST2*a* and the terminal ST2*b*. Each of the other first SWMs 21*q* (q is an integer of 1≦q≦5 and p≠q) conduct the terminal ST1*a* of the first SW21*q* and the terminal ST1*c*, and the second SWs 21*q* conduct the terminal ST2*a* and the terminal ST2*c*. In this state, the capacitance calculated based on the current detected by the current detecting circuit 231 becomes the detection capacitance of the back section electrode 41*p*.

By sequentially repeating this for p=1 to 5, all the detection capacitances of the back section electrodes 411 to 415 can be obtained.

Figure 5A:
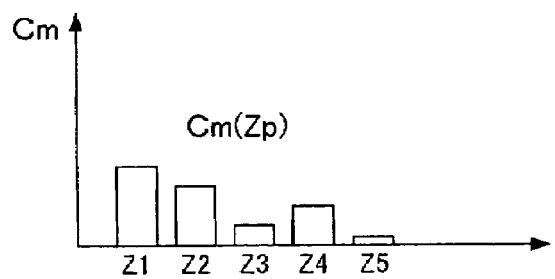
FIG. 5A to FIG. 5F are diagrams for explaining a cross correlation value CORR (Δz), FIG. 5A being an example of a capacitance distribution graph Cm (Zp), FIG. 5B to 5E being respectively examples of graphs when Δz of a reference curve Cs (z+Δz) is changed in a predetermined range, and FIG. 5F being an example of a graph of the cross correlation value CORR (Δz).
Figure 5B:
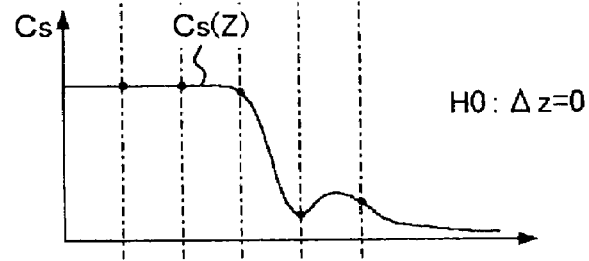
Figure 5C:
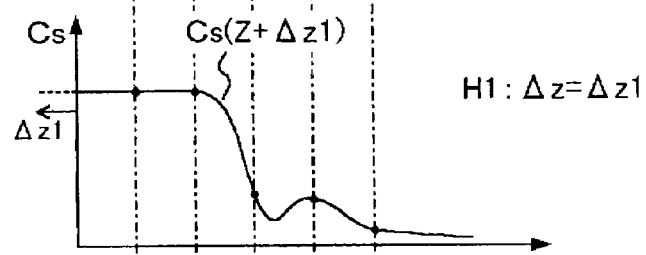
Figure 5D:
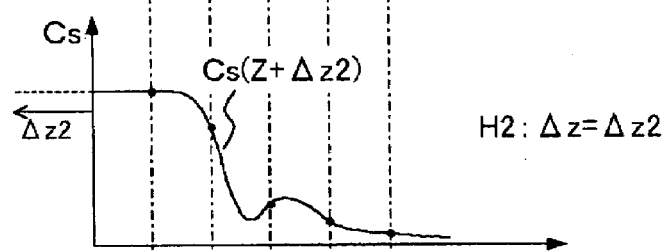
Figure 5E:
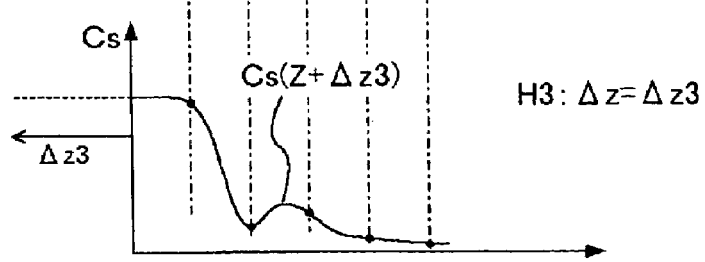
Figure 5F:
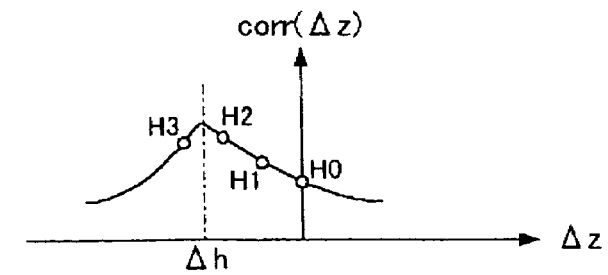

On completion of obtaining all of the detection capacitances of the back section electrodes 411 to 415, since the position in the z-direction of the respective back section electrodes is known, the distribution generating device 562 respectively corresponds these, and generates the capacitance distribution graph Cm (Zp) corresponding to the occupant. An example of the capacitance distribution graph Cm (Zp) is shown in FIG. 5A.

Next, the processing in the second size calculating step is performed by the second calculating device 563. Firstly, the first calculating block changes $\Delta z$ in a predetermined range based on the capacitance distribution graph Cm (Zp) and the reference curve Cs (z) and calculates the cross-correlation value CORR ($\Delta z$) between Cs (z+$\Delta z$) and Cm (Zp) defined by the equation (A), and extracts $\delta h$ which is the value of $\Delta z$ when this cross-correlation value CORR ($\Delta z$) becomes maximum, and calculates (h0+$\delta h$) as the sitting shoulder height Ht of the occupant who is sitting down on the seat 1. Specifically, Cs (z+$\Delta z$) when $\Delta z$ is changed as $\Delta z$=0, $\Delta z$1, $\Delta z$2, $\Delta z$3, becomes as shown in FIG. 5B to FIG. 5E, and FIG. 5F is a graph with the vertical axis indicating the respectively calculated cross correlation values CORR ($\Delta z$) and the horizontal axis indicating $\Delta z$. The peak position of this graph is $\delta h$.

Next, the determination block determines the calculated sitting shoulder height Ht by comparing with the predetermined second standard value, and outputs a first controlling signal for controlling the propriety of airbag deployment when an impact occurs based on the determination results, to the occupant restraint device 8.

As described above, in the occupant determination apparatus 40 of the present invention, the second sensor section 41 comprises the back section electrodes 411 to 415 arranged mutually separate in the z-direction and approximately parallel to the x-direction in the vicinity of the surface contacting the occupant in the backrest section 1b. Therefore, by detecting the capacitance between the respective back section electrodes 41p and the other back section electrodes when the occupant is sitting down in the seat 1, the capacitance distribution graph Cm (Zp) for the position Zp on the backrest section 1b of the respective back section electrodes 411 can be obtained. Moreover, the reference curve Cs (z) which is set so that the capacitance for each position on the backrest section 1b in the z-direction has a local minimum value at a predetermined position h0, is previously prepared and stored in the reference value storage device 561. Therefore, the cross-correlation value CORR (Δz) between the capacitance distribution graph Cm (Zp) and the reference curve Cs (z) can be calculated while changing the position in the z-direction of the reference curve Cs (z). This cross-correlation value CORR (Δz) becomes a maximum when the capacitance distribution graph Cm (Zp) and the reference curve Cs (z) overlap by only parallel displacement in the vertical direction in the graphs of FIG. 4 or FIG. 5A to FIG. 5F, that is, the positions of the local minimum point of the capacitance distribution graph Cm (Zp) and the local minimum point of the reference curve Cs (z) coincide. Therefore, assuming that the value of Δz at this time is δh, (h0+δh) becomes the position of the local minimum point of the capacitance distribution graph Cm (Zp), that is, the sitting shoulder height Ht of the occupant.

Figure 21A:
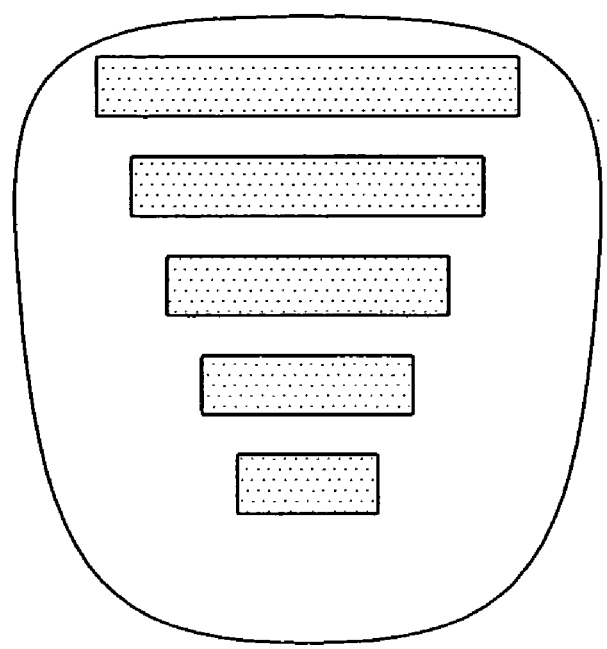
FIG. 21A and FIG. 21B are plan views showing an arrangement example of the back section electrodes in the second sensor section.
Figure 21B:
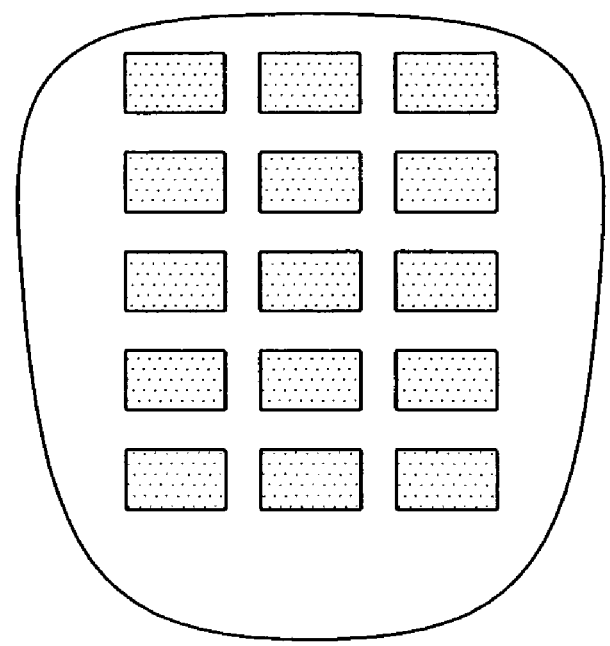

In this manner, the maximum value of the cross-correlation value CORR (Δz) of the capacitance distribution graph Cm (Zp) and the reference curve Cs (z) is obtained in order to determine the position of the local minimum point of the capacitance distribution graph Cm (Zp). Consequently, regardless of the sitting posture of the occupant sitting down on the seat 1, if the interelectrode capacitance of four or more back section electrodes can be measured, then even if the absolute value of the capacitance is small, the sitting shoulder height Ht of the occupant can be accurately detected, and the size of the occupant can be accurately determined. In the present embodiment, the description is such that each of the back section electrodes 411 to 415 are single electrodes with the length in the x-direction approximately equal to the length in the x-direction of the backrest section 1b. However, for example, as shown in FIG. 21A, provided the detectable capacitance is sufficient, the length in the x-direction of the back section electrodes 411 to 415 need only be at least longer than the width of the occupant's neck, and it is not necessary to standardize the length of the respective electrodes. Moreover, as shown in FIG. 21B, the respective electrodes may be arranged separated in the x-direction and the z-direction, in a so-called matrix state. If the electrodes are arranged in this manner, it becomes possible to also detect the height of the occupant for example in the x-direction and the z-direction, so that it is possible to accurately determine the sitting posture of the occupant and whether the occupant is an adult or a child.

Next is a description of a modified example of the first embodiment. In this modified example, in the capacitance detection between the respective seat section electrodes and the occupant, capacitance detection is possible between the seat section electrodes and the occupant, with errors which occur in the case where the occupant approaches very close to or contacts the surrounding car-body metal parts eliminated. The capacitance between the seat section electrode and the occupant with this error eliminated is used as the measurement capacitance for the respective seat section electrodes.

Firstly, the theory of the method for detecting the capacitance between the seat section electrodes and the occupant with this error eliminated, is described using a specific example.

Figure 8A:
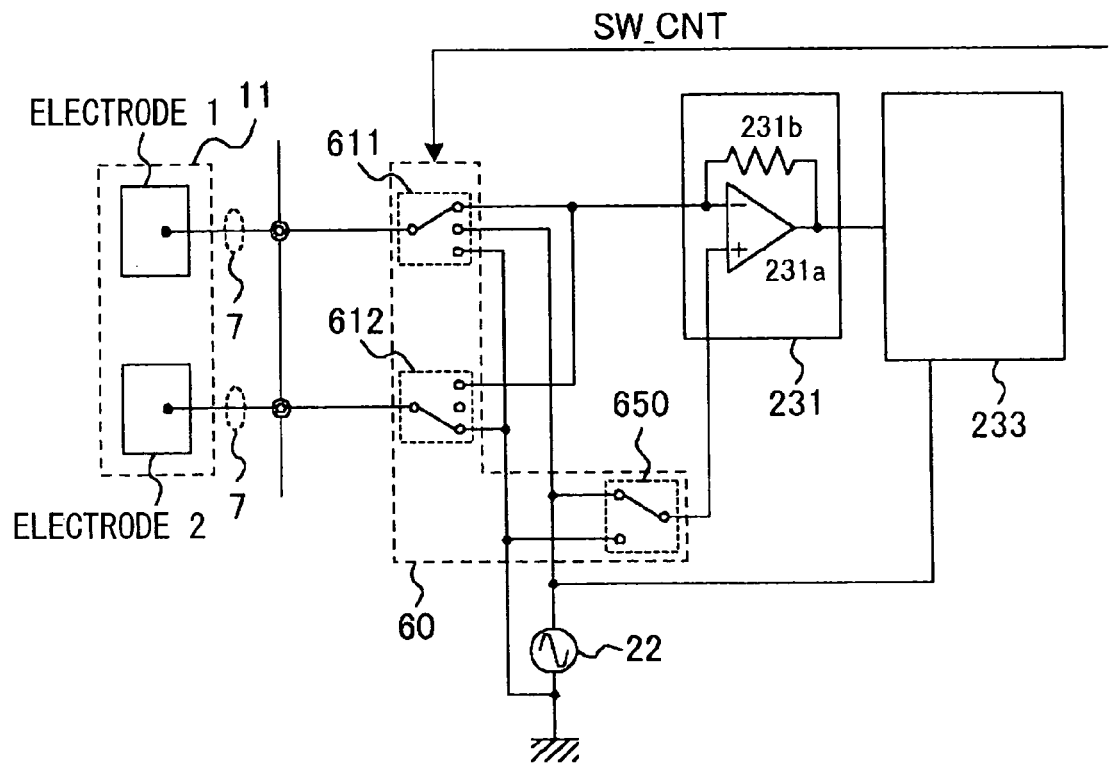
FIG. 8A and FIG. 8B show equivalent circuits of the occupant and electrode part when a first sensor section comprises two seat section electrodes, respectively being a diagram showing the connection state of a switch of a switching circuit, and an equivalent circuit diagram, in an occupant detecting apparatus in the case where an electrode 1 is a transmitting electrode and an electrode 2 is a receiving electrode, and the detection capacitance C11 is detected based on the current flowing through the electrode 1.
Figure 8B:
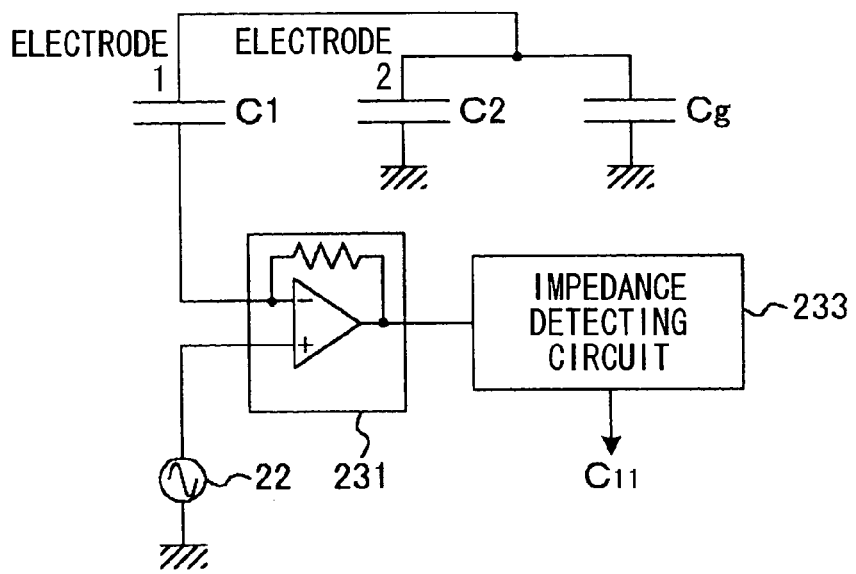
Figure 9A:
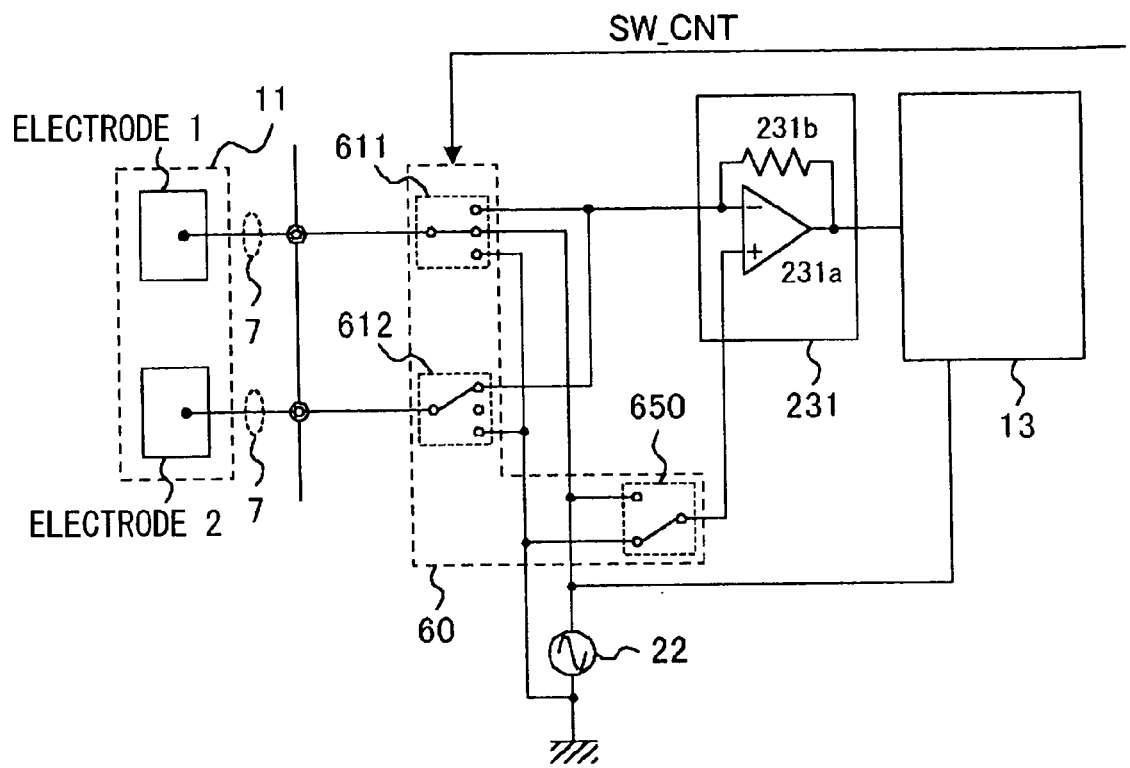
FIG. 9A and FIG. 9B show equivalent circuits of the occupant and electrode part when a first sensor section comprises two seat section electrodes, respectively being a diagram showing the connection state of a switch of a switching circuit and an equivalent circuit diagram in an occupant detecting apparatus in the case where an electrode 1 is a transmitting electrode and an electrode 2 is a receiving electrode, and the detection capacitance C12 is detected based on the current flowing through the electrode 2.
Figure 9B:
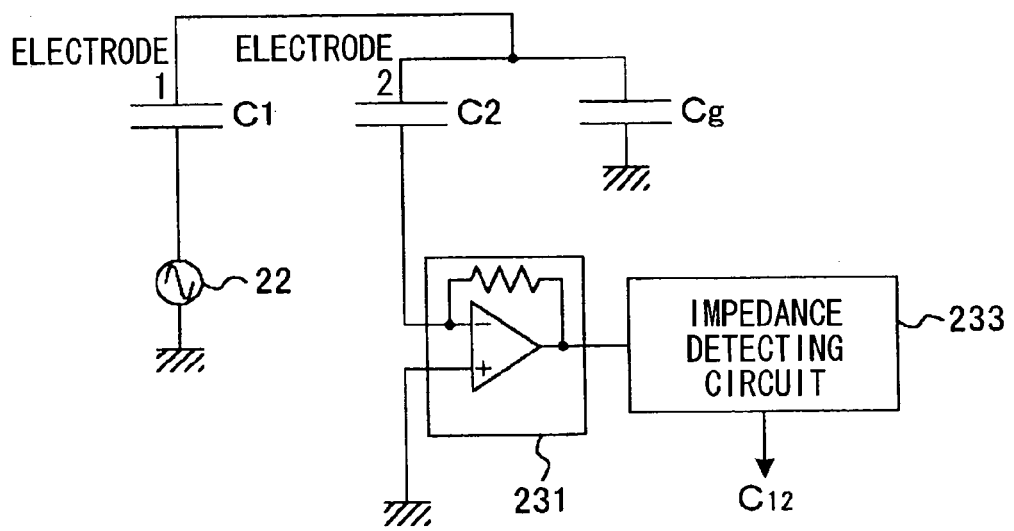

For easy understanding, FIG. 8A and FIG. 8B show equivalent circuits of the occupant and electrode part when a first sensor section comprises two seat section electrodes (electrode 1 and electrode 2), FIG. 8A and FIG. 8B respectively being a diagram showing the connection state of a switch of a switching circuit 60, and an equivalent circuit diagram, in an occupant determination apparatus in the case where an output signal (first signal) from the oscillator 22 is applied to the electrode 1 (hereunder, stated that 'electrode 1 is a transmitting electrode') and the electrode 2 is a fixed potential (GND potential) (hereunder, stated that 'electrode 2 is a receiving electrode'), and the detection capacitance C11 is detected based on the current flowing through the electrode 1. Moreover, FIG. 9A and FIG. 9B are respectively a diagram showing the connection state of a switch of a switching circuit 60, and an equivalent circuit diagram in an occupant determination apparatus in the case where an electrode 1 is a transmitting electrode and an electrode 2 is a receiving electrode, and the detection capacitance C12 is detected based on the current flowing through the electrode 2.

In the equivalent circuits shown in FIG. 8A, FIG. 8B, FIG. 9A, and FIG. 9B, the capacitance viewed from the electrode 1 side, that is, the detection capacitance C11 detected based on the current flowing through the electrode 1, and the capacitance viewed from the electrode 2 side, that is, the detection capacitance C12 detected based on the current flowing through the electrode 2, can be expressed by the following equations, assuming that the capacitance between the occupant and the electrode 1 is C1, the capacitance between the occupant and the electrode 2 is C2, and the capacitance between the occupant and the GND is Cg.

$$C11 = C1 \times (C2+Cg)/(C1+C2+Cg) \tag{1}$$

$$C12 = C1 \times C2/(C1+C2+Cg) \tag{2}$$

Moreover, the capacitance viewed from the electrode 2 side, that is, the detection capacitance C22 detected based on the current flowing through the electrode 2, and the capacitance viewed from the electrode 1 side, that is, the detection capacitance C21 detected based on the current flowing through the electrode 1, can be expressed by the following equations, similarly to the cases of C11 and C12, since the electrode 1 and the electrode 2 are exchanged in the equivalent circuits shown in FIG. 8A, FIG. 8B, FIG. 9A, and FIG. 9B.

$$C22 = C2 \times (C1+Cg)/(C1+C2+Cg) \tag{3}$$

$$C21 = C1 \times C2/(C1+C2+Cg) \tag{4}$$

If both sides of equation (2) are subtracted from both sides of equation (1) and both sides of the equation (4) are subtracted from both sides of the equation (3), the followings equations are obtained;

$$C11-C12=C1\times Cg/(C1+C2+Cg) \quad (5)$$

$$C22-C21=C2\times Cg/(C1+C2+Cg) \quad (6)$$

and if both sides of the equation (5) are respectively divided by both sides of equation (6), the following equation is obtained;

$$(C11-C12)/(C22-C21)=C1/C2 \quad (7)$$

Next, if both sides of the equation (7) are respectively multiplied by both sides of equation (2), the following equation is obtained;

$$C12\times(C11-C12)/(C22-C21)=C1^2/(C1+C2+Cg) \quad (8)$$

and if both sides of equation (8) are added to both sides of equation (1), the following equation is obtained;

$$C11+C12\times(C11-C12)/(C22-C21)=C1\times(C2+Cg)/(C1+C2+Cg)+C1^2/(C1+C2+Cg) \quad (9)$$

Since the right side of this equation is the capacitance C1, then C1 can be expressed by the following equation;

$$C1=C11+C12\times(C11-C12)/(C22-C21) \quad (10)$$

Similarly, the capacitance C2 can be expressed by the following equation.

$$C2=C22+C21\times(C22-C21)/(C11-C12) \quad (11)$$

As can be seen from the obtained equation (10) and equation (11), both equations include only the detection capacitance obtained from the current detecting circuit 231 and the impedance detecting circuit 233 by alternately switching the electrode 1 and 2 to the transmitting side and the receiving side of the first signal, and do not contain the component of the capacitance Cg between the occupant and the GND. Therefore, the respective capacitances C1 and C2 calculated by equation (10) and equation (11) are not affected by changes in the posture of the occupant.

Moreover, in the case where the occupant is not on the electrode 1 and 2, equations (1) to (4) all become the same value, and that value is extremely small. Therefore they may be configured to determine the occupant absence by providing a second threshold which is sufficiently lower than the threshold for determination of whether an adult or child.

Generally, assuming that the first sensor section comprises n seat section electrodes, the capacitance between the respective seat section electrodes and the occupant are C1, C2, to Cn, and the capacitance between the occupant and the GND is Cg, then if the i th (i is an integer of $1 \leq i \leq n$) seat section electrode is the transmitting side and the other seat section electrodes are receiving side, the detection capacitance which is extracted from the current flowing through the k th (k is an integer of $1 \leq k \leq n$) electrode, that is the capacitance Cik viewed from the k th electrode, can be expressed by the following equations;

$$C_{ik} = \frac{C_i \times C_k}{C_g + C_T} \quad \text{(when } k \neq i\text{)}$$

$$C_{ii} = \frac{C_i(C_g + C_T - C_i)}{C_g + C_T} \quad \text{(when } k = i\text{)}$$

where $$C_T = \sum_{k=1}^{n} C_k$$

From these equations, the capacitance Ci between an arbitrary seat section electrode i of the seat section electrodes included in the first sensor section and the occupant can be obtained by the following equation using the detection capacities of an arbitrary different three seat section electrodes k and the seat section electrode p (where p is an integer of $1 \leq p \leq n$) including the seat section electrode i;

$$Ci=Cii+Cik\times Cip/Ckp \quad (B)$$

where:

Cii is the detection capacitance of the seat section electrode i when the seat section electrode i is the transmitting electrode, Cik is the detection capacitance of the seat section electrode k when the seat section electrode i is the transmitting electrode Cip is the detection capacitance of the seat section electrode p when the seat section electrode i is the transmitting electrode, and Ckp is the detection capacitance of the seat section electrode p when the seat section electrode k is the transmitting electrode.

Next is a description of a configuration of the occupant determination apparatus for realizing the above-described method.

Figure 6:
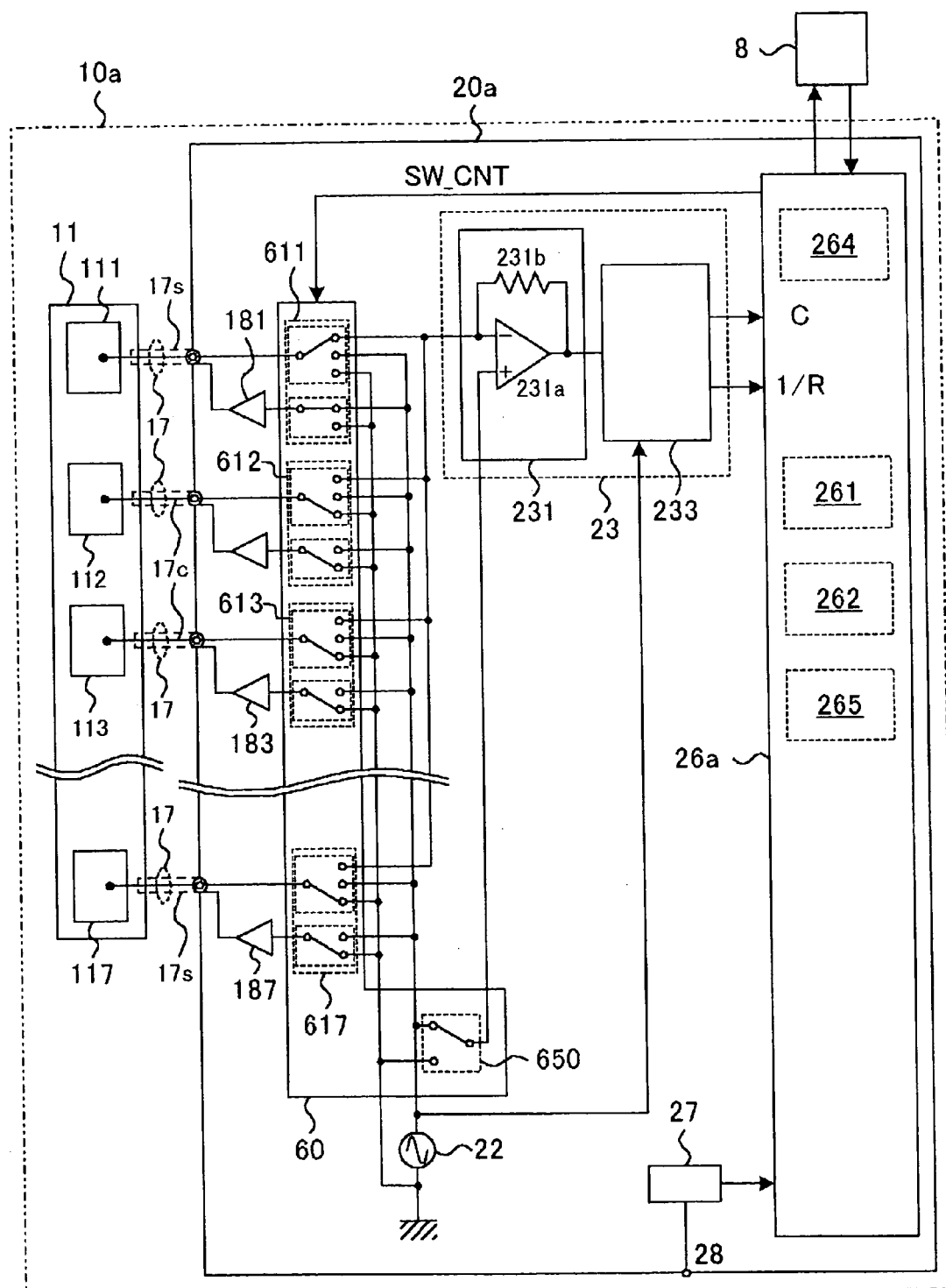
FIG. 6 is a schematic block diagram of a modified example of the first embodiment of the occupant determination apparatus of the present invention.

FIG. 6 is a schematic block diagram of an occupant determination apparatus 10*a* of a modified example of the first embodiment of the occupant determination apparatus. Referring to FIG. 6, the occupant determination apparatus 10*a* of this modified example comprises; a first sensor section 11 arranged on the seating section 1*a* which the occupant's buttocks contact, of the seat 1 on which the occupant sits; and a first determination section 20*a* which determines the size of the occupant sitting down on the seat 1 by measuring the capacitance formed at each of the seat section electrodes 111 to 117 of the first sensor section 11, using a first signal, that is an electric field generating signal for measuring the capacitance. Since the arrangements and the configurations of the seat 1 and the first sensor section 11 are exactly same as that of FIG. 1A and FIG. 1B, they are not shown.

That is to say, the difference of the occupant determination apparatus 10*a* from the occupant determination apparatus 10 of the first embodiment is the switching circuit 60 which is a switching device constituting the first determination section 20*a*, and a controlling section 26*a*. Therefore, hereunder these different parts are particularly described, and specific description of the same components as those of the first embodiment (the oscillator 22, the capacitance detecting section 23, and the power circuit 27) is omitted.

Figure 7A:
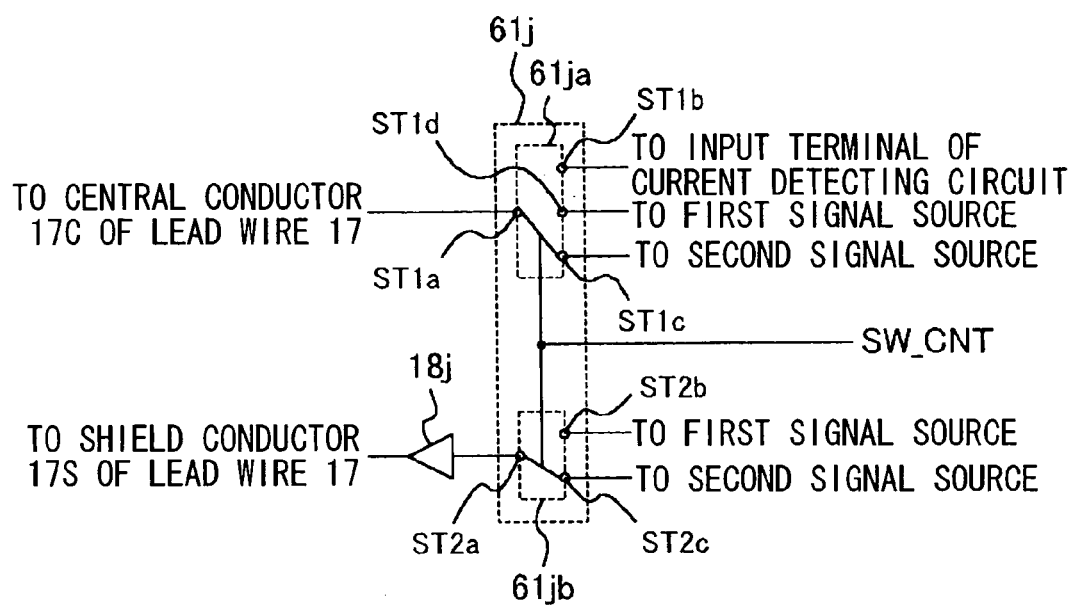
FIG. 7A and FIG. 7B are partially enlarged diagrams of components of a switching circuit, respectively being a block diagram showing a configuration example of an arbitrary second SWM, and an enlarged diagram of a third SW.
Figure 7B:
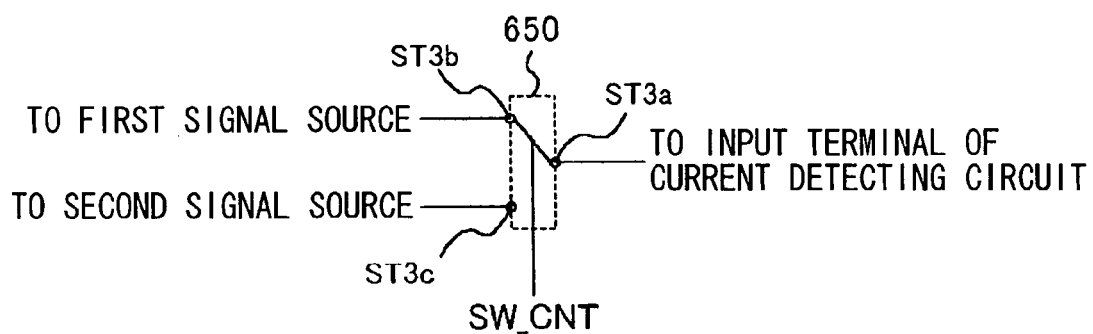

The switching circuit 60 comprises seven second SWMs 611 to 617 of the same configuration, connected one-to-one to the seat section electrodes 111 to 117, and a third SW 650 connected between the capacitance detecting section 23 and the signal source. Specifically, the seat section electrode 11*j* is connected to the second SWM 61*j*. FIG. 7A and FIG. 7B are partially enlarged diagrams of components of the switching circuit 60, FIG. 7A and FIG. 7B being respectively a block diagram showing a configuration example of an arbitrary second SWM 61*j*, and an enlarged diagram of the third SW 650. Referring to FIG. 7A, the second SWM 61*j* comprises a fourth SW 61*ja* and a fifth SW 61*jb*. The fourth SW 61*ja* respectively connects; a terminal ST1*a* to a central conductor 17*c* of a lead wire 17 which connects to the corresponding seat section electrode 11*j*, a terminal ST1*b* to the capacitance detecting section 23, a terminal ST1*c* to a GND potential supplying terminal, and a terminal ST1*d* to an output terminal of the oscillator 22, so that the terminal ST1a can be switched for conducting to either the terminal ST1b or the terminal ST1c by the switch control signal SW_CNT. The fifth SW 61jb respectively connects; a terminal ST2a to the input terminal of a buffer circuit 18j, a terminal ST2b to the output terminal of the oscillator 22, and a terminal ST2c to the GND potential supplying terminal, so that the terminal ST2a can be switched for conducting to either the terminal ST2b or the terminal ST2c by the switch control signal SW_CNT. Moreover, the output terminal of the buffer circuit 18j is connected to a shield section 17s of the lead wire 17 which connects the seat section electrode 11j and the fourth SW61ja. However, it is also possible to directly connect the terminal ST2a and the shield section 17s by omitting the buffer circuit 18j. If the shielded wire is not used for the lead wire 17 which connects the seat section electrode 11j and the fourth SW61ja, the fifth SW61jb and the buffer circuit 18j are unnecessary.

Moreover, the third SW 650 respectively connects a terminal ST3a to the non inverting input terminal of the current detecting circuit 231, a terminal ST3b to the output terminal of the oscillator 22, and a terminal ST3c to the GND potential supplying terminal, so that the terminal ST3a can be switched for conducting to either the terminal ST3b or the terminal ST3c by the switch control signal SW_CNT.

The fourth SW61ja and the fifth SW61jb are controlled such that the terminal ST2a is conducted to the terminal ST2b when the terminal ST1a is conducted to the terminal ST1b, and the terminal ST2a is conducted to the terminal ST2c when the terminal ST1a is conducted to the terminal ST1c. Moreover, when the terminal ST1a is conducted to the terminal ST1d, then if the terminal ST3a in the third SW 650 is conducted to the terminal ST3b, the terminal ST2a is conducted to the terminal ST2b, and if the terminal ST3a in the third SW 650 is conducted to the terminal ST3c, the terminal ST2a is conducted to the terminal ST2c.

The controlling section 26a comprises; a capacitance calculating device 265 which calculates the capacitance which is the measurement capacitance between the respective seat section electrodes and the occupant, eliminating the capacitance between the occupant and the GND potential, based on the respective detection capacitances of the seat section electrodes 111 to 117 extracted by the capacitance detecting section 23; a selecting device 261 which sets one of the seat section electrodes 112 to 117 included in the reference electrode arrays 12a and 12b as a reference electrode, based on this capacitance; a first calculating device 262 which determines the size of the occupant from the distance between the occupant and the reference electrode which is calculated from the capacitance and the area of the reference electrode, and the capacitances of the seat section electrodes 111 to 117, and outputs a first controlling signal for controlling the propriety of airbag deployment based on the determination result; and a switch signal generating device 264 which outputs a switch control signal SW_CNT. This controlling section 26a may also comprise an MPU and its controlling program, or the like.

Next is a description of a method for calculating the capacitance between the seat section electrodes 111 to 117 in the occupant determination apparatus 10a having the above configuration, together with the operation of the occupant determination apparatus 10a. Firstly, extraction of the detection capacitances of the respective seat section electrodes is described with an example of the case where the seat section electrode 11j is the transmitting electrode. The fifth SW which connects to the shield section 17s of the lead wire 17 is not described hereunder in order to avoid complexity.

Firstly, the switching circuit 60 is set as follows. The terminal ST3a of the third SW 650 is conducted to the terminal ST3b, and the terminal ST1a of the fourth SW61ja of the second SWM61j is conducted to the terminal ST1b. Moreover, the fourth SW61ma of all the other second SWMs 61m (where m is an integer of $1 \leq m \leq 7$ and $m \neq j$) conducts the terminal ST1a to the terminal ST1c. In this state, the capacitance detected by the capacitance detecting section 23 becomes the detection capacitance C(j)jj of the seat section electrode 11j when the seat section electrode 11j is the transmitting electrode.

Next, the setting of the switching circuit 60 is modified. The terminal ST3a of the third SW 650 is conducted to the terminal ST3c, and the terminal ST1a of the fourth SW61ja of the second SWM61j is conducted to the terminal ST1d. Moreover, regarding the other second SWM, the fourth SW61ma of any arbitrary one of the second SWMs 61m conducts the terminal ST1a to the terminal ST1c, and the fourth SW61ua of all the rest of the second SWMs 61u (where u is an integer of $1 \leq u \leq 7$ and $u \neq m$) conducts the terminal ST1a to the terminal ST1c. In this state, the capacitance detected by the capacitance detecting section 23 becomes the detection capacitance C(m)jm of the seat section electrode 11m, which is the receiving electrode when the seat section electrode 11l is the transmitting electrode. Therefore, when the seat section electrode 11j is the transmitting electrode, seven detection capacitances C(m)jm can be obtained. If this is repeatedly performed for all of j=1 to j=7, a total of forty nine detection capacitances C(m)jm can be extracted.

Next, using these detection capacitances C(m)jm, the capacitance C(j) between the occupant and an arbitrary seat section electrode 11j, which is not affected by the capacitance between the occupant and GND potential, is calculated from the equation (B) by the capacitance calculating device 265.

Then, assuming the capacitance C(j) as the detection capacitance of the seat section electrode 11j, similarly to the case of the first embodiment, firstly in reference electrode setting step, an electrode for which a normalized capacitance per unit area which is calculated from the detection capacitance is a maximum, among the seat section electrodes 112 to 117 included in the reference electrode arrays 12a and 12b, is selected and set as the reference electrode. Next, in a first size calculating step, a reference distance X is calculated from the area and the detection capacitance of the reference electrode. Then the effective areas of the respective seat section electrodes 11 are respectively calculated based on this reference distance X and the detection capacitances of the seat section electrodes 11. Furthermore, a predetermined measurement area is calculated based on these effective areas. Then, in a first determination step, the size of the occupant is determined by comparing this measurement area and a predetermined first standard value, and based on the determination result, a first controlling signal for controlling the propriety of airbag deployment is output to an occupant restraint device 8.

In this modified example, the detection of the capacitance viewed from the respective seat section electrodes becomes fairly complex. However, the influence due to the capacitance between the occupant and the GND potential is eliminated, so that the capacitances which are the measurement capacitances between the respective seat section electrodes and the occupant can be accurately calculated. Therefore, the size of the occupant can be more accurately determined.

Needless to say, regarding the calculating method for the capacitance between the seat section electrode and the occupant in this modified example, while detailed description is omitted, this can also be applied for calculating the capacitance between the back section electrode and the occupant in the second embodiment, and the calculated capacitance can be used as the measurement capacitance.

Next is a description of a third embodiment of the present invention.

Figure 10A:
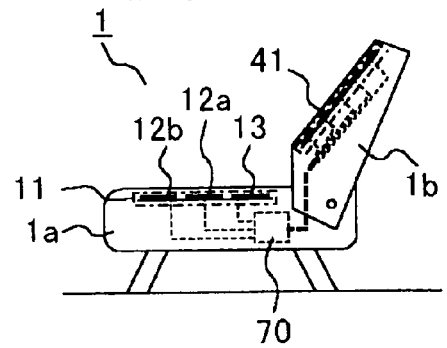
FIG. 10A and FIG. 10B are diagrams for explaining a third embodiment of the occupant determination apparatus of the present invention, being respectively a duplex type side view and a schematic block diagram of the occupant determination apparatus.
Figure 10B:
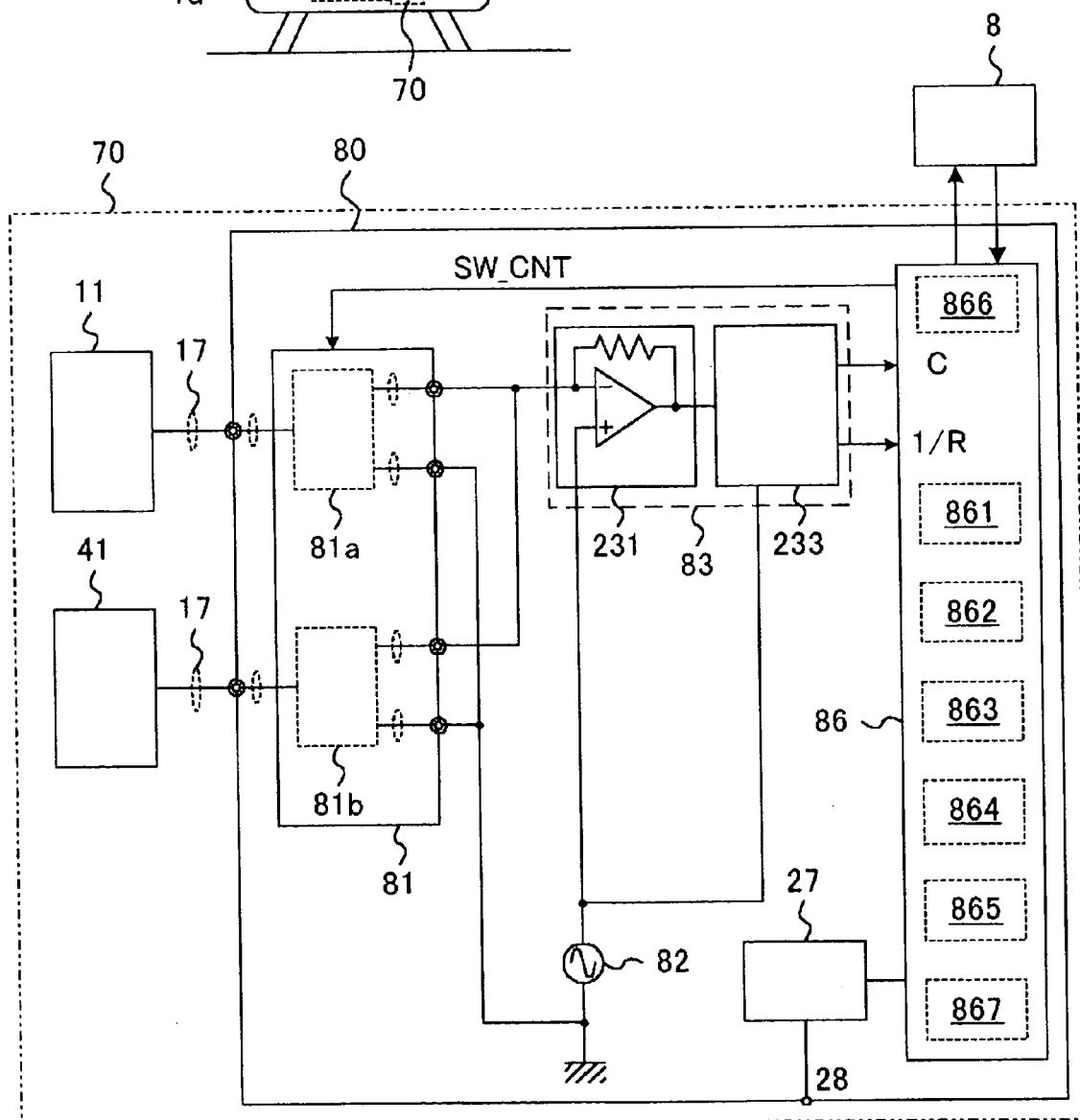

FIG. 10A and FIG. 10B are diagrams for explaining an occupant determination apparatus 70 of the present embodiment, FIG. 10A and FIG. 10B being respectively a duplex type side view and a schematic block diagram of the occupant determination apparatus 70.

Referring to FIG. 10A and FIG. 10B, the occupant determination apparatus 70 of the present embodiment comprises; a first sensor section 11 having seat section electrodes including a plurality of reference candidate electrodes arranged on a seating section 1*a* of a seat 1 having the seating section 1*a* on which the occupant sits and a backrest section 1*b*; a second sensor section 41 having a plurality of back section electrodes arranged on the backrest section 1*b*; and a third determination section 80 which determines the size of an occupant by respectively detecting the capacitance formed between the seat section electrodes and the capacitance formed between the back section electrodes using a predetermined first signal for measuring the capacitance. The configurations of the first sensor section 11 and the second sensor section 41 are respectively assumed to be the same as those of the first embodiment side (FIG. 1B) and the example of the second embodiment (FIG. 3B), and their drawings and description are omitted, but their drawings are referred to as necessary.

The third determination section 80 comprises: an oscillator 82 which is an electric field generating device which outputs a first signal; a capacitance detecting section 83 which is a capacitance measuring device which detects the capacitance between the respective seat section electrodes based on the current flowing through the respective seat section electrodes, and detects the capacitance between the respective back section electrodes based on the current flowing through the respective back section electrodes; a switching circuit 81 which is a switching device which sequentially switches the connection of the capacitance detecting section 83 to the plurality of seat section electrodes and the back section electrodes based on a switch control signal SW_CNT; and a controlling section 86 which is a controlling device which outputs the switch control signal.

The switching circuit 81 has; a SWM block 81*a* which comprises a first SWM which connects one-to-one to the seat section electrodes included in the first sensor section 11, and switches the connection of the seat section electrodes and the capacitance detecting section 83, and a SWM block 81*b* which comprises a first SWM which connects one-to-one to the back section electrodes included in the second sensor section 41, and switches the connection of the plurality of back section electrodes and the capacitance detecting section 83. The switching circuit 81 is controlled by the switch control signal SW_CNT so that only one of the plurality of seat section electrodes and back section electrodes is always connected to the capacitance detecting section 83. The SWM block 81*a* can be the same configuration as that of the switching circuit 21 in the first embodiment, and the SWM block 81*b* can be the same configuration as that of the switching circuit 51 in the second embodiment.

The capacitance detecting section 83 comprises a current detecting circuit 231 and an impedance detecting circuit 233, similarly to the cases of the first embodiment and the second embodiment.

The controlling section 86 has: a selecting device 861 which sets one of the reference candidate electrodes included in the reference electrode arrays as a reference electrode, based on the detection capacitance which is the detection capacitances of the respective seat section electrodes detected by the capacitance detecting section 83, considered as the measurement capacitance of the seat section electrodes; a first calculating device 862 which determines the size of an occupant from the distance between the occupant and the reference electrode which is calculated from the area and the detection capacitance of the reference electrode, and the detection capacitances of all seat section electrodes; a reference value storage device 863 which stores a reference curve Cs(z) in which the capacitance for each position on the backrest section 1*b* is preset so that the curve has an extreme value at a predetermined position; a capacitance distribution generating device 864 which generates a capacitance distribution graph Cm (z) based on the respective positions on the backrest section 1*b* of the back section electrodes included in the second sensor section, and the respective detection capacitances for where the detection capacitances extracted by the capacitance detecting section 83 are considered as the measurement capacitances of the seat section electrodes; a second calculating device 865 which determines the size of the occupant based on the capacitance distribution graph Cm(z) and the reference curve Cs(z); a third calculating device 866 which makes final determination of the size of the occupant based on the determination result of the first calculating device 862 and the determination result of the second calculating device 865; a switch signal generating device 867 which outputs a switch control signal SW_CNT; and a power circuit 27 which is connected to a battery or the like in a vehicle which is not shown, via a connector 28, and supplies the power for driving the whole third determination section 80.

In the controlling section 86, the selecting device 861 and the first calculating device 862 may have the same configurations respectively as the selecting device 261 and the first calculating device 262 in the first embodiment. The reference value storage device 863, the capacitance distribution generating device 864 and the second calculating device 865 may have the same configurations respectively as the reference value storage device 561, the capacitance distribution generating device 562 and the second calculating device 563 in the second embodiment. Moreover, the third calculating device 866 determines the occupant as an adult if either of the determination result of the first calculating device 862 and the determination result of the second calculating device 865 shows an adult, and determines the occupant as a child if both of the determination results show a child, and outputs a first controlling signal for controlling the propriety of airbag deployment to an occupant restraint device 8. This controlling section 86 also may comprise an MPU and its controlling program, or the like.

The operation of the occupant determination apparatus 70 of the present embodiment is the same as the operation of the respective components of the first embodiment and the second embodiment except for the third calculating device 865, and hence the description is omitted.

Figure 19:
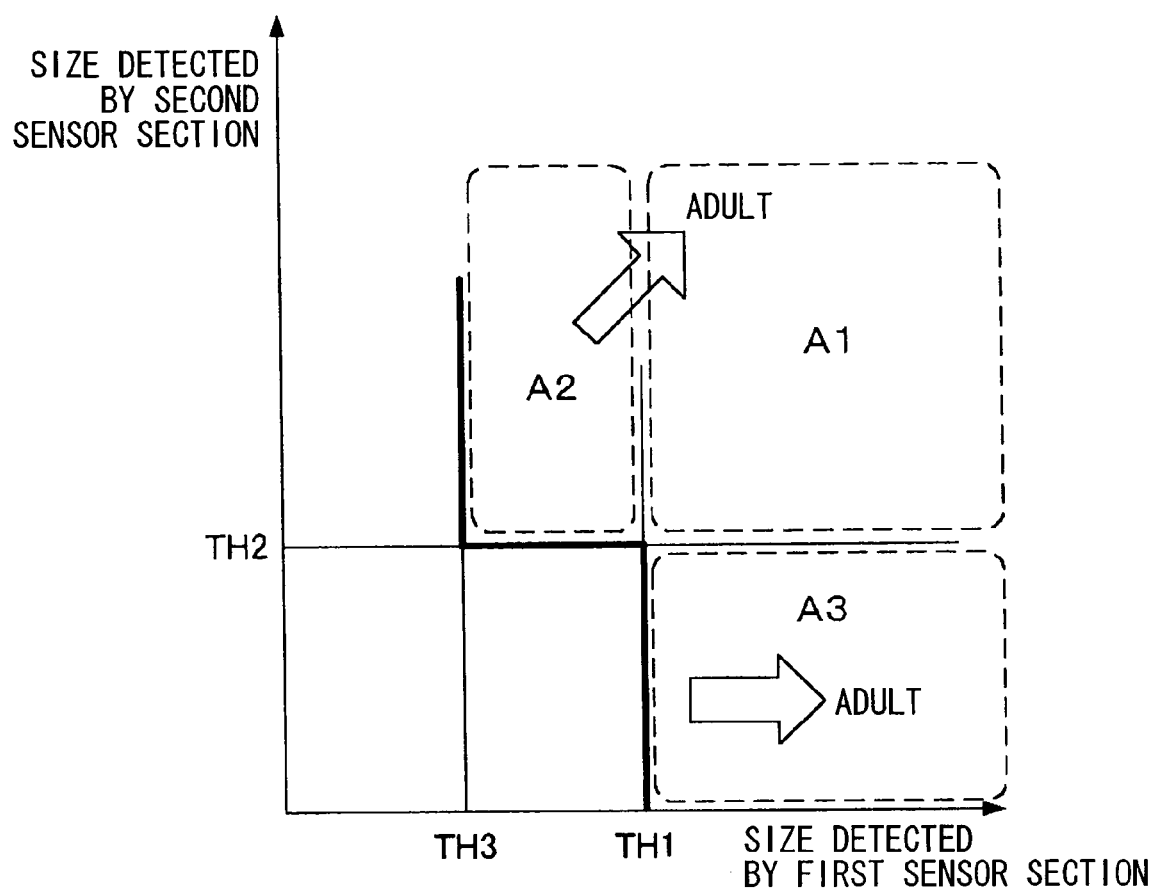
FIG. 19 is a diagram for explaining the determination characteristic in an occupant determination apparatus provided with the first sensor section and the second sensor section.

According to the present embodiment, even in the case where the sitting posture of the occupant is abnormal, for example, when the occupant is sitting on the edge of the seating section 1*a*, so that the determination result from the first sensor section 11 becomes that for a child, although the occupant is an adult, since the determination result from the second sensor section 41 normally becomes that for an adult due to the characteristic where the sitting shoulder height Ht of the occupant hardly changes as long as the occupant is sitting down, an accurate first controlling signal can be output corresponding to the size of the occupant. FIG. 19 is a diagram for explaining the determination characteristic in an occupant determination apparatus provided with the first sensor section 11 and the second sensor section 41, assuming that the horizontal axis is the size of the occupant detected by the first sensor section and the vertical axis is the size of the occupant detected by the second sensor section. This is a duplex type graph shown together with a determination threshold TH1 being the first standard value, and a determination threshold TH2 being the second standard value. That is to say, for example, if the condition is ideal for the occupant determination apparatus with an adult occupant sitting down on the center in the seat 1 and leaning on the backrest section 1b, both of the detection size of the first sensor section 11 and the detection size of the second sensor section 41 are in the region A1. However, in the case where the occupant is abnormally sitting down shifted to the corner or the edge of the seating section 1a, the detection size of the first sensor section 11 becomes smaller than the threshold TH1, and if leaning to the backrest section 1b, the detection size of the second sensor section 41 becomes larger than the threshold TH2. Moreover, in the case where the occupant is normally sitting down in the center of the seating section 1a, but their manner of sitting is slouching so they are far from the backrest section 1b, the detection size of the first sensor section 1 becomes larger than the threshold TH1 while the detection size of the second sensor section 41 becomes smaller than the threshold TH2. Consequently, if any of the determination result of the first sensor section 11 or the second sensor section 41 shows an adult, it is determined that the occupant is an adult. Therefore, the effect is obtained that an accurate determination can be made, even with an erroneous determination result for the A2 area or the A3 area by only one of these sensor sections.

Figure 17:
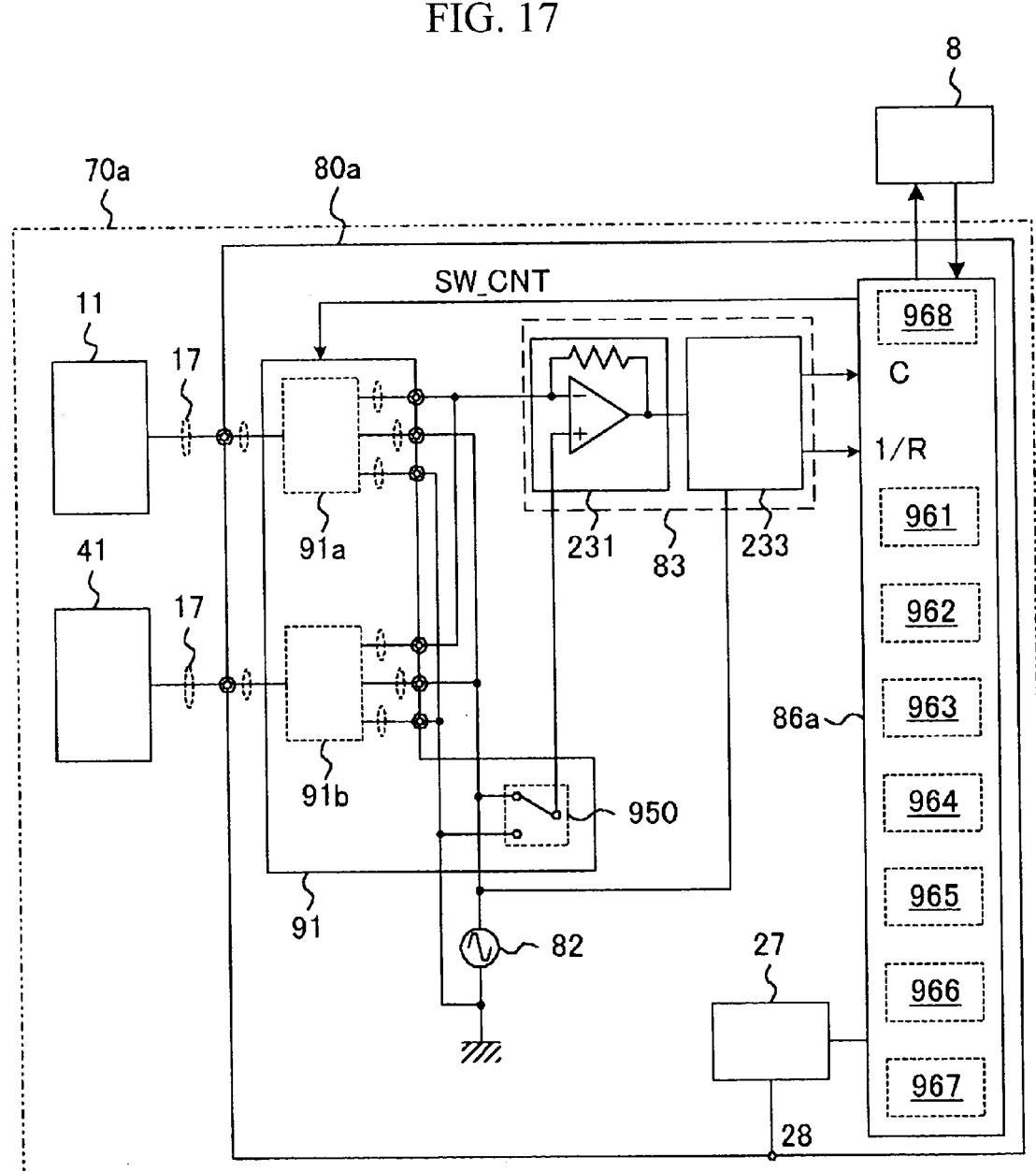
FIG. 17 is a schematic block diagram of a modified example of the third embodiment of the occupant determination apparatus of the present invention.

Next is a description of an occupant determination apparatus 70a of a modified example of the present embodiment. FIG. 17 is a schematic block diagram of the occupant determination apparatus 70a of the modified example. Referring to FIG. 17, the occupant determination apparatus 70a of this modified example comprises; a first sensor section 11 having seat section electrodes including a plurality of reference candidate electrodes; a second sensor section 41 having a plurality of back section electrodes; and a third determination section 80a which determines the size of an occupant by respectively detecting the capacitance formed between the seat section electrodes and the capacitance formed between the back section electrodes using a predetermined first signal for measuring the capacitance. The configuration of this third determination section 80a is partially different from the configuration of the third determination section 80.

The third determination section 80a comprises; an oscillator 82, a capacitance detecting section 83, a switching circuit 91 which is a switching device which sequentially switches the connection of the capacitance detecting section 83 to the plurality of seat section electrodes and the back section electrodes based on a switch control signal SW_CNT, and a controlling section 86a which is a controlling device which outputs the switch control signal.

The switching circuit 91 has, a SWM block 91a which comprises second SWMx which connect one-to-one to the seat section electrodes included in the first sensor section 11, and switches the connection of the seat section electrodes and the capacitance detecting section 83, a SWM block 91b which comprises second SWMa which connect one-to-one to the back section electrodes included in the second sensor section 41, and switches the connection of the plurality of back section electrodes and the capacitance detecting section 83, and a third SW 950. The switching circuit 91 is controlled by the switch control signal SW_CNT so that only one of the plurality of seat section electrodes and the back section electrodes is always connected to the capacitance detecting section 83. Either one of the SWM block 91a or SWM block 91b may be constituted by the first SWM.

The controlling section 86a has: a capacitance calculating device 961 which calculates the capacitances which are the measurement capacitances between the seat section electrodes, the occupant, and the back section electrodes from the detection capacitance detected by the capacitance detecting section 83; a selecting device 962 which sets one of the reference candidate electrodes included in the reference electrode arrays as a reference electrode, based on the capacitances between the seat section electrodes and an occupant which are calculated by the capacitance calculating device 961; a first calculating device 963 which determines the size of the occupant from the distance between the occupant and the reference electrode which is calculated from the area and the capacitance of the reference electrode, and the capacitances of all the seat section electrodes; a reference value storage device 964 which stores a reference curve Cs(z) in which the capacitance for each position on the backrest section 1b is preset so that the curve has an extreme value at a predetermined position; a capacitance distribution generating device 965 which generates a capacitance distribution graph Cm(z) based on the respective positions on the backrest section 1b of the back section electrodes included in the second sensor section, and the capacitances which are the measurement capacitances of the back section electrodes calculated from the respective detection capacitances detected by the capacitance detecting section 83; a second calculating device 966 which determines the size of the occupant based on the capacitance distribution graph Cm(z) and the reference curve Cs(z); a third calculating device 967 which makes final determination of the size of the occupant based on the determination result of the first calculating device 963 and the determination result of the second calculating device 966; a switch signal generating device 968 which outputs a switch control signal SW_CNT, and a power circuit 27 which is connected to a battery or the like in a vehicle which is not shown, via a connector 28, and supplies the power for driving the whole third determination section 80a. This controlling section 86a also may comprise an MPU and its controlling program, or the like, except for the reference value storage device 964. According to this configuration, for the occupant and at least one of the first sensor section II and the second sensor section 41, the capacitances between the respective electrodes can be calculated, with the influence of the capacitance between the occupant and the GND potential eliminated. Therefore, the size of the occupant can be more accurately determined.

Also, for any of the above embodiments, in the case where an occupant absence detecting device which is not shown (normally occupant absence is detected by a signal from the first sensor section 11) outputs an occupant absence signal, the respective controlling sections output an occupant absence signal regardless of the determination results of the respective calculating devices.

Moreover, in the above description, the example is used for where the configuration of the first sensor section 11 is such that the two reference electrode arrays 12a and 12b and the second electrode array 13 as shown in FIG. 1B, are arranged mutually separate in the Y-direction with the second electrode array 13 the closest to the backrest section 1b. However, various modifications are possible. FIG. 11A, FIG. 11B, FIG. 12A, and FIG. 12B are plan views showing an arrangement example of the seat section electrodes in the first sensor section 11.

Figure 11A:
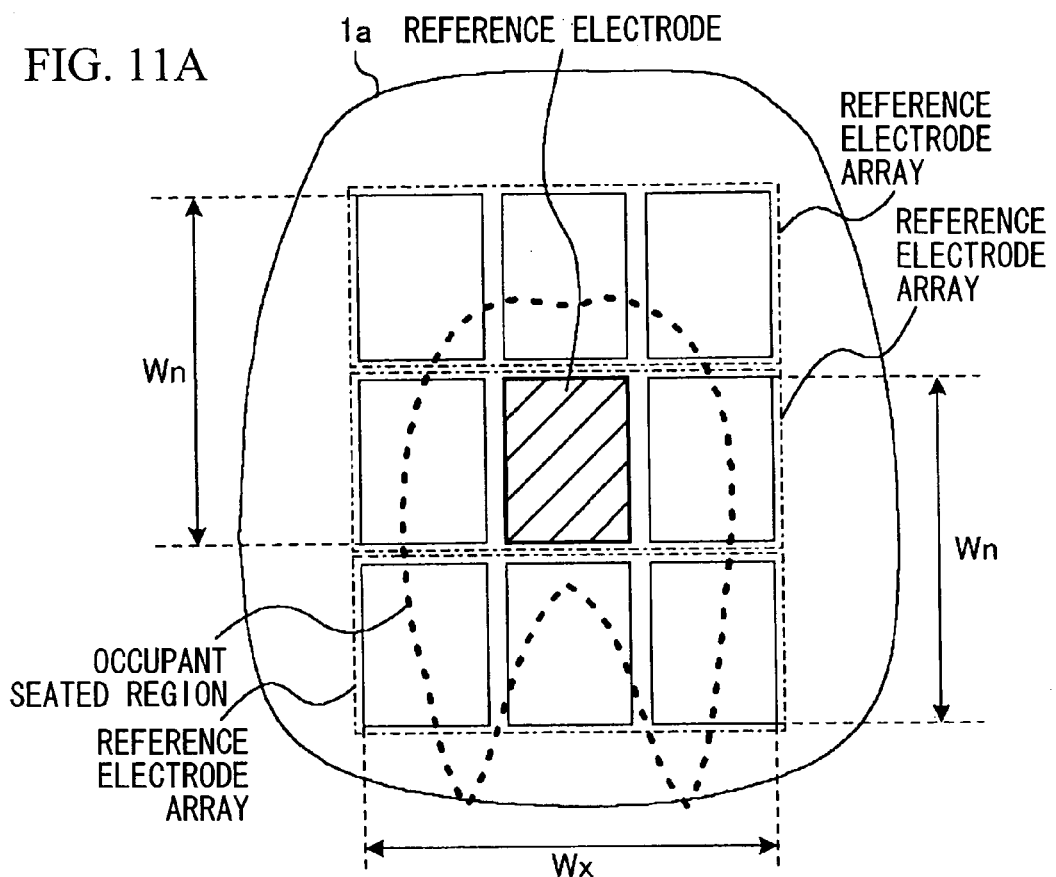
FIG. 11A and FIG. 11B are plan views showing an arrangement example of the seat section electrodes in the first sensor section.
Figure 11B:
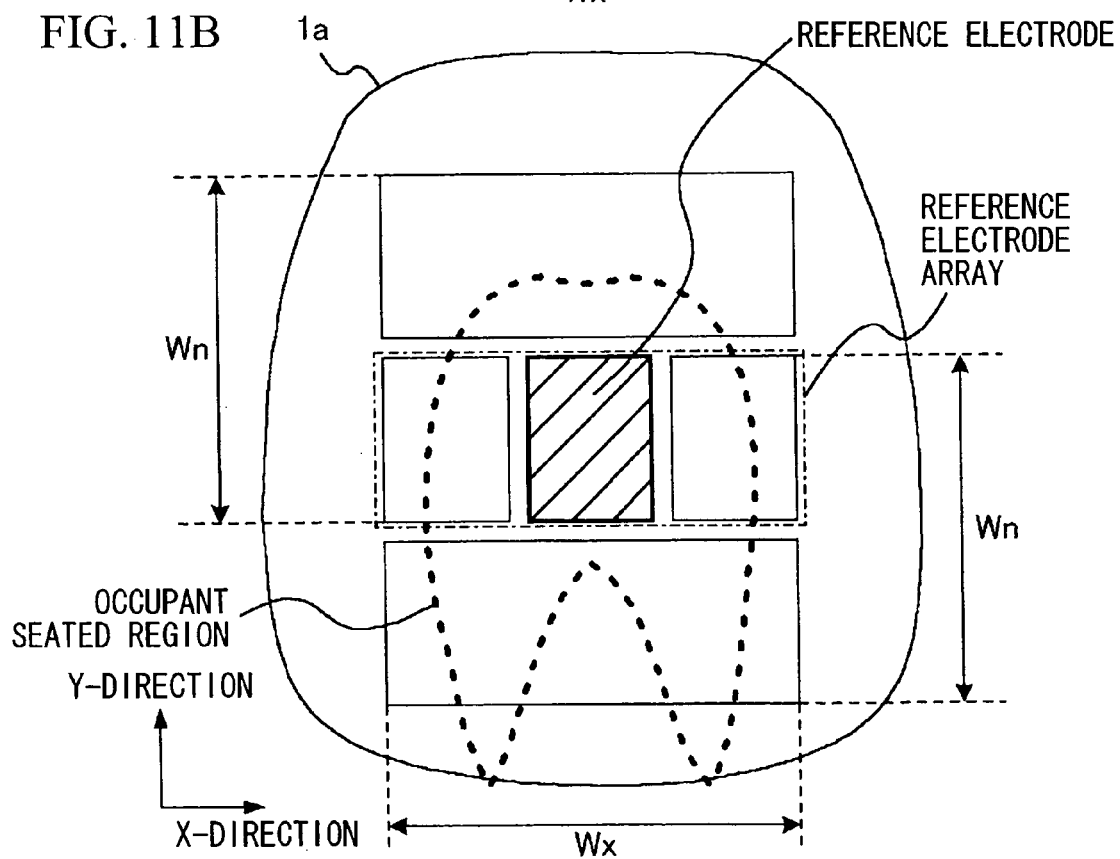

FIG. 11A is an example of where seat section electrodes all the same size are arranged in a 3×3 matrix. In this case, all of the seat section electrodes become reference candidate electrodes, and these provide three rows of reference electrode arrays separated in the Y-direction. In this case, since the areas of the seat section electrodes are uniform, then when setting the reference electrode, the reference candidate electrode where the detection capacitance is a maximum can be set as the reference electrode, omitting the calculation of the normalized capacitance. In FIG. 11B there is provided one reference electrode array where three seat section electrodes, being the reference candidate electrodes, are arranged in one row in the X-direction, and two second electrode arrays, giving a configuration where these are mutually separated in the Y-direction and the reference electrode array is arranged between the two second electrode arrays. In this case, since the two second electrode arrays are provided, the area covered by the occupant also becomes large, and extraction of the detection capacitance is facilitated.

Figure 12A:
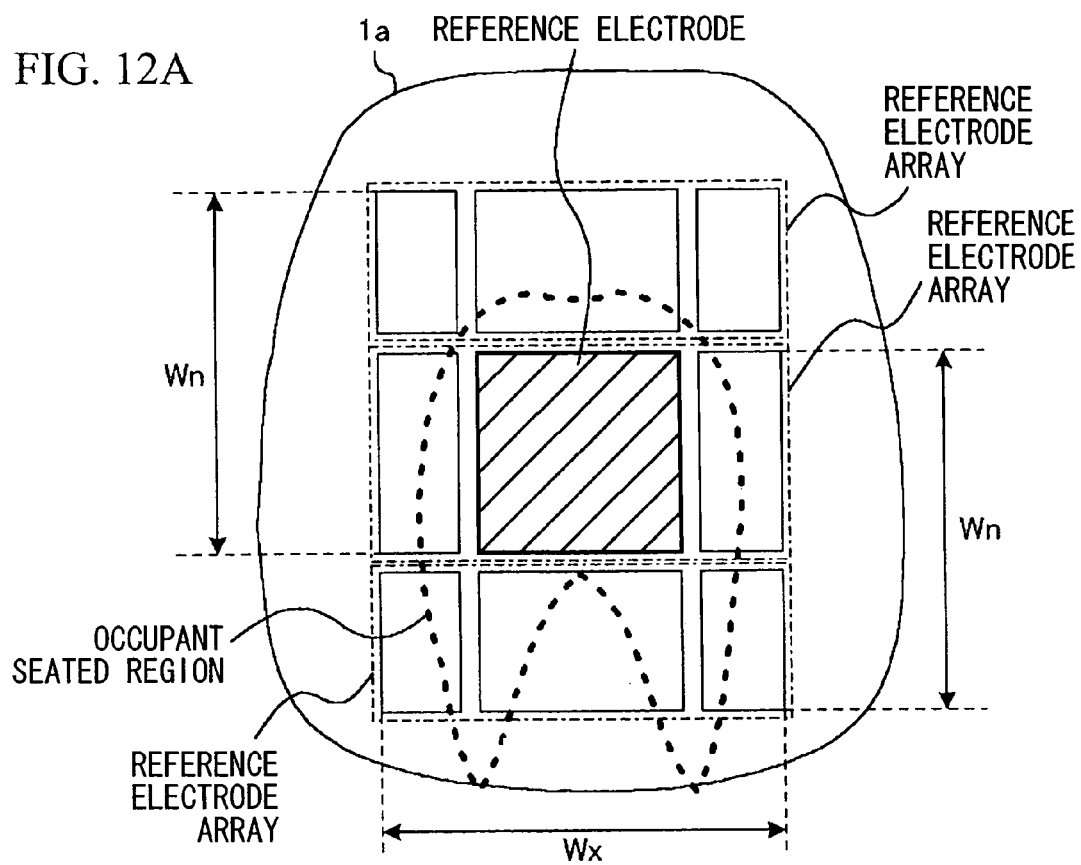
FIG. 12A and FIG. 12B are plan views showing an arrangement example of the seat section electrodes in the first sensor section.
Figure 12B:
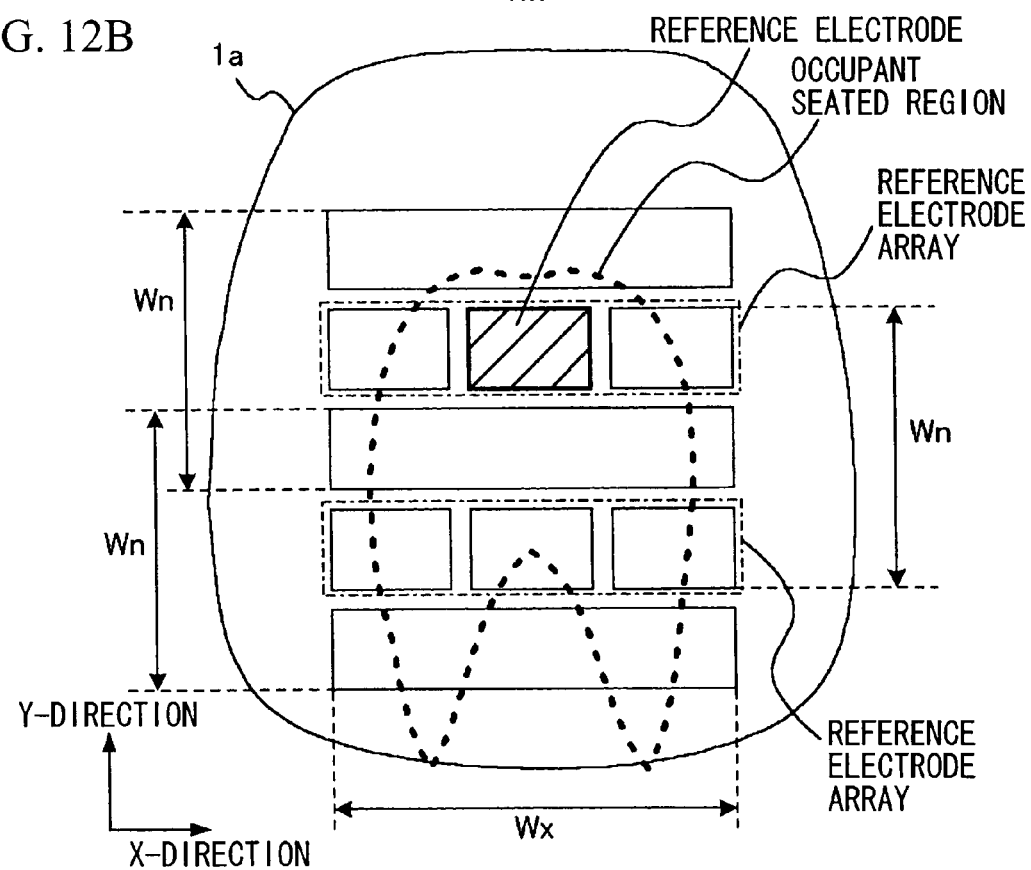
Figure 13A:
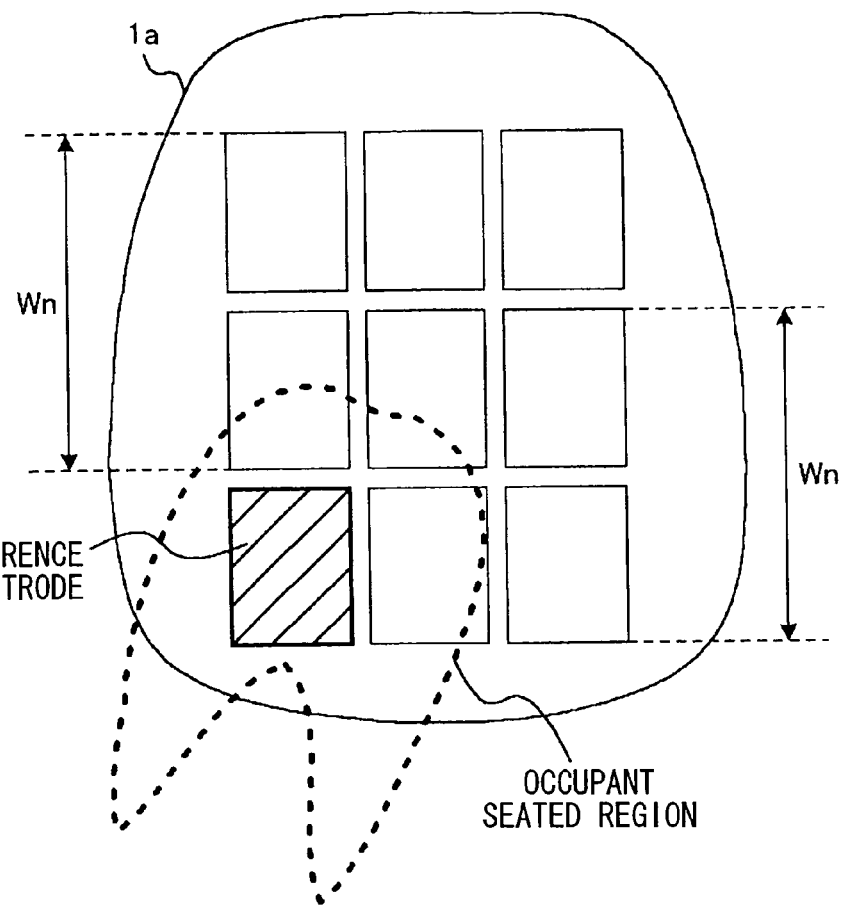
FIG. 13A and FIG. 13B show examples of a situation where the reference electrodes can be set even if the sitting position of the occupant shifts significantly, respectively corresponding to the arrangement examples of FIG. 11A and FIG. 12B.
Figure 13B:
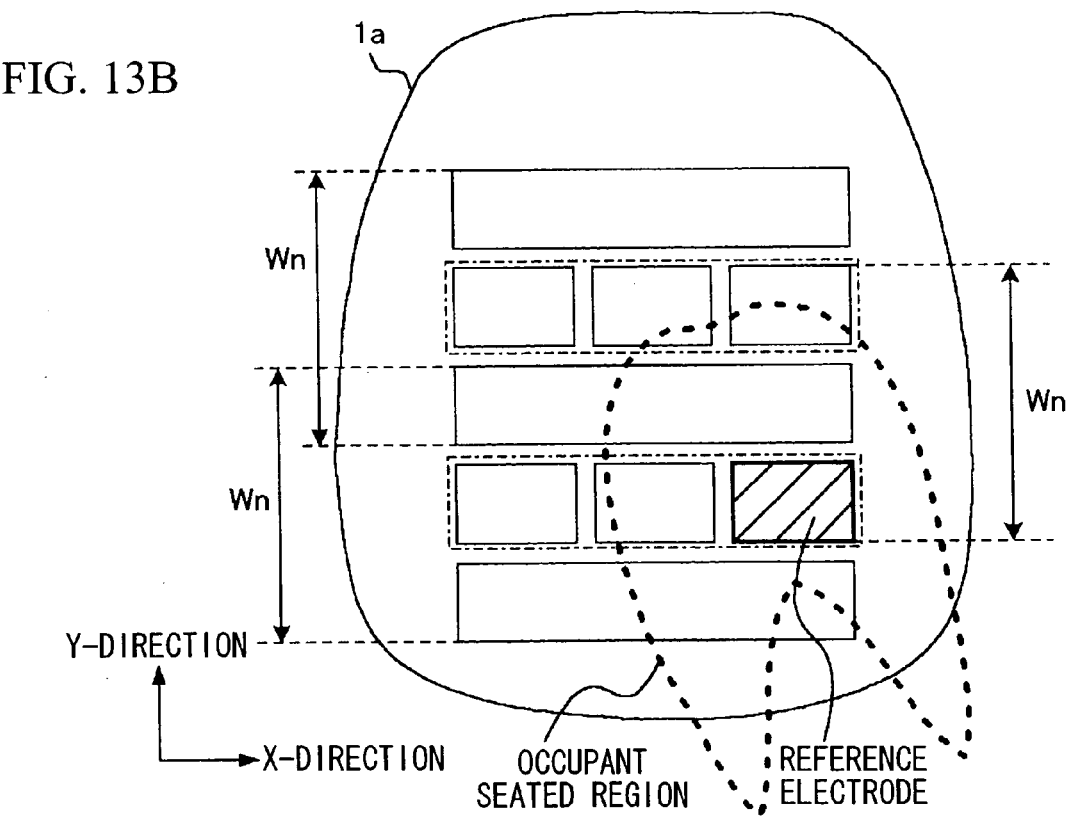
Figure 14:
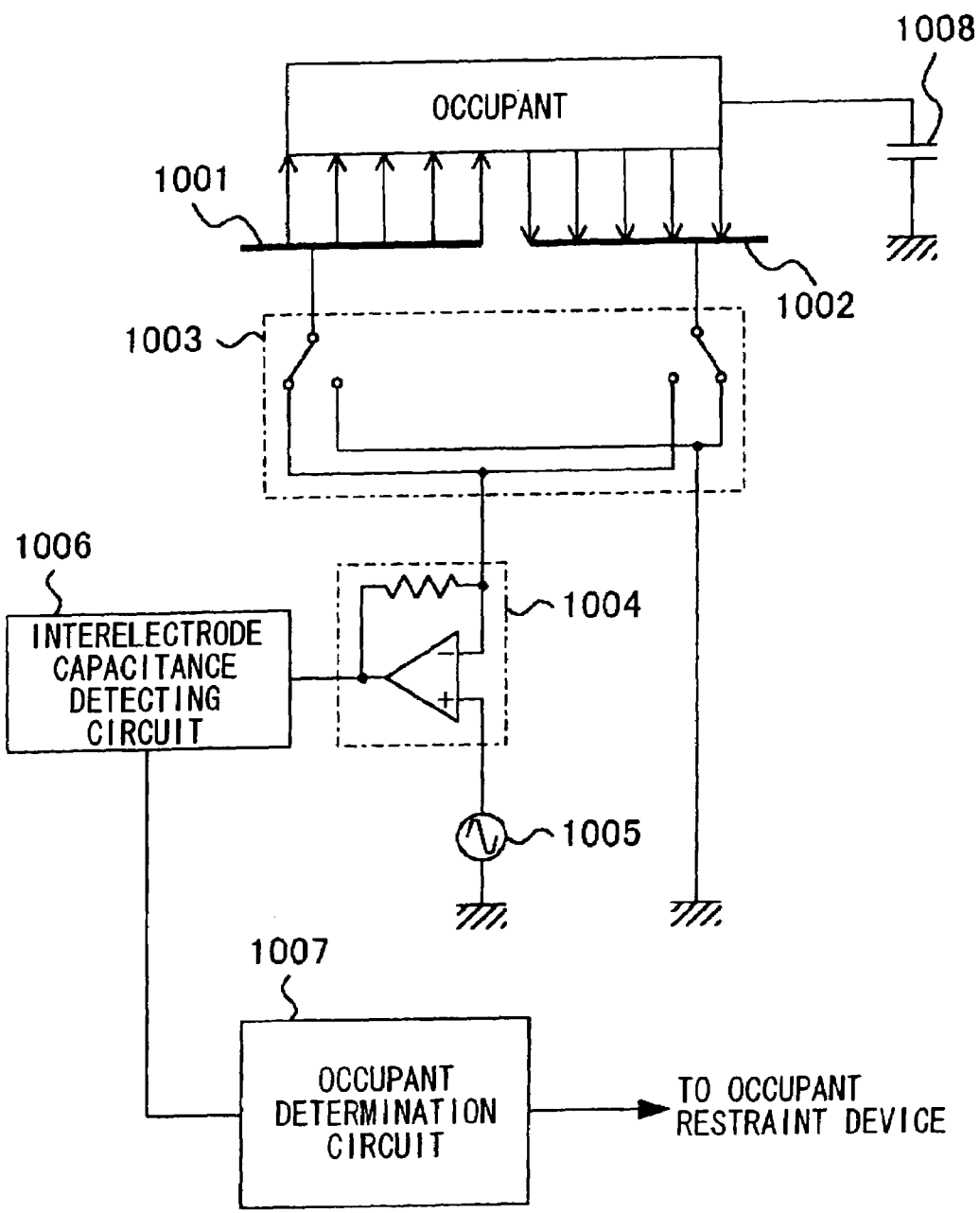
FIG. 14 shows a schematic configuration of an example of a conventional occupant determination apparatus.
Figure 16:
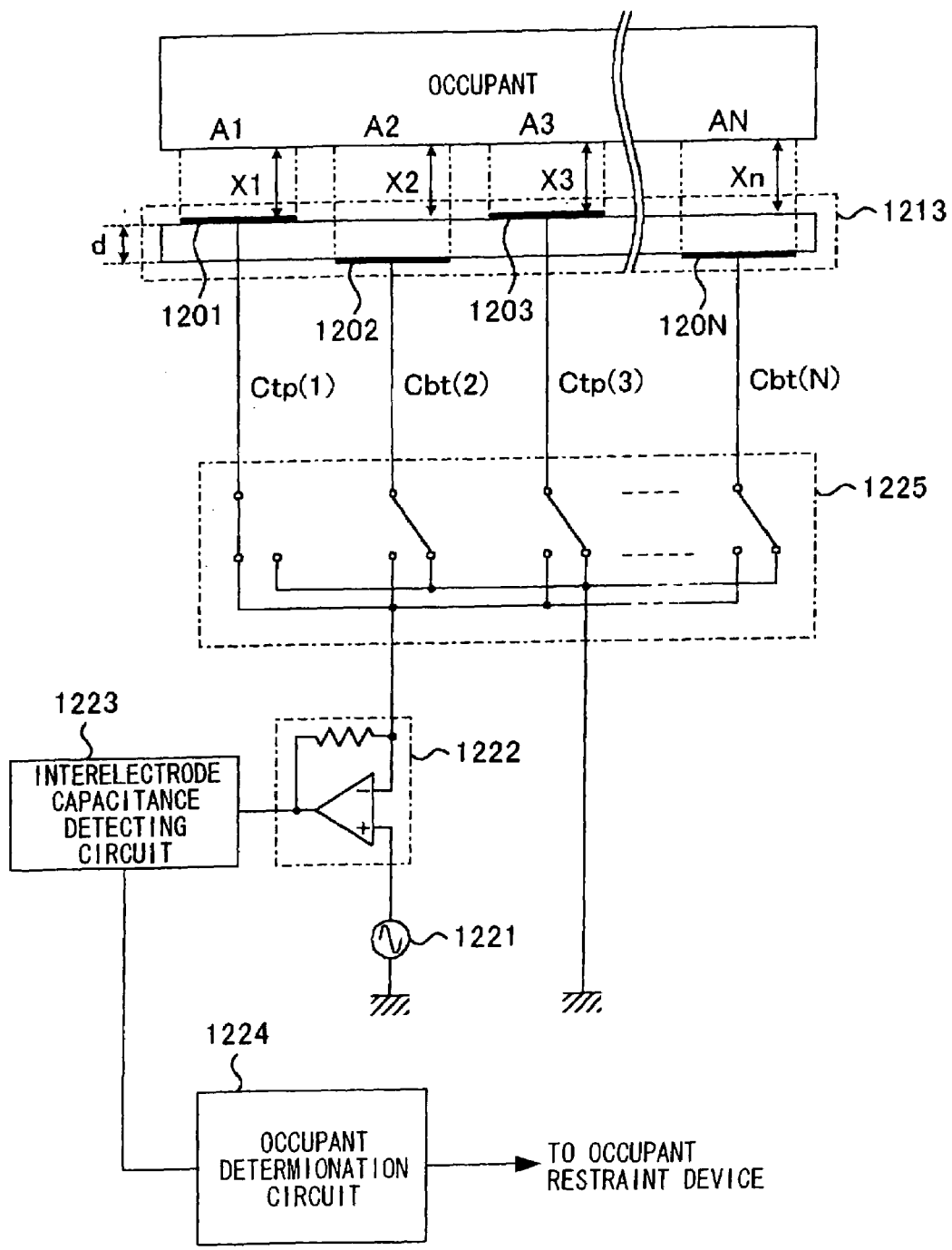
FIG. 16 shows an example of another conventional occupant determination apparatus.

FIG. 12A is an example where nine seat section electrodes, being reference candidate electrodes, are also arranged in a 3×3 matrix. However while the widths of the seat section electrodes arranged in the same line or same row in either the x-direction or the Y-direction are uniform, the widths in different lines or different rows are different, with the widths in the central line and the central row made large. Therefore, the area of the seat section electrode positioned in the center of the 3×3 matrix arrangement becomes a maximum. Since generally and frequently the occupant is sitting down in the central part of the seat, then in most cases this seat section electrode having the maximum area becomes the reference electrode, so that the calculation accuracy of the size of the occupant is improved. In FIG. 12B there is provided two reference electrode arrays where three seat section electrodes, being reference candidate electrodes, are arranged in one row in the x-direction, and three second electrode arrays, the configuration being such that these five electrode arrays are mutually separated in the Y-direction and the reference electrode arrays and the second electrode arrays are alternately arranged with the second electrode array closest to the backrest section 1b. Moreover, the three seat section electrodes constituting the reference electrode arrays have approximately the same size. In this case, the area of the reference candidate electrode becomes small and the error in the detection capacitance thus becomes slightly large. However there is a high possibility that the whole surface of any one of the reference candidate electrodes will be covered even if the sitting position of the occupant shifts significantly. Therefore setting of the reference electrode is facilitated. FIG. 13A and FIG. 13B respectively show examples of the situation where the reference electrodes in the arrangement examples of FIG. 11A and FIG. 12B can be set even if the sitting position of the occupant shifts significantly. In each case, the interval between the seat section electrodes in the x-direction and the Y-direction is about 2 cm but this is not particularly limited.

If this interval is too small, the parasitic capacitance between the adjacent seat section electrodes is increased, while if too large, the error in the measured area becomes large. Therefore, it should be appropriately set considering these factors. Furthermore, in each case, the length in the x-direction of the electrode arrays (end-to-end distance) Wx is longer than the width of an adult's buttocks, and becomes approximately equal within the first sensor section, and should normally be 30 cm or more.

Moreover, the present inventors, during a study of methods for accurately determining the size of the occupant (whether adult or child) regardless of the sitting posture, in the case where the occupant is sitting down in the seat 1, found from various observation results that when the occupant is sitting down on the seat 1, although the area of the occupant's legs varies significantly due to the sitting position or the sitting posture, the area of the occupant's buttocks is approximately constant for each occupant regardless of the sitting position or the sitting posture. Therefore, as in the examples shown in FIG. 1B, FIG. 11A, FIG. 11B, FIG. 12A and FIG. 12B, the electrode arrays mutually adjacent in the Y-direction are multiply combined so that their end-to-end distance Wn is within a range of 10 to 30 cm (preferably about 20 cm). Then when detecting the size of the occupant with the first sensor section 11, only the detection capacitance of the seat section electrode constituting the electrode array including the first reference electrode array which includes the set reference electrode, and which is arranged with the distance corresponding to the distance Wn in the Y-direction, within a predetermined distance or less in a range of about 15 to 30 cm (preferably about 20 cm), is used. Therefore, even in the case where the legs are on the first sensor section 11, the influence can be reduced, and hence the detection accuracy of the size of the occupant is further increased.

Figure 20A:
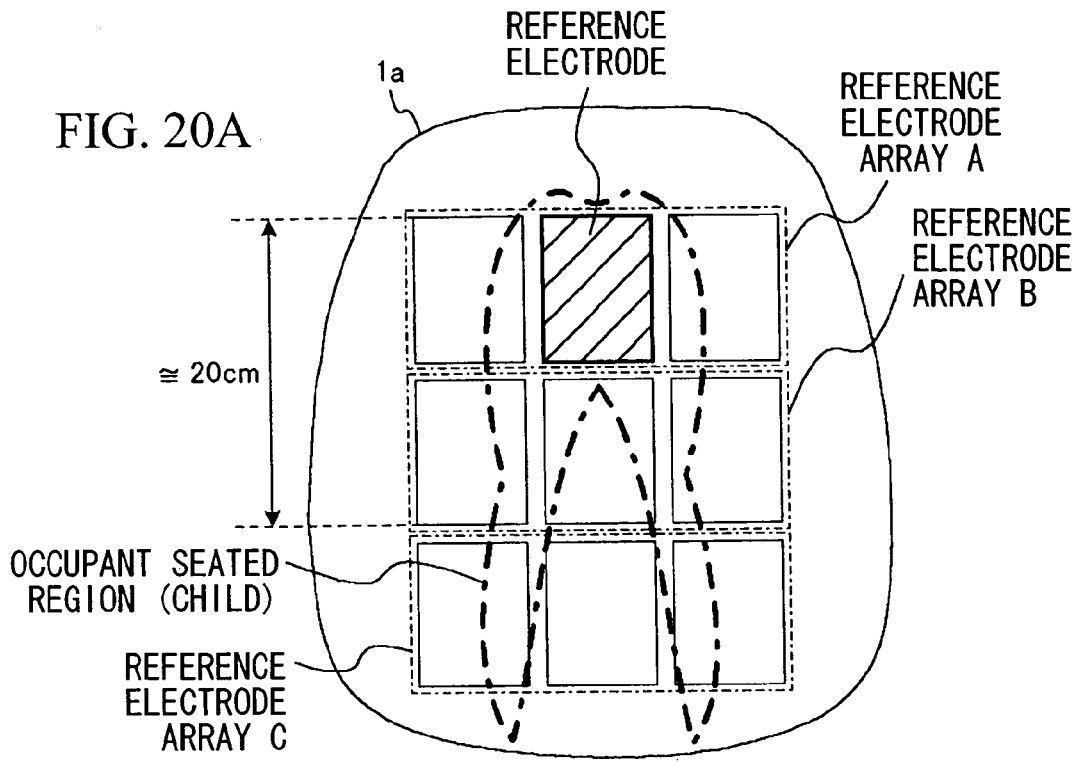
FIG. 20A and FIG. 20B are diagrams of examples for explaining the effects when the measurement area is calculated only by using the detection capacitance of the seat section electrode included in an electrode array where the distance in a Y-direction from the first reference electrode array is in a predetermined range.
Figure 20B:
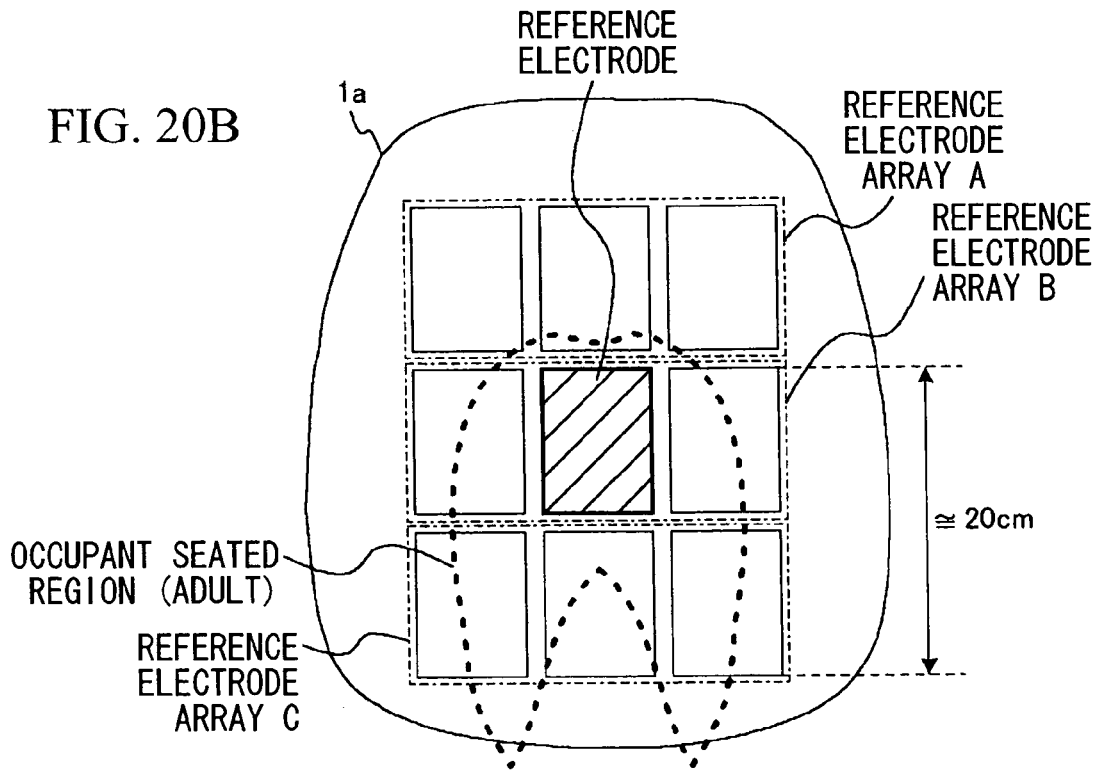

FIG. 20A and FIG. 20B are diagrams of examples for specifically explaining this effect. FIG. 20A and FIG. 20B are duplex type plan views respectively showing the condition where a child is sitting and the condition where an adult is sitting, in a seat where the first sensor section has the seat section electrode configuration of FIG. 11A. As shown in FIG. 20A, particularly if a child is sitting down close to the backrest section side, the leg part is also placed on the seating section and is detected by the reference electrode array C. Therefore, if the measurement area is calculated using the detection capacitances of all seat section electrodes of the first sensor section, the area of the leg part is also added. Therefore, the calculated measurement area becomes larger than the real size. On the other hand, if an adult is sitting down slightly shifted forward (in the direction away from the backrest section) as in FIG. 13A or FIG. 20B, the calculated measurement area becomes smaller than the real size in some cases, so that it becomes less different in size to that for the sitting child as FIG. 20A, making it difficult to determine whether an adult or child.

However, as mentioned above, if the measurement area is calculated using only the detection capacitances of the seat section electrode constituting the electrode array including the first reference electrode array, and which has a distance in the Y-direction within a predetermined range, then assuming that, for example, Wn and the predetermined range are 20 cm in the example of FIG. 20A, the seat section electrode in the central part in the reference electrode array A becomes the reference electrode. Therefore the electrode array which has the distance in the Y-direction within the predetermined range with respect to the reference electrode array A, being the first reference electrode array, is only the reference electrode array B, and hence the area of the legs is not added. On the other hand, regarding the measurement area for when an adult is sitting down as in FIG. 13A or FIG. 20B, there is no difference between the case where the calculation uses the detection capacitances of all seat section electrodes of the first sensor section, and the case where the calculation uses only the detection capacitance of the seat section electrode constituting the electrode array including the first reference electrode array, and which has a distance in the Y-direction within the predetermined range. Therefore, it is possible to easily and accurately discriminate from the measurement area of the child calculated from the detection capacitances of the seat section electrodes included in the reference electrode array A and the reference electrode array B in FIG. 20A. Moreover, in the case where there is an electrode array on both sides in the Y-direction of the first reference electrode array including the reference electrode as in FIG. 20B, there can be a plurality of sets of electrode arrays including the first reference electrode array. Therefore, the size of the occupant may be the maximum value of the measurement area when calculated for each set. In the example of FIG. 20B, the reference electrode array B becomes the first reference electrode array. Therefore regarding the set of (reference electrode array A+reference electrode array B) and the set of (reference electrode array B+reference electrode array C), the measurement area of the respective sets is calculated from the detection capacitances of the seat section electrodes included in the respective sets, and the larger measurement area (in this case, the set of (reference electrode array B+reference electrode array C)) may be the measurement area of the occupant.

The present invention is not limited to the description of the respective embodiments described above, and various modifications are possible within the scope of the gist of the invention.

For example, in the aforementioned embodiments, the GND potential is described as the second signal supplied from the second signal source, however if fixed potential, this need not be the GND potential. Furthermore, for example when a sine wave such as $V1=V_1 \sin \omega t$ is applied as the first signal, it is also possible to use a sine wave such as $V2=V_2 \sin \omega t$ $(V_1 \neq V_2)$ as the second signal, in order to obtain the capacitance necessary for measuring the size of the occupant.

Moreover, it is also possible to use a pulse signal as the first signal. In this case, it is possible to extract the alternating current component flowing through the electrode by using the pulse signal, and obtain a signal level or phase difference information similar to with the above described respective embodiments, or to directly measure the amplitude of the pulse signal. Then the capacitance between the occupant and the respective electrodes can be calculated from the measured value.

Furthermore, in the aforementioned embodiments, the example is described where the impedance detecting circuit 233 uses a synchronous detection circuit. However, this need not be a synchronous detection circuit as long as it detects the impedance connected to the inverting input terminal in the current detecting circuit 231 as the impedance between the electrodes of the RC parallel model as shown in FIG. 18. For example, it is also possible that the impedance detecting circuit is configured using a circuit which detects the effective value and the phase difference of the current, and extract the capacitance component.

Moreover, in the aforementioned embodiments, regarding the shape of the electrodes arranged in the seat section and the back section, an example of a rectangular shape is shown in the drawings and there is no reference to other shapes. However, considering the sitting comfort of the occupant, there may be a rectangular shape having rounded corners or polygonal corners, it may be trapezoid overall (the transverse top and bottom side lengths different, or the longitudinal top and bottom side lengths different), or it may be such that at least one in four sides is a curved shape (for example, the two sides of the top and bottom are a concave lens type, or convex lens type curved shape).

INDUSTRIAL APPLICABILITY

According to the occupant determination apparatus and the occupant determination method of the present invention, it is possible to accurately determine the size of a occupant, that is, whether an adult or child, with a simple configuration where a plurality of electrodes are arranged on one layer, in any one of the seating section and the backrest section. Moreover, it is possible to eliminate errors due to the capacitance between an occupant and surrounding car-body metal parts or the like, which affect the determination of the size of an occupant, so that erroneous determination can be prevented.

The invention claimed is:

1. An occupant determination apparatus comprising:
a first sensor section having a plurality of seat section electrodes arranged on a seating section of a seat having the seating section on which an occupant sits and a backrest section; and
a first determination section which detects each capacitance formed between the seat section electrodes by using a predetermined first signal for capacitance measurement, in order to determine a size of the occupant,
wherein the first sensor section has a reference electrode array where a plurality of reference candidate electrodes, included in the plurality of the seat section electrodes, are arranged by a predetermined rule,
the first determination section comprises: an electric field generating device which outputs the first signal; a capacitance measuring device which detects each capacitance between the seat section electrodes based on a current flowing through each of the seat section electrodes corresponding to the first signal; a switching device which sequentially switches a connection of the capacitance measuring device to the plurality of the seat section electrodes based on a switch control signal; and a controlling device which outputs the switch control signal, and
the controlling device comprises: a selecting device which sets one of the reference candidate electrodes included in the reference electrode array as a reference electrode, based on measurement capacitances of the seat section electrodes determined by detection capacitances of each of the seat section electrodes which are detected by the capacitance measuring device; a first calculating device which determines the size of the occupant based on a distance between the reference electrode and the occupant which is calculated from the measurement capacitance and an area of the reference electrode, and the measurement capacitances of the seat section electrodes included in the first sensor section; and a switch signal generating device which outputs the switch control signal.

2. An occupant determination apparatus according to claim 1, wherein the electric field generating device includes a first signal source which outputs the first signal and a second signal source which outputs a second signal different from the first signal, and the switching device connects an arbitrary first seat section electrode to the capacitance measuring device based on the switch control signal, and connects so as to supply the second signal to all of the seat section electrodes except for the first seat section electrode, and the detection capacitance of each of the seat section electrodes is made the measurement capacitance of each of the seat section electrodes.

3. An occupant determination apparatus according to claim 1, wherein the electric field generating device includes a first signal source which outputs the first signal and a second signal source which outputs a second signal different from the first signal, and the switching device further has a function for switching the first signal and the second signal in order to supply either the first signal or the second signal to the capacitance measuring device based on the switch control signal, and controls so that an arbitrary first seat section electrode is connected to the capacitance measuring device and the second signal is supplied to all of the seat section electrodes except for the first seat section electrode in the case where the first signal is to be supplied to the capacitance measuring device, and controls so that the first signal is supplied to an arbitrary first seat section electrode, an arbitrary second seat section electrode which is different from the first seat section electrode, is connected to the capacitance measuring device, and the second signal is supplied to all of the seat section electrodes except for the first seat section electrode and the second seat section electrode in the case where the second signal is to be supplied to the capacitance measuring device and the controlling device further includes a capacitance calculating device which calculates a capacitance between each of the seat section electrodes and the occupant based on the detection capacitance, and the calculated capacitance of each of the seat section electrodes is made the measurement capacitance of the seat section electrode.

4. An occupant determination apparatus according to claim 3, wherein the switching device compnses a switch module block having a plurality of switching modules which connect respective ends one-to-one to the seat section electrodes included in the first sensor section, and a switching block which switches the first signal and a predetermined second signal which is different from the first signal to supply either the first signal to the capacitance measuring device, or to supply the second signal to the capacitance measuring device, and the switching modules select for whether or not to supply the first signal or the second signal to the seat section electrode to which the end is connected, and whether or not to connect to the capacitance measuring device, based on the switch control signal.

5. An occupant determination apparatus according to claim 1, wherein the selecting device calculates a normalized capacitance per each unit area based on the measurement capacitance of each of the reference candidate electrodes included in the reference electrode array, and the reference candidate electrode for which the normalized capacitance is the maximum is made the reference electrode.

6. An occupant determination apparatus comprising:
a sensor section having a plurality of back section electrodes arranged on a backrest section of a seat having a seating section on which an occupant sits and the backrest section; and
a determination section which detects each capacitance formed between the back section electrodes by using a predetermined first signal for capacitance measurement, in order to determine a size of the occupant,
wherein the determination section comprises:
an electric field generating device which outputs the first signal;
a capacitance measuring device which detects each capacitance between the back section electrodes based on a current flowing through each of the back section electrodes;
a switching device which sequentially switches a connection of the capacitance measuring device to the plurality of the back section electrodes based on a switch control signal; and
a controlling device which outputs the switch control signal, and
the controlling device comprises:
a reference value storage device which stores a predetermined reference curve which is preset so that a capacitance for each position of the backrest section has an extreme value at a predetermined position;
a calculating device which determines the size of the occupant based on the reference curve and a capacitance distribution graph which is generated based on measurement capacitance of each of the back section electrodes determined by respective detection capacitances detected by the capacitance measuring device and the position in the backrest section of each of the back section electrodes; and
a switch signal generating device which outputs the switch control signal.

7. An occupant determination apparatus according to claim 6, wherein the electric field generating device includes a first signal source which outputs the first signal and a second signal source which outputs a second signal different from the first signal, and the switching device connects an arbitrary first back section electrode to the capacitance measuring device based on the switch control signal, and connects so as to supply the second signal to all of the back section electrodes except for the first back section electrode, and the detection capacitance of each of the back section electrodes is made the measurement capacitance of each of the back section electrodes.

8. An occupant determination apparatus according to claim 6, wherein the electric field generating device includes a first signal source which outputs the first signal and a second signal source which outputs a second signal different from the first signal, and the switching device further has a function for switching the first signal and the second signal in order to supply either the first signal or the second signal to the capacitance measuring device based on the switch control signal, controls so that an arbitrary first back section electrode is connected to the capacitance measuring device and the second signal is supplied to all of the back section electrodes except for the first back section electrode in the case where the first signal is to be supplied to the capacitance measuring device, and controls so that the first signal is supplied to an arbitrary first back section electrode, an arbitrary second back section electrode which is different from the first back section electrode, is connected to the capacitance measuring device, and the second signal is supplied to all of the back section electrodes except for the first back section electrode and the second back section electrode in the case where the second signal is to be supplied to the capacitance measuring device, and the controlling device further includes a capacitance calculating device which calculates the capacitance between each of the back section electrodes and the occupant based on the detection capacitance, and the calculated capacitance of each of the back section electrodes is made the measurement capacitance of each of the back section electrodes.

9. An occupant determination apparatus according to claim 8, wherein the switching device comprises a switching module block having a plurality of switching modules which connect respective ends one-to-one to the back section electrodes included in the sensor section, and a switching block which switches the first signal and a predetermined second signal which is different from the first signal to supply either the first signal to the capacitance measuring device, or to supply the second signal to the capacitance measuring device, and the switching modules select for whether or not to supply the first signal or the second signal to the back section electrode to which the end is connected, and whether or not to connect to the capacitance measuring device, based on the switch control signal.

10. An occupant determination apparatus according to claim 6, wherein a planar external appearance of the backrest section is approximately quadrilateral and the backrest section is connected to the seating section on a connection side which is one side of the quadrilateral, and assuming that two directions mutually orthogonal in the plane of the backrest section are an x-direction and a z-direction and a direction of the connection side is the x-direction, at least one of the back section electrodes is arranged on a straight line parallel to the x-direction in the sensor section, and a plurality of arrays of the back section electrodes are provided mutually separate in the z-direction.

11. An occupant determination apparatus according to claim 10, wherein the reference curve is set so that the capacitance for each position in the Z-direction has an extreme value at a predetermined position h0.

12. An occupant determination apparatus according to claim 11, wherein if the reference curve is denoted by $Cs(z)$ and the capacitance distribution graph is denoted by $Cm(z)$, the calculating device changes $\Delta z$, and calculates a cross-correlation function between $Cs(z+\Delta z)$ and $Cm(z)$, and the $\Delta z$ when the cross-correlation function becomes a maximum is assumed to be $\delta h$, then $(h0+\delta h)$ is made the size of the occupant.

13. An occupant determination apparatus comprising
a first sensor section having a plurality of seat section electrodes arranged on a seating section of a seat having the seating section on which an occupant sits and a backrest section;
a second sensor section having a plurality of back section electrodes arranged on the backrest section; and
a determination section which detects each capacitance formed between the seat section electrodes and each capacitance formed between the back section electrodes, by using a predetermined first signal for capacitance measurement, in order to determine a size of the occupant,
wherein the first sensor section has a reference electrode array where a plurality of reference candidate electrodes, included in the plurality of the seat section electrodes, are arranged by a predetermined rule; and the determination section comprises: an electric field generating device which outputs the first signal; a capacitance measuring device which detects each capacitance between the seat section electrodes based on a current flowing through each of the seat section electrodes, and detects each capacitance between the back section electrodes based on a current flowing through each of the back section electrodes; a switching device which sequentially switches a connection of the capacitance measuring device to the plurality of the seat section electrodes and the back section electrodes based on a switch control signal; and a controlling device which outputs the switch control signal, and the controlling device comprises:
a selecting device which sets one of the reference candidate electrodes included in the reference electrode array as a reference electrode, based on measurement capacitance of each of the seat section electrodes determined by detection capacitance of each of the seat section electrodes which are detected by the capacitance measuring device;
a first calculating device which determines the size of the occupant based on a distance between the reference electrode and the occupant which is calculated from the measurement capacitance and an area of the reference electrode, and the measurement capacitances of the seat section electrodes included in the first sensor section;
a reference value storage device which stores a reference curve which is preset so that the capacitance for each position of the backrest section has an extreme value at a predetermined position;
a second calculating device which determines the size of the occupant based on the reference curve and a capacitance distribution graph which is generated based on a measurement capacitance of each of the back section electrodes determined by each detection capacitance detected by the capacitance measuring device and the position in the backrest section of each of the back section electrodes;
a third calculating device which makes final determination of the size of the occupant based on the determination result of the first calculating device and the determination result of the second calculating device; and
a switch signal generating device which outputs the switch control signal.

14. An occupant determination apparatus according to claim 13, wherein the electric field generating device includes a first signal source which outputs the first signal and a second signal source which outputs a second signal different from the first signal, and the switching device connects only one electrode included in a sensor section to be measured to the capacitance measuring device, based on the switch control signal, and connects so as to supply the second signal to other electrode of the sensor section to be measured, and the detection capacitance of each of the electrodes is made the measurement capacitance of each of the electrodes.

15. An occupant determination apparatus according to claim 13, wherein the electric field generating device includes a first signal source which outputs the first signal and a second signal source which outputs a second signal different from the first signal, and the switching device further has a function for switching the first signal and the second signal in order to supply either the first signal or the second signal to the capacitance measuring device based on the switch control signal, controls so that an arbitrary first back section electrode is connected to the capacitance measuring device and the second signal is supplied to all of the back section electrodes except for the first back section electrode in the case where the first signal is to be supplied to the capacitance measuring device, and controls so that the first signal is supplied to an arbitrary first back section electrode, an arbitrary second back section electrode which is different from the first back section electrode is connected to the capacitance measuring device, and the second signal is supplied to all of the back section electrodes except for the first back section electrode and the second back section electrode in the case where the second signal is to be supplied to the capacitance measuring device, and the controlling device further includes a capacitance calculating device which calculates the capacitance between each of the back section electrodes and the occupant based on a detection capacitance detected by the capacitance measuring device, and the calculated capacitance of each of the back section electrodes is made the measurement capacitance of the back section electrodes.

16. An occupant determination apparatus according to claim 13, wherein the electric field generating device includes a first signal source which outputs the first signal and a second signal source which outputs a second signal different from the first signal, and the switching device further has a function for switching the first signal and the second signal in order to supply either the first signal or the second signal to the capacitance measuring device based on the switch control signal, controls so that an arbitrary first seat section electrode is connected to the capacitance measuring device and the second signal is supplied to all of the seat section electrodes except for the first seat section electrode in the case where the first signal is to be supplied to the capacitance measuring device, and controls so that the first signal is supplied to an arbitrary first seat section electrode, an arbitrary second seat section electrode which is different from the first seat section electrode, is connected to the capacitance measuring device, and the second signal is supplied to all of the seat section electrodes except for the first seat section electrode and the second seat section electrode in the case where the second signal is to be supplied to the capacitance measuring device, and the controlling device further includes a capacitance calculating device which calculates the capacitance between each of the seat section electrodes and the occupant based on a detection capacitance detected by the capacitance measuring device, and the calculated capacitance of each of the seat section electrodes is made the measurement capacitance of the seat section electrodes.

17. An occupant determination apparatus according to claim 13, wherein the electric field generating device includes a first signal source which outputs the first signal and a second signal source which outputs a second signal different from the first signal, and the switching device further has a function for switching the first signal and the second signal in order to supply either the first signal or the second signal to the capacitance measuring device based on the switch control signal, controls so that when the signal to be supplied to the capacitance measuring device is the first signal and an arbitrary first seat section electrode is connected to the capacitance measuring device, the second signal is supplied to all of the seat section electrodes except for the first seat section electrode, controls so that when the signal to be supplied to the capacitance measuring device is the first signal and an arbitrary first back section electrode is connected to the capacitance measuring device, the second signal is supplied to all of the back section electrodes except for the first back section electrode, controls so that when the signal to be supplied to the capacitance measuring device is the second signal and the first signal is supplied to an arbitrary first seat section electrode, an arbitrary second seat section electrode which is different from the first seat section electrode is connected to the capacitance measuring device, and the second signal is supplied to all of the seat section electrodes except for the first seat section electrode and the second seat section electrode; controls so that when the signal to be supplied to the capacitance measuring device is the second signal and the first signal is supplied to an arbitrary first back section electrode, an arbitrary second back section electrode which is different from the first back section electrode is connected to the capacitance measuring device, and the second signal is supplied to all of the back section electrodes except for the first back section electrode and the second back section electrode, and the controlling device further includes a capacitance calculating device which calculates the capacitance between each of the seat section electrodes and the occupant and the each capacitance between each of the back section electrodes and the occupant based on detection capacitances detected by the capacitance measuring device, and the calculated capacitance of each of the seat section electrodes is made the measurement capacitance of each of the seat section electrodes, and the calculated capacitance of each of the back section electrodes is made the measurement capacitance of each of the back section electrodes.

18. An occupant determination apparatus according to claim 15, wherein the switching device comprises: a first switch module block having a plurality of switching modules which connect respective ends one-to-one to the seat section electrodes included in the first sensor section; a second switching module block having a plurality of switching modules which connect respective ends one-to-one to the back section electrodes included in the second sensor section; and a switching block which switches the first signal and a predetermined the second signal which is different from the first signal to supply either the first signal to the capacitance measuring device, or to supply the second signal to the capacitance measuring device, and the switching modules select for whether or not to supply the first signal or the second signal to the seat section electrode or to the back section electrode to which the end is connected, and whether or not to connect to the capacitance measuring device, based on the switch control signal.

19. An occupant determination apparatus according to claim 13, wherein a planar external appearance of the backrest section is approximately quadrilateral and the backrest section is connected to the seating section on a connection side which is one side of the quadrilateral, and assuming that two directions mutually orthogonal in the plane of the backrest section are an x-direction and a Z-direction and a direction of the connection side is the x-direction, then at least one of the back section electrodes is arranged on a straight line parallel to the x-direction in the second sensor section, and a plurality of arrays of the back section electrodes are provided mutually separate in the Z-direction.

20. An occupant determination apparatus according to claim 19, wherein the reference curve is set so that the capacitance for each position in the Z-direction has an extreme value at a predetermined position h0.

21. An occupant determination apparatus according to claim 20, wherein if the reference curve is denoted by Cs(z) and the capacitance distribution graph is denoted by Cm(z), the second calculating device sequentially calculates a cross-correlation value CORR ($\Delta z$) defined by the following equation while changing $\Delta z$, and the $\Delta z$ when the cross-correlation value becomes a maximum is assumed to be $\delta h$, then (h0+$\delta h$) is made the size of the occupant:

$$CORR(\Delta z) = \frac{\sum_{r=1}^{n}((Cm_r - \overline{Cm})(Cs_r(\Delta z) - \overline{Cs}(\Delta z)))}{\sqrt{\sum_{r=1}^{n}(Cm_r - \overline{Cm})^2}\sqrt{\sum_{r=1}^{n}(Cs_r(\Delta z) - \overline{Cs}(\Delta z))^2}}$$

where $Cm_r = Cm(Z_r), Cs_r(\Delta z) = Cs(Z_r + \Delta z)$ $$\overline{Cm} = \frac{\sum_{r=1}^{n} Cm_r}{n}$$

$$\overline{Cs}(\Delta z) = \frac{\sum_{r=1}^{n} Cs_r(\Delta z)}{n}$$

22. An occupant determination apparatus according to claim 13, wherein the selecting device calculates a normalized capacitance per each unit area based on the measurement capacitance of each of the reference candidate electrodes included in the reference electrode array, and the reference candidate electrode for which the normalized capacitance is the maximum is made the reference electrode.

23. An occupant determination apparatus according to claim 1, wherein a planar external appearance of the seat section is approximately quadrilateral, and the seat section is connected to the backrest section on a first connection side which is one side of the quadrilateral, and assuming that two directions mutually orthogonal in the plane of the seat section are an x-direction and a Y-direction and a direction of the first connection side is the x-direction, the first sensor section is provided with a plurality of electrode arrays mutually separate in the Y-direction where the seat section electrodes are arranged on a straight line parallel to the X-direction, and at least one of the electrode arrays is the reference electrode array which is arranged with a plurality of the reference candidate electrodes mutually separate in the X-direction.

24. An occupant determination apparatus according to claim 23, wherein the first sensor section comprises at least two reference electrode arrays.

25. An occupant determination apparatus according to claim 24, wherein the electrode array further includes a second electrode array with one of the electrodes arranged on a straight line parallel with the x-direction.

26. An occupant determination apparatus according to claim 25, wherein the electrode array closest to the backrest section is the second electrode array.

27. An occupant determination apparatus according to claim 24, wherein the reference electrode array has at least three reference candidate electrodes.

28. An occupant determination apparatus according to claim 24, wherein one of the reference electrode arrays comprises a plurality of the reference candidate electrodes which have the same area as each other.

29. An occupant determination apparatus according to claim 2, wherein the first signal is an alternating current signal, and the second signal is a direct current signal.

30. An occupant determination apparatus according to claim 1, wherein the seat section electrodes and the back section electrodes and the switching device are respectively connected by shielded wire, and a signal which is the same as the signal applied to a central conductor of the shielded wire, is applied to a shielded section of the shielded wire.

31. An occupant determination method for an occupant determination apparatus comprising: a first sensor section having a plurality of seat section electrodes arranged on a seating section of a seat having the seating section on which an occupant sits and a backrest section; and a first determination section which detects each capacitance formed between the seat section electrodes by using a predetermined first signal for capacitance measurement, in order to determine a size of the occupant, and wherein the first sensor section has a reference electrode array where a plurality of reference candidate electrodes, included in the plurality of the seat section electrodes, are arranged by a predetermined rule, the method comprising at least:

a first detecting step for detecting each capacitance between the seat section electrodes based on a current flowing through each of the seat section electrodes corresponding to the first signal;

a reference electrode setting step for setting an electrode for which a normalized capacitance per unit area which is calculated from a measurement capacitance determined from the detection capacitance detected in the first detecting step is a maximum, among the reference candidate electrodes included in the reference electrode array, as a reference electrode;

a first size calculating step for calculating a measurement area from an area and the measurement capacitance of the reference electrode, and a measurement capacitance determined from the detection capacitance of each of the seat section electrodes; and a first determination step for determining the size of the occupant by comparing the measurement area and a predetermined first standard value.

32. An occupant determination method according to claim 31, wherein when the first sensor section includes n of the seat section electrodes, in the first detecting step, in a state where a first signal is applied to an arbitrary i th (where i is an integer of $1 \leq i \leq n$) seat section electrode and all other of the seat section electrodes are connected to a predetermined fixed potential, a detection capacitance which is detected based on a current flowing through the i th seat section electrode is made the measurement capacitance of the i th seat section electrode.

33. An occupant determination method according to claim 31, further comprising: a capacitance calculating step for calculating the capacitance between each of the seat section electrodes and the occupant based on the detection capacitance detected in the first detecting step, wherein the calculated the capacitance for each of the seat section electrodes is made the measurement capacitance of each of the seat section electrodes.

34. An occupant determination method according to claim 33, wherein when the first sensor section includes n of the seat section electrodes, in the first detecting step, in a state where a first signal is applied to an arbitrary j th (where j is an integer of $1 \leq j \leq n$) seat section electrode and all other of the seat section electrodes are connected to a predetermined fixed potential, the capacitance which is detected based on a current flowing through an arbitrary k th (where k is an integer of $1 \leq k \leq n$) seat section electrode is made the detection capacitance Cjk of the j th seat section electrode, and the detection capacitances for all combinations of j and k are detected, and in the capacitance calculating step the capacitance Cs (i) between the occupant and an i th (where i is an integer of $1 \leq i \leq n$) seat section electrode is calculated based on the detection capacitances by $Cs(i)=Cii+Ciq \times Cip/Cqp$ (where p and q are respectively integers of $1 \leq p \leq n$ and $1 \leq q \leq n$, and $(i-p) \times (p-q) \times (q-i) \neq 0$).

35. An occupant determination method for an occupant determination apparatus comprising: a sensor section having a plurality of back section electrodes arranged on a backrest section of a seat having a seating section on which an occupant sits and the backrest section; and a determination section which detects each capacitance formed between the back section electrodes by using a predetermined first signal for capacitance measurement, in order to determine a size of the occupant, and wherein a planar external appearance of the backrest section is approximately quadrilateral, the backrest section is connected to the seating section on a connection side which is one side of the quadrilateral, and assuming that two directions mutually orthogonal in the plane of the backrest section are an x-direction and a Z-direction and a direction of the connection side is the x-direction, at least one of the back section electrodes is arranged on a straight line parallel to the x-direction in the sensor section, and a plurality of arrays of the back section electrodes are provided mutually separate in the Z-direction, the method comprising at least:

a reference curve setting step for previously preparing a reference curve which is set so that the capacitance for each position in the Z-direction of the backrest section has an extreme value at a predetermined position h0;

a detecting step for detecting each capacitance between the back section electrodes based on a current flowing through each of the back section electrodes corresponding to the first signal;

a size calculating step for calculating a Z size, which is the size in the Z-direction, from the reference curve and a capacitance distribution graph which is generated based on measurement capacitances determined by respective detection capacitances detected in the detecting step and the position in the Z-direction of each of the back section electrodes; and a determination step for determining the size of the occupant by comparing the Z size and a predetermined standard value.

36. An occupant determination method according to claim 35, wherein when the sensor section includes n of the back section electrodes, in the detecting step, in a state where a first signal is applied to an arbitrary j th (where j is an integer of $1 \leq j \leq n$) back section electrode and all other back section electrodes are connected to a predetermined fixed potential, the detection capacitance which is detected based on a current flowing through the j th back section electrode is made the measurement capacitance of the j th back section electrode.

37. An occupant determination method according to claim 35, further comprising a capacitance calculating step for calculating the capacitance between each of the back section electrodes and the occupant based on the detection capacitance detected in the detecting step, wherein the calculated capacitance of each of the back section electrodes is made the measurement capacitance of each of the back section electrodes.

38. An occupant determination method according to claim 37, wherein when the sensor section includes n of the back section electrodes, in the detecting step, in a state where a first signal is applied to an arbitrary j th (where j is an integer of $1 \leq j \leq n$) back section electrode and all other of the back section electrodes are connected to a predetermined fixed potential, the capacitance which is detected based on a current flowing through an arbitrary k th (where k is an integer of $1 \leq k \leq n$) back section electrode is made detection capacitance Cjk of the j th back section electrode, and the detection capacitances for all combinations of j and k are detected, and in the capacitance calculating step a capacitance Cb (i) between the occupant and an i th (where i is an integer of $1 \leq i \leq n$) back section electrode is calculated based on the detection capacitances by $Cb(i)=Cii+Ciq \times Cip/Cqp$ (where p and q are respectively integers of $1 \leq p \leq n$ and $1 \leq q \leq n$, and $(i-p) \times (p-q) \times (q-i) \neq 0$).

39. An occupant determination method according to claim 35, wherein the sensor section includes n of the back section electrodes, and the position of the k th (where k is an integer of $1 \leq k \leq n$) of the back section electrodes in the Z-direction is made Zk, and in the size calculating step; if the reference curve and the capacitance distribution graph are respectively denoted by Cs(z) and Cm(z), sequentially computes a cross-correlation value CORR ($\Delta z$) defined by the following equation, while changing $\Delta z$, and the $\Delta z$ when the cross-correlation value becomes a maximum is assumed to be $\delta h$, then $(h0+\delta h)$ is made the Z-size:

$$CORR(\Delta z) = \frac{\sum_{r=1}^{n} ((Cm_r - \overline{Cm})(Cs_r(\Delta z) - \overline{Cs}(\Delta z)))}{\sqrt{\sum_{r=1}^{n} (Cm_r - \overline{Cm})^2} \sqrt{\sum_{r=1}^{n} (Cs_r(\Delta z) - \overline{Cs}(\Delta z))^2}}$$

where $Cm_r = Cm(Z_r), Cs_r(\Delta z) = Cs(Z_r + \Delta z)$ $$\overline{Cm} = \frac{\sum_{r=1}^{n} Cm_r}{n}$$

$$\overline{Cs}(\Delta z) = \frac{\sum_{r=1}^{n} Cs_r(\Delta z)}{n}$$

40. An occupant determination apparatus according to claim 18, wherein a planar external appearance of the backrest section is approximately quadrilateral, the backrest section is connected to the seating section on a connection side which is one side of the quadrilateral, and assuming that two directions mutually orthogonal in the plane of the backrest section are an x-direction and a Z-direction and a direction of the connection side is the x-direction, then at least one of the back section electrodes is arranged on a straight line parallel to the x-direction in the second sensor section, and a plurality of arrays of the back section electrodes are provided mutually separate in the Z-direction.

41. An occupant determination apparatus according claim 18, wherein the selecting device calculates a normalized capacitance per each unit area based on the measurement capacitance of each of the reference candidate electrodes included in the reference electrode array, and the reference candidate electrode for which the normalized capacitance is the maximum is made the reference electrode.

42. An occupant determination apparatus according claim 19, wherein the selecting device calculates a normalized capacitance per each unit area based on the measurement capacitance of each of the reference candidate electrodes included in the reference electrode array, and the reference candidate electrode for which the normalized capacitance is the maximum is made the reference electrode.

43. An occupant determination apparatus according to claim 5, wherein a planar external appearance of the seat section is approximately quadrilateral, the seat section is connected to the backrest section on a first connection side which is one side of the quadrilateral, and assuming that two directions mutually orthogonal in the plane of the seat section are an x-direction and a Y-direction and a direction of the first connection side is the x-direction, then a plurality of electrode arrays where the seat section electrodes are arranged on a straight line parallel to the x-direction in the first sensor section is provided mutually separate in the Y-direction, and at least one of the electrode arrays is the reference electrode array which is arranged with a plurality of the reference candidate electrodes mutually separate in the x-direction.

44. An occupant determination apparatus according to claim 18, wherein a planar external appearance of the seat section is approximately quadrilateral, the seat section is connected to the backrest section on a first connection side which is one side of the quadrilateral, and assuming that two directions mutually orthogonal in the plane of the seat section are an x-direction and a Y-direction and a direction of the first connection side is the x-direction, then a plurality of electrode arrays where the seat section electrodes are arranged on a straight line parallel to the x-direction in the first sensor section is provided mutually separate in the Y-direction, and at least one of the electrode arrays is the reference electrode array which is arranged with a plurality of the reference candidate electrodes mutually separate in the x-direction.

45. An occupant determination apparatus according to claim 19, wherein a planar external appearance of the seat section is approximately quadrilateral, the seat section is connected to the backrest section on a first connection side which is one side of the quadrilateral, and assuming that two directions mutually orthogonal in the plane of the seat section are an x-direction and a Y-direction and a direction of the first connection side is the x-direction, then a plurality of electrode arrays where the seat section electrodes are arranged on a straight line parallel to the x-direction in the first sensor section is provided mutually separate in the Y-direction, and at least one of the electrode arrays is the reference electrode array which is arranged with a plurality of the reference candidate electrodes mutually separate in the x-direction.

46. An occupant determination apparatus according to claim 22, wherein a planar external appearance of the seat section is approximately quadrilateral, the seat section is connected to the backrest section on a first connection side which is one side of the quadrilateral, and assuming that two directions mutually orthogonal in the plane of the seat section are an x-direction and a Y-direction and a direction of the first connection side is the x-direction, then a plurality of electrode arrays where the seat section electrodes are arranged on a straight line parallel to the x-direction in the first sensor section is provided mutually separate in the Y-direction, and at least one of the electrode arrays is the reference array which is arranged with a plurality of the reference candidate electrodes mutually separate in the x-direction.

47. An occupant determination apparatus according to claim 23, wherein the reference electrode array has at least three of the reference candidate electrodes.

48. An occupant determination apparatus according to claim 23, wherein one of the reference electrode arrays comprises a plurality of the reference candidate electrodes which have the same area as each other.

49. An occupant determination apparatus according to claim 27, wherein one of the reference electrode arrays comprises a plurality of the reference candidate electrodes which have the same area as each other.

50. An occupant determination apparatus according to claim 5, wherein the seat section electrodes and the back section electrodes and the switching device are respectively connected by shielded wire, and a signal which is the same as the signal applied to a central conductor of the shielded wire, is applied to a shielded section of the shielded wire.

51. An occupant determination apparatus according to claim 10, wherein the seat section electrodes and the back section electrodes and the switching device are respectively connected by shielded wire, and a signal which is the same as the signal applied to a central conductor of the shielded wire, is applied to a shielded section of the shielded wire.

52. An occupant determination apparatus according to claim 18, wherein the seat section electrodes and the back section electrodes and the switching device are respectively connected by shielded wire, and a signal which is the same as the signal applied to a central conductor of the shielded wire, is applied to a shielded section of the shielded wire.

53. An occupant determination apparatus according to claim 19, wherein the seat section electrodes and the back section electrodes and the switching device are respectively connected by shielded wire, and a signal which is the same as the signal applied to a central conductor of the shielded wire, is applied to a shielded section of the shielded wire.

54. An occupant determination apparatus according to claim 22, wherein the seat section electrodes and the back section electrodes and the switching device are respectively connected by shielded wire, and a signal which is the same as the signal applied to a central conductor of the shielded wire, is applied to a shielded section of the shielded wire.

55. An occupant determination apparatus according to claim 23, wherein the seat section electrodes and the back section electrodes and the switching device are respectively connected by shielded wire, and a signal which is the same as the signal applied to a central conductor of the shielded wire, is applied to a shielded section of the shielded wire.

56. An occupant determination apparatus according to claim 27, wherein the seat section electrodes and the back section electrodes and the switching device are respectively connected by shielded wire, and a signal which is the same as the signal applied to a central conductor of the shielded wire, is applied to a shielded section of the shielded wire.

57. An occupant determination apparatus according to claim 28, wherein the seat section electrodes and the back section electrodes and the switching device are respectively connected by shielded wire, and a signal which is the same as the signal applied to a central conductor of the shielded wire, is applied to a shielded section of the shielded wire.

58. An occupant determination apparatus according to claim 29, wherein the seat section electrodes and the back section electrodes and the switching device are respectively connected by shielded wire, and a signal which is the same as the signal applied to a central conductor of the shielded wire, is applied to a shielded section of the shielded wire.

* * * * *